United States Patent [19]

Henderson et al.

[11] Patent Number: 5,036,334
[45] Date of Patent: Jul. 30, 1991

[54] LIGHTNING DIRECTION FINDER CONTROLLER (LDFC)

[75] Inventors: Ronald W. Henderson, Albany, N.Y.; Paul Blankenbaker, Cary, N.C.

[73] Assignee: The Research Foundation of State University of New York, Albany, N.Y.

[21] Appl. No.: 476,935

[22] Filed: Feb. 8, 1990

[51] Int. Cl.⁵ .......................... G01S 3/02; G01R 31/02
[52] U.S. Cl. ........................................ 342/460; 324/72
[58] Field of Search .......................... 342/460; 324/72

[56] References Cited

U.S. PATENT DOCUMENTS

| | | | |
|---|---|---|---|
| 2,953,020 | 9/1960 | Hunt | 324/72 |
| 4,841,304 | 6/1989 | Richard et al. | 342/460 |
| 4,914,444 | 5/1990 | Pifer | 342/460 |

Primary Examiner—Gregory C. Issing
Attorney, Agent, or Firm—Heslin & Rothenberg

[57] ABSTRACT

A lightning direction finder controller (LDFC) for use at remote sites in a Lightning Detection Network provides information on lightning return strokes to a network controller. The LDFC digitizes and processes return stroke data from an analogue direction finder unit, time tags each return stroke with an absolute time accurate to the nearest $10^{-4}$ second of NIST time, and provides an interface for satellite and/or land line communication of lightning flash data to the network controller. The LDFC includes a CPU board, a multi-function analogue and digital input/output board that provides an interface to the analog direction finder unit, and an Interface Facility that provides an interface for: satellite and/or bisynchronous communications, a local data storage device, diagnostic devices, and a satellite controlled clock. A watchdog timer on the Interface Facility resets the CPU of the LDFC when data communications cease, or the execution of the main program halts. The LDFC supports a communications network overlay, using Reroute/Header messages, which allows the routing and passing of commands and the results of processed commands from any location in the network to any other location, e.g. for remote diagnostic purposes. The LDFC also supports virtual screen/keyboard capabilities, configurable parameter tables, various counts, status indications and screens, and a time correction technique for an out-of-sync LDFC.

26 Claims, 43 Drawing Sheets

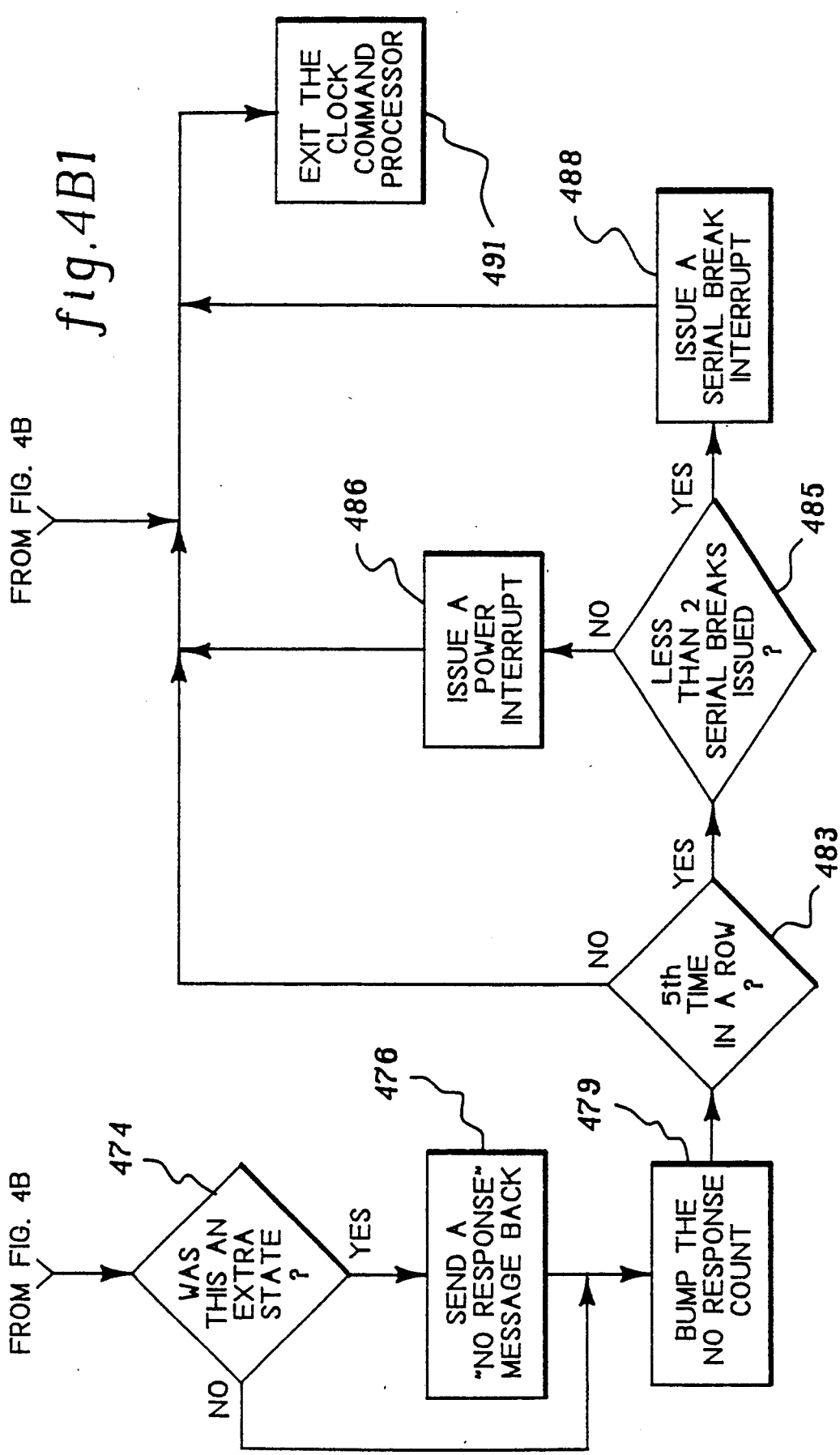

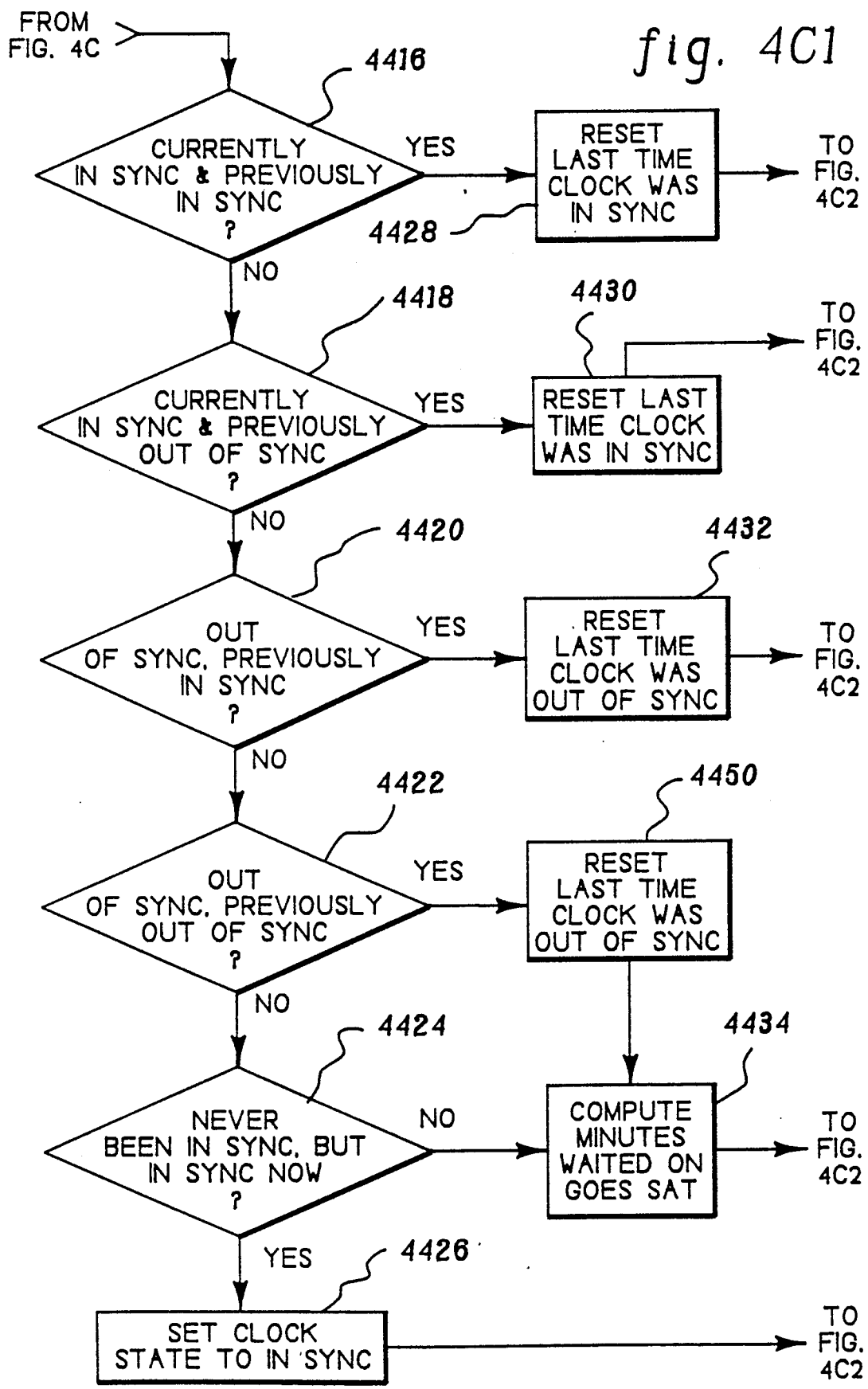
fig. 4C1

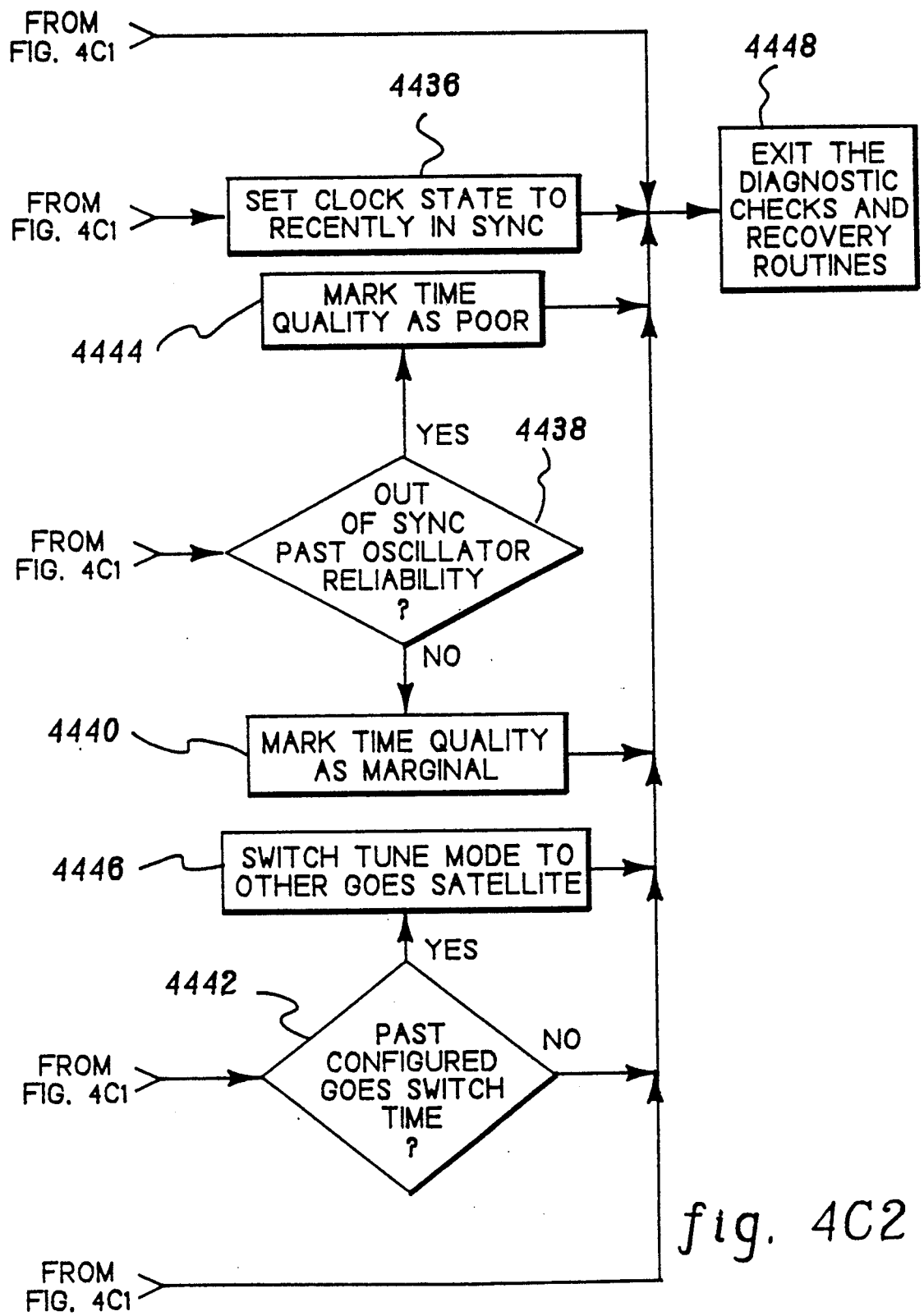
fig. 4C2

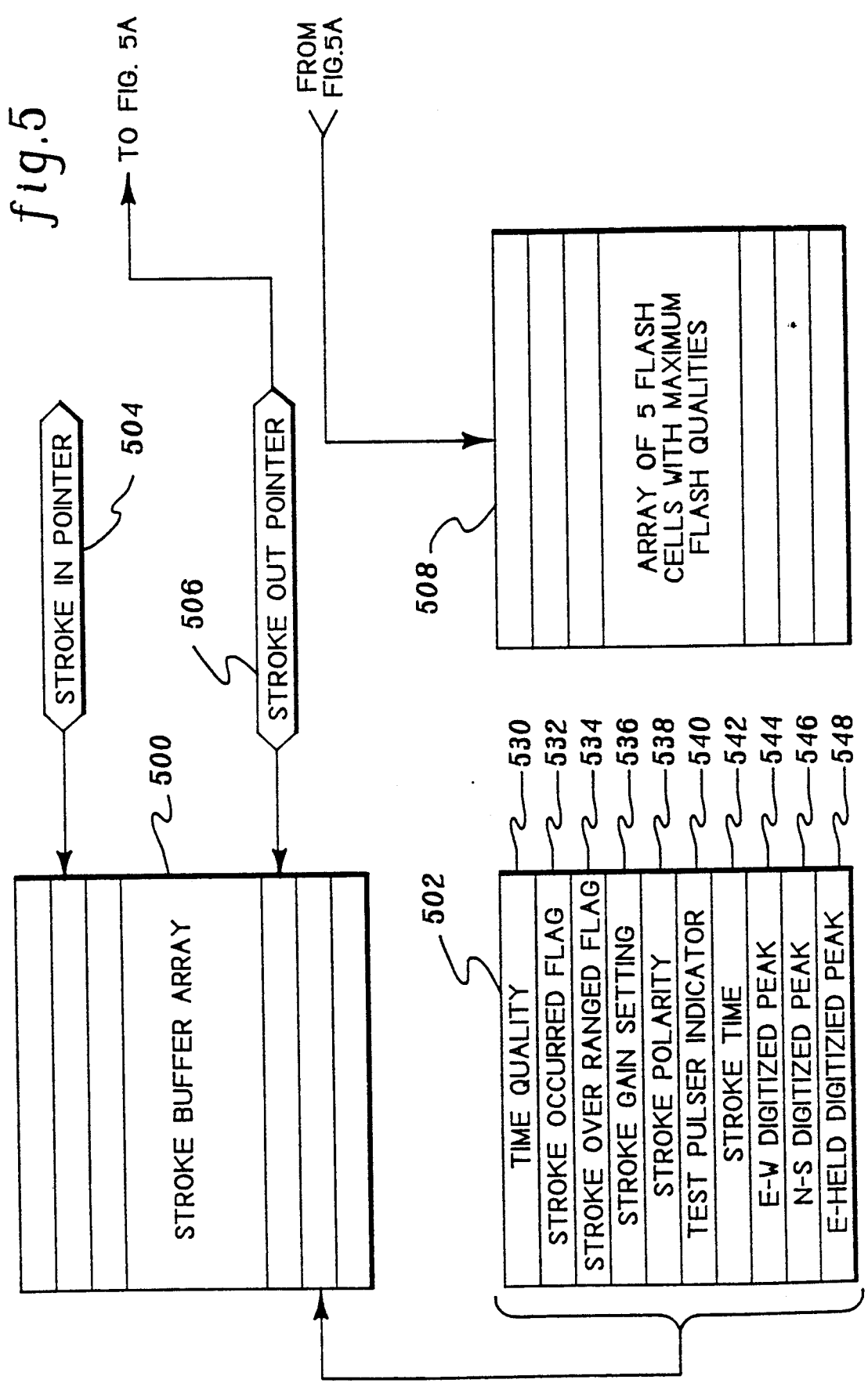

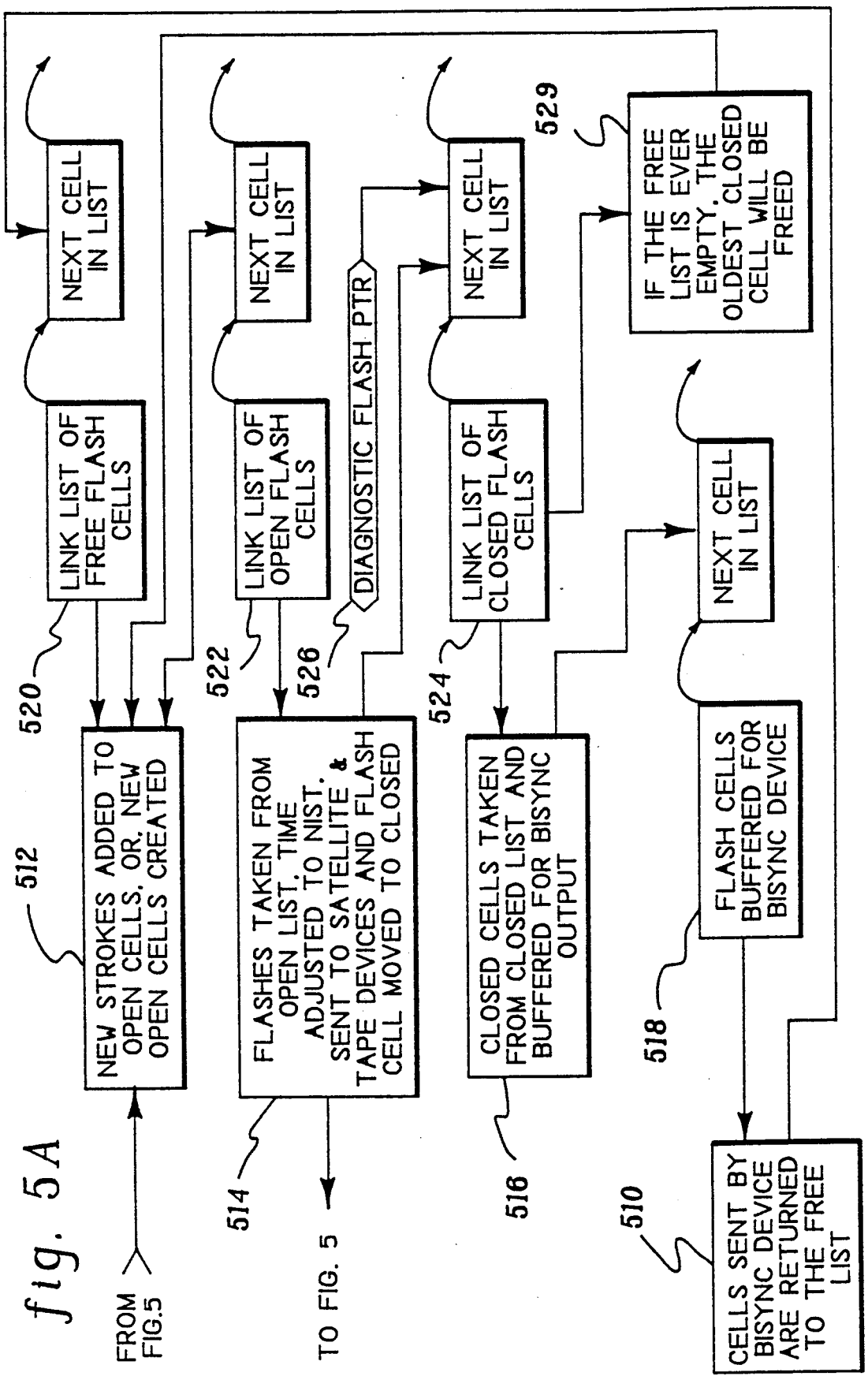

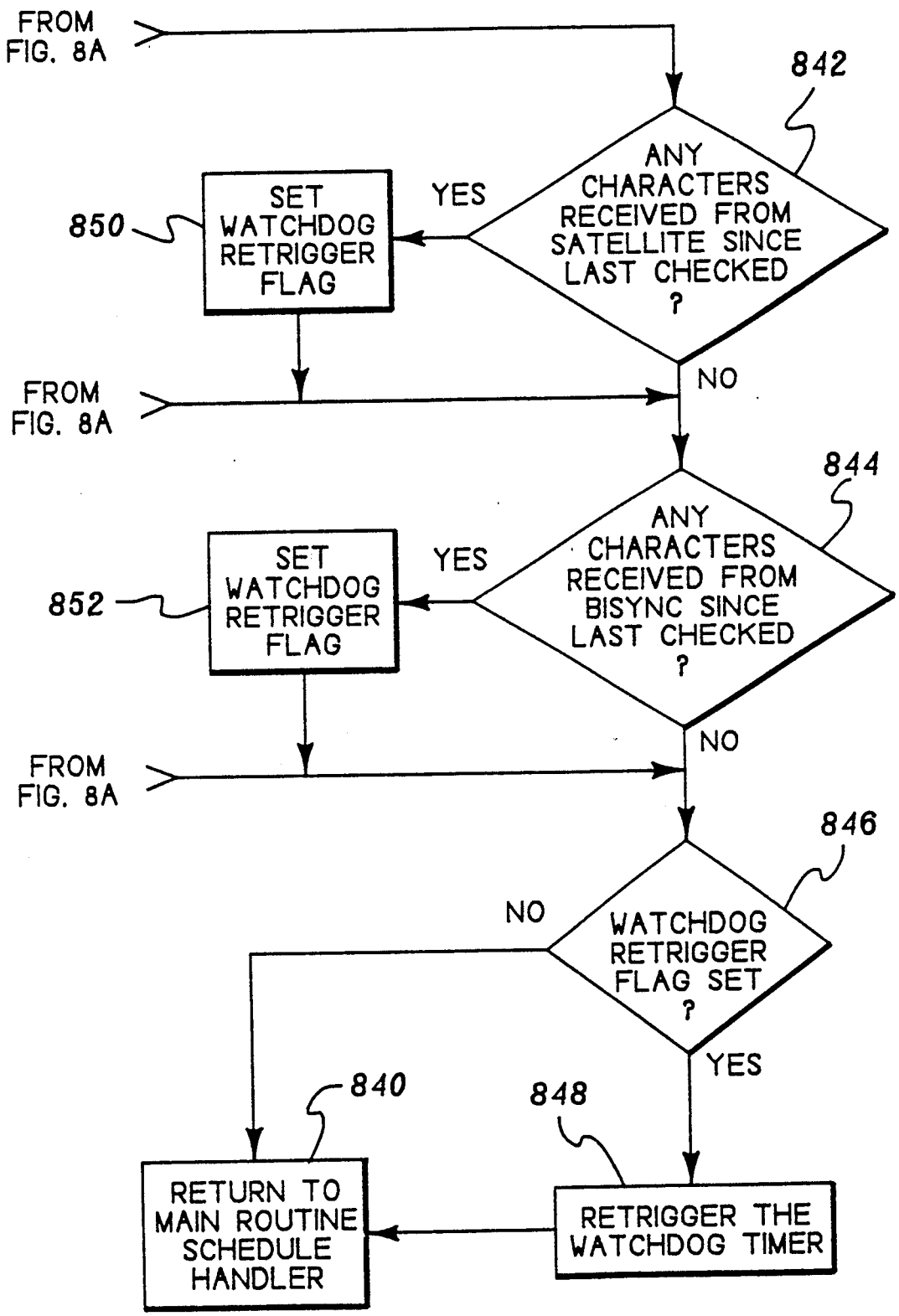
fig. 8A1

```
MS  IB   SUNY-ALBANY LDFC             v2.IP  +21°C 01/05/90 19:39:40.883
     Device          TxD      RxD      Errors           System
E0 Control          0 445A   0 8D44       0        -On-Time:  L  40.0000
E1 Packet           0 45AE   0 8E32       0         Run Time:00 02:57:26
E2 Tape/Packet      0 8D44   0 0000       0         Zero Dur:00 02:57:26
E3 Clock            0 0000   0 0000       0           AUX Sw:    01110000
E4 Satellite        0 8DAA   0 0000       0           IF:rvA DAF: +4.990
E5 Bisync           0 0000   0 0000     957 cccbbbbb  IntL:   5 DVM: ----
E6 Null Device      0 0000   0 0000       0            CLk: 93 E OKO66
E7 Null Device      0 0000   0 0000       0           Mode:    Flash Mode
          Sat Buffer                  Flash Status                    *TP*
  wHi: ----  wLo: ---- Left: 1412  EnTh(mV):  113   Spur: ----   E/B: +0.865
BadMsg: ---- Cels: 1414 Loss: ----  AcTh(mV):  111   iBuf: ----  nE/B: 95776
 fCells:  204 wExL: ----  hID:   1B     cCur:    8   bInt: ----   Enables:104768
        Clock Info                     Weak: ----   bA/D: ----   ADF Ints: 97212
 Resync: ----  NoRs: ----  aPow: ----   oRng: ----   Miss: 1436  Flashes:  3148
   Had↓:   32  Brks: ----   Pow: ----  Last FL: 01/05/90 19:39:40 Strokes: 13151
  +Had↓:   12 AvsS:   92  cGen: ----   Rates:  Flash Stroke        +FL( 2%):   62
  -Had↓:   20  nSS:  496  cCaL: ----   1 Min:  2940    12360       +St( 1%):   86
   NoOt: ----  sSS: 45560 cOsc: ----   5 Min:  2932    12240     SubSt( 96%): 3017
                                       1 Hr:   2932    12248    SubSt>( 16%):  478
                       Min/Max System Values                    Flash Grid
 vCLkSS:  34   vTmp:  +18   sPtr: 00B2  vADF+5V: +4.985           -+
 ^CLkSS:  97   ^Tmp:  +21   vSP:  0118  ^ADF+5V: +4.995           --
  ^Wait: ----  ^iBf:  100  ^Ram: A000  17 Dur:00 02:57:26         --
                          ^Mem: 9FFE  ^IntL:   -bSig: -1425.5  -  -
        Flash Stroke  Max Flash Values Seen  -eHLd: -5110      -  -
 Rates:                         Mult:  14    +eHLd:  ----      -  +
 1 Min: 2940   12360            %+FL:  26                      -  -
 5 Min: 2932   12240            %+St:  14             ConCur:  13
 1 Hr:  2932   12248
``` fig. 10-1

```
─────────────── Satellite Clock Status ───────────────
Start Sync:----           LGT: 8        In Sync:00 00:00:15
Last Sync:01/05/90 19:39:15  bArb:----  Out Sync:----------
Last Bad:----------------    bDel:----  Time To *:--------
                             aDel: 4155

──── DFC Parameters ────
   vδAzi:  -1.0    v+bSig: +10.0    Lon/Lat:07383W4269N
   ^δAzi:  +1.0    v-bSig: -10.0    Out Of Lock: 01         +---   N   ---
 Rotation: +0.0  Flash Dur: 1000    Times Bad At: 60        |  -   W•E  -+-
CPU Speed: Hi    Bit Flags: FF      Switch Time: 10         |  -   S   --
    Sound: 66  Initial Sat: East    Confidence Int:30000    +--         -+-
                                    EnTh(mV): 112        +1 Flashes:Enabled
                                    NS/EW+AccTh(mV): 112 -1 Clk Code:Enabled
ADF Gain Adj ── EW/NS- EW/NS+ NS/EW- NS/EW+           ~Wait:---- Sync Msg:Enabled
 Lo Gain Adj:    +5     -5    -15                    Clock Delay:----
 Hi Gain Adj:   +15     -5     +5

─────────────── Bisync Status ───────────────
 Par:----  cSum:----  oRun:----  Poll:----  Retry:----
 BFS:----  BFL: 2748  BSL:11467   FTC: 400   STC: 1685
       Time          NS       EW    Gain   E-Held  B-Signal  Azimuth Mult
01/05/90 19:39:38.0500 s    +3840  -5120    L      -580     -640.0    306.9  3
01/05/90 19:39:39.0500 s    +3840  -5120    L      -580     -640.0    306.9  3
01/05/90 19:39:40.0500 s    +3840  -5120    L      -580     -640.0    306.9  3
 δTime   NS ── EW  G eHeld  bSig ── Azi   δTime  NS ── EW  G eHeld bSig ── Azi
    0   +3840 -5120 L  -580 -640.0  306.9
 2000   +3840 -5120 L  -660 -640.0  306.9
 4000   +3840 -5120 L  -740 -640.0  306.9
```

```
                  Satellite Clock Status
Start Sync:-----             LGT:     8      In Sync:00 00:01:47
Last Sync:01/05/90 19:39:15  bArb:-----      Out Sync:-----
Last Bad:-----               bDel:-----      Time To *:-----
                             aDel: 4155

DFC Parameters
  vδAzi:  -1.0    v+bSig:  +10.0    Lon/Lat:07383W4269N
  ~δAzi:  +1.0    v-bSig:  -10.0    Out Of Lock:  01
Rotation: +0.0  Flash Dur:  1000    Times Bad At: 60
CPU Speec:  Hi  Bit Flags:    FF    Switch Time:  10
   Sound:  66  Initial Sat: East    Confidence Int:30000      +1   Flashes:Enabled
                                        EnTh(mV): 112         +1   Clk Code:Enabled
ADF Gain Adj - EW/NS- EW/NS+ NS/EW- NS/EW+ AccTh(mV): 112     -1   Sync Msg:Enabled
Lo Gain Adj:   +5      -5     -15                ~Wait:-----
Hi Gain Adj:  +15     -10      +5          Clock Delay:-----

Bisync Status
Par:-----  cSum:-----  oRun:-----  Poll:-----             Retry:-----
BFS:-----  BFL: 3484   BSL:14543   FTC:  400              STC: 1685
```

| Time | NS | EW | Gain | E-Held | B-Signal | Azimuth Mult |
|---|---|---|---|---|---|---|
| 01/05/90 19:41:12.0000 s | +1280 | +0 | L | -560 | -128.0 | 0.0 |
| 01/05/90 19:41:12.0250 s | +2560 | +2560 | L | -570 | -362.0 | 45.0 |
| 01/05/90 19:41:12.0500 s | +3840 | -5120 | L | -580 | -640.0 | 306.9 |
| 01/05/90 19:41:12.0750 s | -5120 | -2560 | L | -590 | -572.4 | 206.6 |
| 01/05/90 19:41:12.1000 s | -3840 | +0 | H | -600 | -384.0 | 180.0 |
| 01/05/90 19:41:12.1459 P | +1440 | -1 | L | -2450 | -144.0 | 360.0 |
| 01/05/90 19:41:12.1500 s | -1280 | -5120 | L | -620 | -527.8 | 256.0 |
| 01/05/90 19:41:12.1750 s | +0 | -2560 | L | -630 | -256.0 | 270.0 |
| 01/05/90 19:41:12.2000 s | +1280 | +0 | L | -640 | -128.0 | 45.0 |
| 01/05/90 19:41:12.2250 s | +2560 | +2560 | L | -650 | -362.0 | 45.0 |
| 01/05/90 19:41:12.3580 P | +1441 | -1 | H | -2445 | -144.1 | 360.0 |
| 01/05/90 19:41:12.4642 P | +1438 | -1 | H | -2440 | -143.8 | 360.0 |

```
MS  1B   SUNY-ALBANY LDFC              v2.1P  +21°C 01/05/90 19:42:59.2652
    Device              TxD        RxD        Errors           System
E0 Control            0 46CF   228 4ACB         0           -On-Time: L  59.0000
E1 Packet             0 4603     0 4B75        -0           Run Time:00 03:00:45
E2 Tape/Packet        0 4ACB     0 0000         0           Zero Dur:00 03:00:45
E3 Clock              0 0000     0 0000         0           AUX Sw:      01110000
E4 Satellite         92 4B31     0 0000       957 cccbbbbb  IF:rvA ADF: +4.990
E5 Bisync             0 0000     0 0000         0             IntL:  9 DVM: --
E6 Null Device        0 0000     0 0000         0              CLk: 96 E 0K066
E7 Null Device        0 0000     0 0000         0             Mode:    FLash Lock
          Sat Buffer            Left: 1411                             Flash Status                   *TP*
 wHi:      1 wLo:     2 Cels: 1414  Loss: ----  hID:   1B   EnTh(mV):    113  Spur:----        E/B: +0.804
BadMsg:---- Cels: 1414 wExL:----                            AcTh(mV):    111  iBuf:----       nE/B: 102421
fCells:  204                                                  cCur:        8  bInt:----    Enables: 106642
                                                              Weak:   ----    bA/D:----    ADF Ints: 03857
                                                              oRng:   ----    Miss: 1436    Flashes: 4740
          Clock Info                                       Last FL: 01/05/90 19:39:40       Strokes: 19804
Resync:---- NoRs:----                                       Rates:  Flash Stroke             +FL( 1%):    62
  Had:  32 Brks:----                                         1 Min:  4380 18240              +St( 0%):    86
 +Had:  12 AvSS:     92                                      5 Min:  4368 18269           SubSt( 97%): 4609
 -Had:  20 nSS:     505                                       1 Hr:  4372 18268           SubSt>( 15%): 676
 NoOt:---- sSS:  46406                                                                          Flash Grid
                       Min/Max System Values
vCLkSS:  34 vTmp: +18   sPtr: 0060 vADF+5V: +4.985                                            -+
^CLkSS:  97 ^Tmp: +21   vSP: 0118 ^ADF+5V: +4.995                                             --
 Wait:---- ^iBf:   100 ^IntL:   43 Dur:00 03:00:45                                            +-
 Rates:  Flash Stroke    Max Flash Values Seen             -bSig:-1425.5
  1 Min:  4380  18300   Mult:    15  -eHLd:-5110           +bSig:+1364.7
  5 Min:  4380  18281   %+FL:    26  +eHLd:----           ConCur:    13
  1 Hr:   4372  18268   %+St:    14
``` fig. 10B1

```
                    Satellite Clock Status
Start Sync:----                      LGT: 8       In Sync:00 00:03:34    +--N--:--
Last Sync:01/05/90 19:39:15    bArb:----          Out Sync:----          W•E--:--
Last Bad:----                  bDel:----          Time To •:----          S--:--+-
                               aDel: 4155

DFC Parameters
    vδAzi:   -1.0              v+bSig:  +10.0     Lon/Lat:07383W4269N
    ~δAzi:   +1.0              v-bSig:  -10.0     Out Of Lock: 01
  Rotation:  +0.0              Flash Dur: 1000    Times Bad At: 60
 CPU Speed:  Hi                Bit Flags:  FF     Switch Time: 10
     Sound:  66                Initial Sat: East  Confidence Int:30000
                                                  EnTh(mV): 112      +1   --Flashes:Enabled
ADF Gain Adj — EW/NS-  EW/NS+  NS/EW-  NS/EW+     AccTh(mV): 112      -1  --Clk Code:Enabled
  Lo Gain Adj:   +5      -5      -15              ~Wait:----          ---Sync Msg:Enabled
  Hi Gain Adj:   +15     -5      -10     +5       Clock Delay:----

Bisync Status
  Par:----  cSum:----   oRunL----   Poll:----     Retry:----
  BFS:----  BFL: 4340   BSL:18120   FTC: 400      STC: 1685
     Time                NS          EW       Gain  E-Held  B-Signal  Azimuth Mult
01/05/90 19:42:58.0500 s  +3840      -5120      L    -580    -640.0   306.9      3
01/05/90 19:42:59.0500 s  +3840      -5120      L    -580    -640.0   306.9      1
01/05/90 19:42:51.3750 s    +0       -2560      L    -710    -256.0   270.0      3
   δTime   NS      EW    G  eHeld  bSig —Azi  δTime  NS      EW    G eHeld bSig —Azi
    0      +0   -2560    L   -710  -256.0 270.0
  2000     +0   -2560    L   -790  -256.0 270.0
  8000     +0   -2560    L   -630  -256.0 270.0
``` fig. 10B2

```
MS 1B  SUNY-ALBANY LDFC           v2.1P  +21°C 12/10/89 00:08:48.9284
─────────────────────────────── Help Screen ───────────────────────────────

F1    Help Screen Toggle              ^E   Use Extended Parm Table
F2    Screen Freeze/Unfreeze          ^F   Simulate One Flash
F3    Flash Normal Display            ^K   Default Colors
F4    Flash Lock Display              ^M   Default Monochrome
F5    Stroke Only Display             ^P   Use Internal Parameters
F6    Screen Refresh                  ^Q   Toggle Sound/Quiet Mode
F7    Previous Screen                 ^S   Simulate Lightning Stroke
F8    Next Screen                     ^Z   Zero Counts
F9    Enable Max Stats Screen
F10   Toggle Max Stats/Flash          ~B   Reset Buffers
                                      ~C   Toggle Clock Enable/Disable
^End  Quit To DOS/Reboot              ~D   Enter Debugger
                                      ~F   Toggle ADF Int Enable/Disable
 ^    Flash Header Up 1               ~M   Toggle Clock Tune Mode
 v    Flash Header Down 1             ~S   Toggle Simulation Mode
 #^   Stroke Header Up 1              ~W   Extend Watchdog Toggle
 #v   Stroke Header Down 1            ~Z   Zero Flash/Stroke Rate Tables ───────────────── # - Shift  ^ - Ctrl  ~ - Alt ─────────────────
```

*fig. 10C*

MS 1B  SUNY-ALBANY LDFC      v2.1P  +21°C  12/10/89 00:08:48.9284
───────── Device Error Codes ─────────

```
Char   Meaning
────   ───────
 b     Break Change Interrupt
 c     CTS Change Interrrupt
 C     Bad Message Check Sum
 D     Delimiter Error
 d     CD Change interrupt
 F     Framing Error
 I     Null Interrupt
 L     Message Length Error
 O     Overrun Error
 P     Parity Error
 p     Bad Parameter Table
 S     External Status Change
 s     SYNDET Change Interrupt
 U     Unknown
 u     Underrun Error
 ?     Unknown Satellite Message
``` fig. 10D

```
MS  1B  SUNY-ALBANY  LDFC                v2.IP  +21°C  12/10/89  00:08:48.9284
    Device         TxD      RxD    Errors            System
E0 Control      1|  771E   78 7751    0        On-Time:  L   48.0000
E1 Packet       0|  772F   1| 7784    0        Run Time:01  00:08:48
E2 Tape/Packet  0|  7751    0 0000    0        Zero Dur:00  00:01:36
E3 Clock         0  0000    0 0000    0         AUX Sw:      01110000
E4 Satellite    78  2C8B    0 0000    0            IF:rvA  ADF: +4.995
E5 Bisync        0  0000    0 0000    0          IntL:  1  DVM: --
E6 Null Device   0  0000    0 0000    0           CLk:  95 E 0K065
E7 Null Device   0  0000    0 0000    0          Mode:    FLash Mode   •TP•

E1 Packet                    (Ch: 2)
Chip Type: 8274    ^CTS:-----      ^CD:-----   ^SynDet:-----   ^Break:-----
Ctrl Port: 0336    vCTS:-----      vCD:-----   vSynDet:-----   vBreak:-----
Data Port: 0334    ^CTS            ^CD         ^SynDet         vBreak
OverRun:-----   Parity:-----   Framing:-----  UnderRun:-----  Unknown:-----
RR0:01011100   RR1:06000000
WR1:00010110   WR2:00010000   WR3:11000001   WR4:01000100    WR5:11101010

E2 Tape/Packet               (Ch: 1)
Chip Type: 8274    ^CTS:-----      ^CD:-----   ^SynDet:-----   ^Break:-----
Ctrl Port: 0333    vCTS:-----      vCD:-----   vSynDet:-----   vBreak:-----
Data Port: 0331    ^CTS            ^CD         vSynDet         vBreak
OverRun:-----   Parity:-----   Framing:-----  UnderRun:-----  Unknown:-----
RR0:01101100   RR1:06000000
WR1:00010110   WR2:00000000   WR3:11000001   WR4:01000100    WR5:11101010
```

*fig. 10E1*

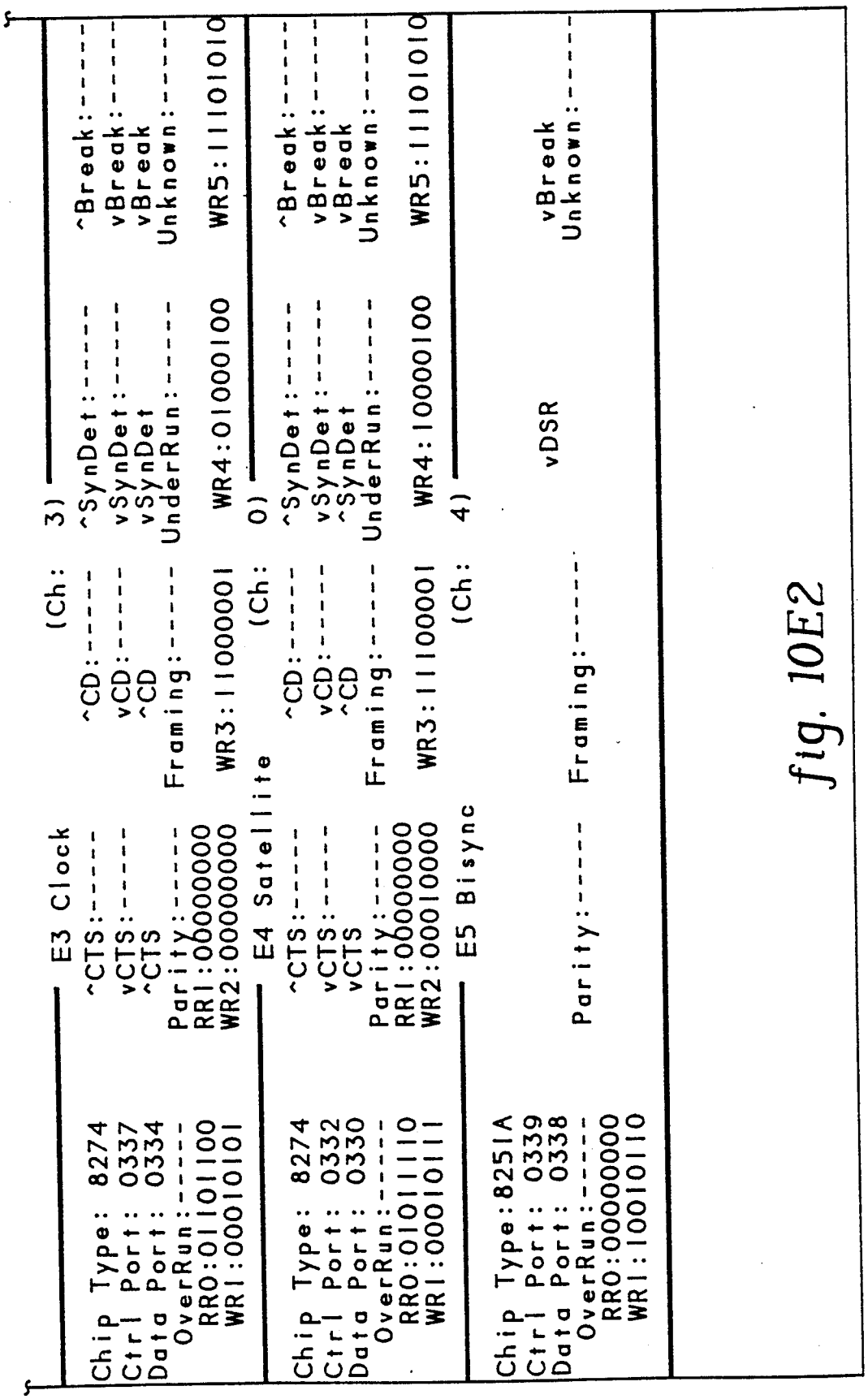
fig. 10E2 fig. 10F1

```
───────────────── Cell Examine Area ─────────────────
Active List:Free List  Received By:EO Control            To Devices:00000100
Active Cell:8B92       Next Cell:8BA3   Prev Cell:8B81   Buffered on:00000000
Active Dev:EO Control                   Msg Len: 99       In Xmit Q:00000000
                                        Priority: Hi    Xmitting On:00000000
                                                         Valid Mask:00010111

Message Contents:

```
MS  1B  SUNY-ALBANY LDFC            v2.1P  +21°C 12/10/89 00:08:48.9284
    Device          TxD      RxD          Errors      System
E0 Control         11 771E  .78 7751         0      On-Time: L  48.0000
E1 Packet           0 772F   11 7784         0      Run Time:01 00:08:48
E2 Tape/Packet      0 7751    0 0000         0      Zero Dur:00 00:01:36
E3 Clock            0 0000    0 0000         0        AUX Sw:    01110000
E4 Satellite       78 2C8B    0 0000         0          IF:rvA ADF: +4.995
E5 Bisync           0 0000    0 0000         0        IntL: I  DVM: ---
E6 Null Device      0 0000    0 0000         0         CLk: 95 E 0K065 --
E7 Null Device      0 0000    0 0000         0        Mode:     FLash Mode
                          Device Status Screen                       *TP*

Active Dev:EO Control                       Chip:  n/a        PgUp Next List
                                            Data:  ----       PgDn Prev List
                  Txd     Rxd               Ctrl:  ----       Tab  Change Active Dev Msg Ptr:    8BF8    8C2B                                 Home Move to List Head
    Msgs Buff:      1       6                                 End  Move to List Tail
    Bytes Buff:    11      78                                 [    Last RxD From Dev
    Msgs Lost:   ----    ----                                 ]    Last TxD By Dev
    Bytes Lost:  ----    ----
        State:   ----    ----                                 <    Prev Cell In List
   Init State:   ----    ----                                 >    Next Cell In List
       Active:   Yes     No                                   ^    Next Cell in Mem
                                                              v    Prev Cell in Mem
                                                              Del  Next Cell For Dev
                                                              Ins  Prev Cell For Dev
``` fig. 10G1

```
─────────────────── Cell Examine Area ───────────────────
Active List:Free List   Received By:EO Control       To Devices:00000100
Active Cell:8B92           Prev Cell:8B81          Buffered on:00000000
               Next Cell:8BA3    Msg Len:  99        In Xmit Q:00000000
Active Dev:EO Control       Priority: Hi         Xmitting On:00000000
                                                  Valid Mask:00010111

Message Contents:

| DF | Date/Time | Stroke-Count | Azimuth | Magnetic | Electric |
|---|---|---|---|---|---|
| 13 My: | 06/05/89 00:42:32.6251@ | 7 | 249.4 | -66.5 | -315 |
| | 1109 | | 249.3 | -347.3 | -1825 |
| | 3918 | | 251.8 | -195.7 | -925 |
| | 4349 | | 251.7 | -160.6 | -860 |
| | 4685 | | 251.8 | -219.0 | -1155 |
| | 7447 | | 251.7 | -136.4 | -720 |
| | 9566 | | 251.4 | -101.8 | -475 |
| 16 Sa: | 06/05/89 22:21:57.8718 | 7 | 37.9 | -35.5 | -245 |
| | 1110 | | 37.3 | -169.8 | -1120 |
| | 3918 | | 37.9 | -90.6 | -585 |
| | 4349 | | 37.5 | -82.4 | -570 |
| | 4686 | | 38.0 | -109.3 | -745 |
| | 7447 | | 37.6 | -66.6 | -475 |
| | 9566 | | 38.0 | -48.7 | -370 |
| 15 Ra: | 06/05/89 22:21:57.8722 | 6 | 206.1 | -25.1 | -175 |
| | 1110 | | 205.8 | -122.3 | -832 |
| | 3917 | | 206.5 | -64.3 | -410 |
| | 4349 | | 207.1 | -59.4 | -407 |
| | 4686 | | 207.3 | -77.8 | -532 |
| | 7447 | | 206.0 | -47.1 | -339 |

1100
1110
1120 fig. 11

LIGHTNING DIRECTION FINDER CONTROLLER (LDFC)

BACKGROUND OF THE INVENTION

1. Field Of The Invention

The present invention relates generally to ground-based lightning detection systems and more particularly to such a system in which the absolute timing of lightning return strokes is calculated at the data collector with high, e.g. 100 microsecond, accuracy. The invention also relates to lightning and other data collection devices requiring absolute timing, watchdog capabilities, and enhanced diagnostic and networking capabilities.

2. Description Of Prior Art

In recent years, meteorological and other applications of lightning data have taken on increased significance. Short range forecasting of severe lightning storms is now possible using data collected from existing lightning detection networks. The accurate, real-time collection of lightning data promises benefits in many fields of human endeavor. In the utility industry, for example, real-time lightning data can be used to enhance preparation and response to storms, improve the dispatch and efficient use of manpower, identify lightning related outages, and assist in the design of effective lightning protection.

A National Lightning Detection Network has been established in the United States to build a long-term data base of the frequency of lightning flashes throughout the continental United States. It locates lightning flashes to ground and reports them in real-time. The network spots only cloud-to-ground flashes, filtering out intra cloud flashes.

The network consists of lightning direction finder installations located throughout the United States that measure the characteristics of lightning flashes. The lightning direction finder installations transmit data about the flash to an operations center where a network controller and associated equipment calculate the location and time of the lightning flashes. The operations center can archive the data for subsequent study and analysis and/or transmit the lightning information to users such as electric utility companies to assist in their operation of transmission and distribution systems, by facilitating real-time storm tracking.

Systems for the detection of lightning return strokes are known and one approach for detecting the return stroke is described in U.S. Pat. No. 4,198,599 which uses a gated magnetic direction finding technique and circuitry which detects only cloud to ground lightning return strokes. Equipment using the above technique has previously been developed by Lightning Location and Protection Co. (LLP) and is called a model 80-02 Automatic Direction-Finding System. It consists of an analog unit (ADF 80-02) and digital microprocessor controlled unit (DF 80-02). The analog unit detects when a cloud to ground lightning return stroke has occurred and signals the digital unit when such an event occurs. The digital unit digitizes the analog return stroke data from the analog unit producing an azimuth, polarity, and signal strength. When such equipment has been used in a network configuration, only the characteristics of the first return stroke and the count of the number of return strokes in a flash (known as the multiplicity) is sent to the Network Controller. The characteristics of subsequent return strokes in the flash are not sent to the Network Controller. The DF 80-02 forwards the flash packets by either a synchronous multidrop configuration or a point to point asynchronous configuration to the Network Controller.

The time that is recorded when the flash occurs is very crucial in the lightning flash location algorithm employed at the operations center of the network. A Location Processor Device, connected to the Network Controller, can only group the reported flash packets sent from the multiple remote DF 80-02 units by using a timing window. If the reported flash packets have incorrect times associated with them, erroneous flash locations can result or low detection efficiencies can occur. Flash location algorithms based on data from multiple DF 80-02s are known; U.S. Pat. No. 4,245,190 utilizes a triangulation technique and another method "An Analytical Solution to Obtain the Optimum Source Location Using Multiple Direction Finders on a Spherical Surface" (Journal of the Geophysical Research, Vol. 92, No. D9, Pages 10,877–10,886, Sept. 20, 1987) utilizes an eigen value technique.

The LLP DF 80-02 uses a free running internal clock with a resolution of 1 millisecond. In a network configuration, there is no means of synchronizing the DF 80-02 to NIST (National Institute of Standards and Technology) time or any other absolute time. If dedicated land lines are used as the medium for data communications between Direction Finders and the Network Controller, then the time reported by each Direction Finder in the network can be synchronized through a single time source. The Network Controller has the responsibility of correcting all of the times reported by each Direction Finder to coincide with the current Network time. This allows for proper grouping of the lightning flash data. Using dedicated land lines allows one to make the assumption that the time path delay between the Network Controller end and the remote Direction Finder and back is the same. Based on this assumption, only the Network Controller has to be synchronized to a known timing source for proper time synchronization of the remote Direction Finders. Accuracy of a few milliseconds is possible with this method.

However, if the medium of data transmission is through satellite communications, as is highly desirable for cost and other reasons, unknown path delays are introduced, making the previous technique for time tagging the lightning data unworkable. There is a very complex method of synchronizing remote Direction Finders when unknown path delays exist, called a self-synchronization method, which takes advantage of using the relative times of the first return stroke in the flash reported by the remote Direction Finders. The advantage of this method is that the network controller is able to synchronize the time at the individual direction finder sites, thus reducing the overall cost of having a synchronized clock at each remote Direction Finder. The disadvantage of the self-synchronization method is that it causes low detection efficiencies to occur at low flash rates or when multiple groups of Direction Finders become synchronized to different relative times in a large network configuration, thus leading to multiple counting of the same flash. Another disadvantage to this method is that absolute times are not able to be determined for the lightning return strokes. This makes it very difficult to combine lightning data from Direction Finders which are on different networks.

The currently available commercial lightning Direction Finder equipment also provides no means of message passing or file transfer between a remote Direction Finder and some other point in the Lightning Detection Network. Message passing is extremely important for field service repair personnel in a large Lightning Detection Network configuration where thousands of kilometers exist between the remote Direction Finder sites and the Network Controller.

The DF 80-02 is also limited in its diagnostic and communication capabilities. Further the existing equipment lacks any form of parameter tables which can be used to configure the operating procedure of the Direction Finder.

It is also desirable to obtain lightning return stroke characteristics of each stroke in a flash. This information is actually available at the ADF 80-02 but not reported by the DF 80-02. The inventors have found that the first return stroke in a flash does not always contain the highest peak signal strength which is directly proportional to the peak current of the stroke. The peak signal strength of all of the return strokes in the flash is needed in order to correctly determine the peak current of the flash.

In summary then, a need exists for a digital lightning direction finder unit capable of communicating more information about each return stroke of a flash to a network controller; exhibiting enhanced diagnostic and communication capabilities; having remotely configurable operational parameters; and providing absolute time tagging of lightning return strokes, with high accuracy, at remote direction finder sites, to accommodate unknown path delays in satellite or other data communications media.

BRIEF SUMMARY OF THE INVENTION

These needs are satisfied, the shortcomings of the prior art overcome, and additional benefits realized, in accordance with the principles of the present invention, by the provision of a Lightning Direction Finder Controller (LDFC) which not only provides more digitized lightning return stroke data collected by an analog magnetic direction finder, but also provides absolute 100 microsecond timing, very flexible communications and enhanced diagnostic capabilities.

The LDFC is able to process individual return strokes of lightning flashes, calculating, for each return stroke, the peak magnetic field strength, the peak electric field strength, the polarity of the return stroke, the direction of the return stroke relative to the direction finder site, and the absolute time that the return stroke occurred to the nearest $10^{-4}$ second. Over 900 lightning return strokes, each containing the listed characteristics, can be processed by the LDFC per second.

The LDFC has the capability of synchronizing an internal clock to a satellite controlled clock to obtain absolute timing to the nearest $10^{-4}$ second of NIST time. This permits absolute time tagging of each return stroke of a lightning flash to the nearest $10^{-4}$ second of NIST time at the remote direction finder site. In this way, unknown path delays in the communications medium are accommodated and the network controller no longer needs to synchronize the direction finder times. The return stroke data can now be correctly grouped by time so that a Location Processor Device at the operations center can accurately calculate the return stroke locations. The network will not be adversely affected by a low detection efficiency at low flash rates or by multiple direction finders being synchronized separately in a large lightning detection network. Absolute time tagging of the return strokes at the direction finder site also makes it possible to interface multiple lightning detection networks.

The LDFC not only contains sophisticated clock interface hardware necessary to synchronize the LDFC to the nearest $10^{-4}$ second of an absolute time source, but also allows for automatic clock verification (i.e. checking the satellite controlled clock's time to the network time and resetting the clock if incorrect), for internal time adjustments when the satellite controlled clock has failed, and for synchronization of an out of sync LDFC.

In another aspect of the invention, the new LDFC includes an Interface Facility that allows for simultaneous connection between the LDFC and the following:

1. A satellite earth station controller for satellite communications
2. A NIST synchronized clock for accurate time keeping at the direction finder
3. A diagnostic device, e.g. a personal computer, for extensive local checkout of the direction finder's operation
4. A tape device or other data storage unit for local archiving of lightning return stroke information, and
5. A synchronous modem for land-line communications.

Although the LDFC is primarily designed to be run via satellite communications, it can be configured to run on a synchronous polling network, compatible with existent networks, or over both media simultaneously. The LDFC can also run on two different networks (one through synchronous communications, one through satellite communications), allowing one to supply lightning data to two independent networks, without the full cost of an additional direct finder site.

The data storage device, which may be connected to the LDFC, allows for collection of all of the data generated at the specific site and subsequent retrieval and analysis of this data. The local diagnostic device permits the operation of the LDFC to be checked and monitored and also allows communication between a person at the direction finder site and others connected to the network.

In another aspect of the invention, the new LDFC contains extensive data communications capabilities including the ability to process header and reroute messages. These header and reroute messages allow commands or data to be transferred anywhere within the network and the results transferred, once again, anywhere within the network.

The LDFC has many configurable parameters. Parameters for a particular direction finder site are downloaded from the operation center before the LDFC processes lightning return strokes. This allows for customizing each LDFC operating environment before it becomes functional and for subsequent adjustment of parameters as appropriate.

In still a further aspect of the invention, each LDFC maintains statistics on the return stroke data seen at its specific site and extensive tables of internal values used for diagnostic purposes. This information is available to anyone connected to the network. It allows one to monitor how particular sites or the entire network is operating. The LDFC also supports remote screen/keyboard access and control, and software that provides a virtual screen/keyboard to allow screen output and keyboard input to an LDFC which does not have physical display hardware or a keyboard present.

The present invention also contemplates: an advanced watchdog timer circuit that can be programmed to reset the LDFC when data communications cease or the execution of the main routine halts; an auto-switched backup oscillator for internal time keeping of an LDFC; use of hardware switches for initial configuration, and LED's and sounds for LDFC diagnostics; extensive status and diagnostic capabilities; the ability to simulate lightning flashes at a direction finder site and differentiate this data from actual lightning flash data; and modifications to the ADF 80-02 analog direction finder which will allow the counting of enable crossings, make available peak electric field sample and held signals, reduce dead time from 6 milliseconds to 1 millisecond, remotely set and monitor enable and acceptance thresholds, vary test pulser rates, and allow a test pulser flag to be passed to the LDFC to distinguish between real and test stroke data.

BRIEF DESCRIPTION OF THE DRAWINGS

These and other objects, features, aspects and advantages of the present invention will be more fully understood from the following detailed description, when read in conjunction with the accompanying drawings, in which:

FIG. 5 is an illustration showing the information stored about each lightning return stroke in a flash and how the data propagates through the system;

FIG. 10 illustrates a flash display;

FIG. 10A illustrates a stroke display;

FIG. 10B illustrates a flash lock display;

FIG. 10C illustrates a simple Help screen which provides a quick reference to the keyboard commands used by an LDFC;

FIG. 10D illustrates a screen listing error codes;

FIG. 10E illustrates a screen used to monitor the operations of the serial ports of the interface facility of the LDFC;

FIG. 10F illustrates a diagnostic screen used to monitor message buffers;

FIG. 10G illustrates a diagnostic screen used to monitor status and counts with respect to a specific LDFC; and FIG. 11 presents example data useful in explaining a time correction technique of the present invention.

DETAILED DESCRIPTION

Figure 1:
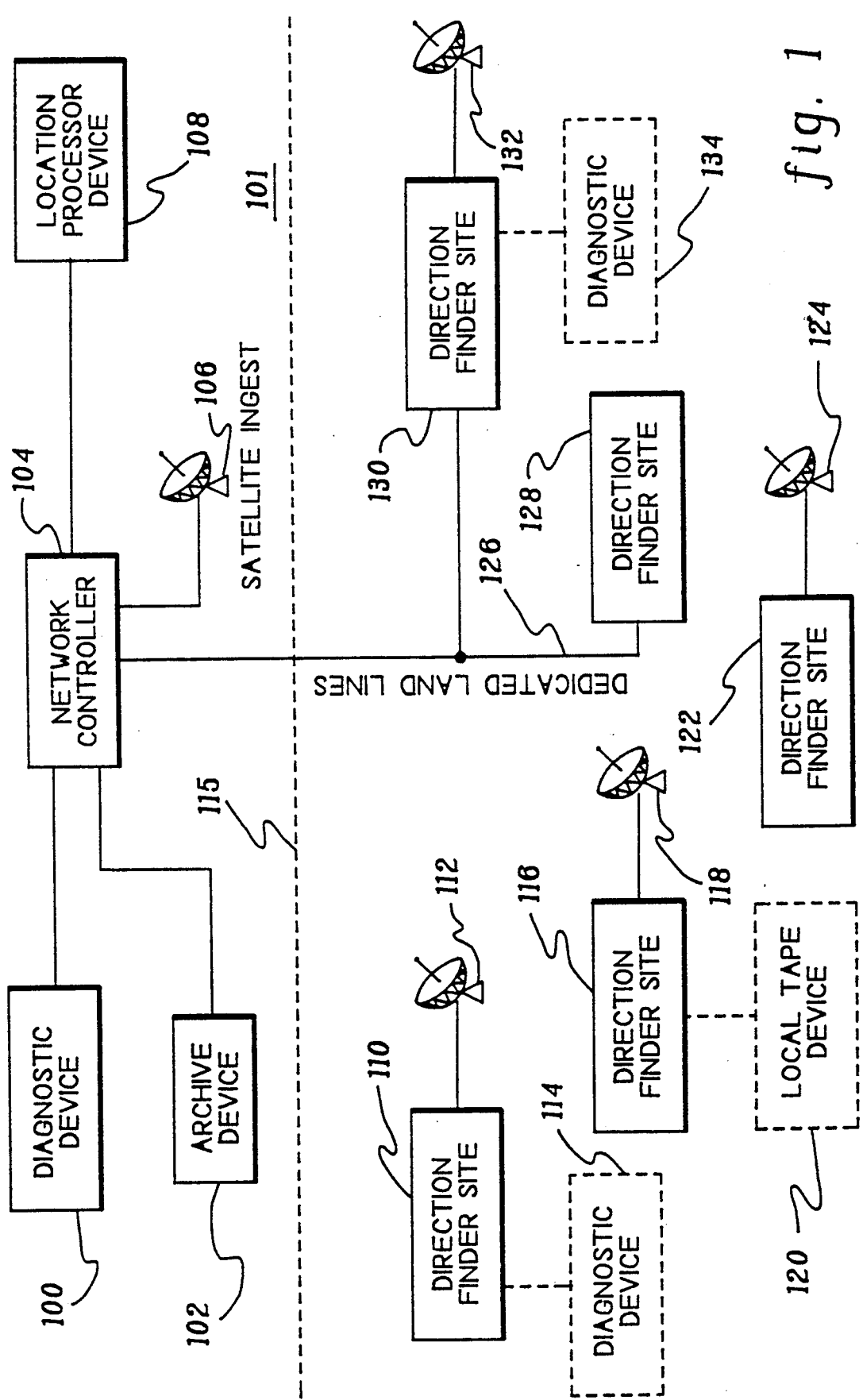
FIG. 1 is a general block diagram illustrating an exemplary lightning detection network containing numerous LDFCs.

The Lightning Direction Finder Controller (LDFC) was designed to replace the DF 80-02 digital unit and directly interface to the ADF 80-02 analog direction finder in a large Lightning Detection Network. A preferred embodiment of the LDFC is described in detail hereinafter but first a general overview is presented.

GENERAL OVERVIEW

Modifications to the Analog Direction Finder Unit

In connection with the implementation of LDFCs in a Lightning Detection Network, certain desirable modifications to the ADF 80-02 analog unit can be made. These modifications include:

(1) Circuit designed to allow for the count of enable crossings.

For diagnostic purposes, this modification helps determine if the analog unit is being falsely enabled by a local noise source. When no lightning is occurring close to the Direction Finder, the enable crossing count should be low. If this is not the case, a local noise source must be present or the ADF 80-02 is behaving abnormally. In either case a site visit is needed to correct the problem. For scientific purposes, this modification provides a means of counting all sources of electromagnetic energy. Most of the counts are related to both intracloud and cloud to ground lightning.

(2) The Peak electric field sampled and held signal is made accessible.

This allows for the determination of the peak electric field (E) to peak magnetic field (B) ratio (E/B) of a return stroke. This is very important when installing a new direction finder site to know if the flat plate antenna, used to measure the electric field, is being shielded. An E/B ratio of 0.5 to 0.8 has been empirically derived to be a nominal value when using a LLP ADF 80-02 Direction Finder.

(3) The dead time has been reduced from 6 milliseconds to 1 millisecond after the detection of a lightning return stroke by changing a resistor value in an RC circuit of the ADF 80-02.

This allows for the detection of lightning return strokes that occur at least 1 millisecond apart from each other.

(4) Both the enable and acceptance thresholds can be remotely set via a digital to analog converter controlled by the Direction Finder.

This allows adjustment of the enable or acceptance thresholds from a remote site (e.g. Network Controller end). If the ambient noise level at a remote Direction Finder site increases, the enable and/or acceptance threshold can be adjusted above the background noise. This will prevent the ADF 80-02 from being incorrectly enabled due to background noise. If the ADF 80-02 is being falsely enabled, its detection efficiency can be lowered significantly. The ability to remotely count enable crossings as described above, allows the operator to determine when the background noise level has increased.

(5) The ADF 80-02 test pulser's stroke rate can now be varied.

One can now flood the ADF 80-02 with simulated lightning return stroke data at variable rates using the modified test pulser circuitry on the ADF 80-02. This diagnostic feature allows for determining the peak return stroke rate that a LDFC can handle when different load conditions are applied. Another use is that it allows the stroke processing rate to be high enough so that the 1 millisecond dead time after a stroke has occurred can be verified.

(6) A signal is made available to distinguish between a simulated test pulser return stroke and a real lighting return stroke.

The tagging of a test pulser flash is extremely important in real-time and archived data processing. In the past, if a field service technician connected the test pulser to an ADF 80-02 and allowed the lightning return stroke data to be passed through the network to the Network Controller, the data would go to the Archive Device and real-time Location Processor Device as if it were real lightning return stroke data. For total system checkout of the ADF 80-02 and LDFC, it is now permissible to send the simulated test pulser data through the network because it is now tagged as test data, and will not be improperly processed by the Archive Device or Location Processor Device.

Summary Of LDFC Hardware

In its preferred form, the LDFC is physically designed around the IBM PC-AT architecture. In the normal operating mode, the LDFC does not have a keyboard, internal static storage medium (i.e. floppy or hard-disk), or video display attached to it, although it does support a keyboard and a display. The software for operation of the LDFC is found on EPROMS. The card cage of the LDFC contains three PC-AT style boards. The first card, a CPU board, is a complete PC-AT mother board on a single plug in board, and the second is an analog to digital board that provides the physical interface to the ADF 80-02. These boards are readily available and can be obtained off the shelf. The third board, called an Interface Facility (IF), is a custom card that has been designed in order to provide the physical interface for the various devices connected to the LDFC. The Interface Facility provides the interface for the following:

1. Satellite communications
2. Bisynchronous communications
3. A communications port for diagnostic checkout of the LDFC via a personal computer
4. A port for local tape storage of the lightning flash data
5. An intelligent interface to a satellite controlled clock (Satellite Clock) for synchronized timing
6. An onboard temperature compensated crystal oscillator that serves as the backup timing clock pulse if the satellite controlled clock malfunctions
7. A watchdog timer circuit designed to meet the CPU, which is programmed by the LDFC such that the reset will occur only as a result of abnormal operating conditions or if data communications to the LDFC have ceased for a configured time period
8. Switch settings providing a hardware ID and configuration setup
9. Light Emitting Diodes (LEDs) used to provide useful diagnostic information to on-site personnel about the operation of the LDFC.

Due to the small bread box size of the LDFC, the above features were integrated onto a single PC-AT style board.

LDFC Return Stroke Processing

The LDFC was primarily designed for a large Lightning Detection Network (i.e. more than 10 remote Direction Finders). It directly interfaces to the LLP model ADF 80-02 analog Direction Finder. When a lightning return stroke occurs, the ADF 80-02 triggers the LDFC via a hardware interrupt. The LDFC responds by reading the digital outputs from the ADF 80-02 and then digitizing the analog peak magnetic field change on both the North-South and East-West antenna loops and the electric field change provided by the ADF 80-02. From this information, it then calculates the azimuth, polarity, total peak magnetic field change, and the peak electric field change of the lightning return stroke. If the LDFC is in time synchronization with NIST time, an absolute time stamp with an accuracy of 100 microseconds will be applied to that lightning return stroke. Tagging the lightning data with an absolute time at the LDFC eliminates the need for the Network Controller to compute the absolute time of the lightning return stroke. This now allows for variable time delay communication protocols (e.g. X.25) or satellite communications as the transport medium between the remote LDFCs and the Network Controller. The ADF 80-02 will also report over range lightning return strokes (i.e. strokes detected that have a large enough peak amplitude that they have saturated the output electronic amplifiers of the ADF 80-02). The LDFC responds to these types of lightning return strokes by only applying an absolute time stamp and marking the stroke as an over range return stroke.

Once a return stroke has been detected, and its direction calculated, the LDFC then tries to group each lightning return stroke within its corresponding flash record. It is impossible to be absolutely sure that the individual lightning return strokes are grouped together with their corresponding flash by using just a single LDFC. This is due to the stroke collecting sector that is implemented when the lightning return strokes are being grouped into flashes. (An explanation of the stroke collection method used with the LDFC is presented hereinafter.) Spatial and temporal resolution are needed to be absolutely sure which strokes belong to which flashes and therefore information from multiple LDFCs picking up the same return strokes must be used. There are several reasons for grouping the strokes into flashes at the LDFC before transmitting the data to the Network Controller, namely:

1. To conform to the method previously used by LLP's model DF 80-02 grouping of the strokes into flashes.

2. To compress the data which must be communicated. Only the delta times of the subsequent strokes in the flash (in the LDFC case, 100 microsecond offset times) need to be transmitted from the LDFC to the Network Controller. This significantly reduces the size of the lightning data packets sent from the LDFC.

3. To simplify the process of correcting the internal time at a LDFC whose satellite controlled clock is not in sync with NIST GOES time code broadcast by a GOES (Geostationary Operational Environmental Satellite) satellite. By examining the delta times between the individual lightning return strokes in a flash record, it is possible to match a flash record reported by a LDFC, which is out of sync, with a flash record reported by another LDFC, which is in sync. Once this is done, one can compare the absolute time difference between the two absolute time stamps each LDFC assigned to its flash record. In doing so, one can determine the exact amount one LDFC is out of sync with another. Once this time is computed, it can be sent to the LDFC which is out of sync as an adjustment time, to bring the internal time of that LDFC back into sync with the rest of the network.

Regardless of the method of grouping of the strokes into flashes at the LDFC, the Network Controller can use the absolute times of each lightning return stroke to compute individual stroke locations from data collected by multiple LDFCs, and then use this information to group stroke records into flash records.

FLASH DATA COMMUNICATION

Once a LDFC has completed collecting the strokes for a flash, the flash data can then be sent to various devices connected to the LDFC. Possible devices include: a Satellite Device, Bisynchronous Device, Tape Device, or one or many Diagnostic Devices. Whether the flash data is sent to the Satellite Device or Bisynchronous Device or both is determined at run time by the settings of an auxiliary dip switch array on the Interface Facility of the LDFC. The Tape Device and Diagnostic Device(s) can be configured during program execution to receive the flash data. If screen output is enabled to either a virtual or physical screen, and the display is in one of the flash display modes, then the stroke data will be displayed as it occurs according to the corresponding flash display mode.

LDFC Time Synchronization

The LDFC has the capability of synchronizing its internal clock to a satellite clock, e.g. an Arbiter Systems Incorporated model 1026C, to obtain absolute timing to the nearest $10^{-4}$ second of NIST time utilizing the timing signals from either the GOES East or the GOES West satellite. The software designed to do this is more fully described in the subsequent detailed description. The three basic tasks performed by the software include:

Clock Command Processor (Asynchronous Communications)

The software configures the satellite clock with parameters which control how the clock will operate, by sending messages to the satellite clock through a serial port. The software also continually interrogates the satellite clock to determine its operational state. This is used to detect problems. The approximate time (within 1 second of NIST) is also retrieved from the satellite clock via async communications.

On-Time Interrupt Routine (NIST Synchronization)

The satellite clock also provides a pulse output which is triggered once a second every second in sync with NIST time. The syncing routine at the LDFC is executed once every second from this triggered pulse, and is responsible for adjusting the internal time at the LDFC so that it is the nearest $10^{-4}$ second of NIST time.

Diagnostic Checks/Recovery Routines

The LDFC also maintains surveillance over the satellite clock. It monitors indicators regarding how accurate the clock time is, and uses these indicators to assign a time quality rating of how accurate the LDFC's internal time is. It also maintains a table of times when the time quality has changed at a LDFC, and reports time quality changes to the Network Controller.

The LDFC detects when communications have failed between the satellite clock and the LDFC. It will then either issue a serial BREAK signal to the satellite clock to reset the clock's communications port, or, issue a power reset to the satellite clock, forcing the clock to reset.

The LDFC determines when the satellite clock has determined an invalid time, by checking the time received from the clock with the current time from the Network Controller. If the two times are not within some acceptable tolerance level of one another, the LDFC will reset the satellite clock, forcing the satellite clock to resync it's internal time with NIST time.

The LDFC can also disable the satellite clock routines altogether when one has determined that the satellite clock has completely failed. At this point the LDFC time may be remotely adjusted by some other device in the Lightning Detection Network to bring its time in sync with NIST time.

LDFC Communication Networking Capabilities

The LDFC contains built in functions that provide for very flexible networking capabilities in the form of Reroute/Header messages. These Reroute/Header messages allow data to be transferred anywhere within the network to any other point in the network and the results from processing the message to be transferred—once again—to any point in the network.

A LDFC is able to accept messages from one device, and then according to the routing information at the head of the message, route the remainder of the message to any of the devices connected to the LDFC (Reroute message).

A LDFC is able to accept messages to be processed which specify their own destinations, and header bytes. The LDFC responds to these messages by sending a message consisting of the specified header bytes and the results from the portion of the message that the LDFC processed to the devices which were specified to receive the results (Header message). This enables a Diagnostic Device to interrogate a LDFC from any point in the network, and a way to route the LDFC response back to the Diagnostic Device.

The Reroute/Header messages also allow for the creation of messages which can be sent to multiple devices throughout the network allowing each device to do something, and append the results to the end of an ever-growing response message. Once the message has been processed by all desired devices, the results can then be returned to the originator of the message (Header message with Tails).

In implementing these communication networking capabilities, the following qualities are met by the LDFC code:

The primary purpose of a LDFC is to collect data, and as such, the communications networking scheme added to a LDFC should not interfere with its data collection. The LDFCs do not have much RAM/ROM space for storing the code which is executed while they are running, so the addition of networking capabilities must require minimal amounts of additional code. The Reroute/Header solution provides a means for remote diagnostics to LDFCs and communications between personnel in the network with minimal impact on LDFC design or performance.

Virtual Screen/Keyboard

The LDFC software provides a remote virtual screen and keyboard accessibility so that a LDFC's screen can be viewed and controlled from any point in the network.

Normally a screen display on a PC requires a display adapter card and a monitor. The actual output to the screen is performed by updating a specific memory area which controls what text and attributes are displayed by the video adapter. The LDFC is able to perform all of its video output to any memory address instead of the memory address of the video adapter (if the video adapter is not present). The contents of the memory area which the LDFC uses for its 'display' can then be transmitted to an external device. This provides a means for every LDFC to perform screen output (a virtual display) without the expense/presence of a display adapter card and monitor.

All of the keyboard commands which are processed by the LDFC (such as the alt-S key to enable stroke simulation) can be executed by messages as well as by actual keystrokes. This allows one to enter keyboard commands from remote devices even if the LDFC does not have a physical keyboard, thus providing a virtual keyboard. This eliminates the need/cost of having a keyboard at a LDFC.

LDFC Parameters

The LDFC has to be downloaded with its particular parameter table before it can process data from lightning return strokes which are detected. This allows for customizing each LDFC's operating environment before it becomes functional.

It is possible for a LDFC to have errors or other problems with its detection of lightning return strokes. Some of the associated problems/errors can be corrected by configurable parameters in the LDFC parameter table.

Parameters which filter out which lightning return strokes the LDFC will send back to the Network Controller are also configurable. These filters work by requiring negative discharges to be above some configurable threshold level, and the positive discharges to be above another configurable threshold level.

If the LDFC has its direction finding antennae out of alignment, all directions reported by the LDFC will be off by a constant number of degrees. This error can be corrected by setting the rotational parameter such that it will rotate the fixed error back to it's proper alignment. For example, if a LDFC is reporting all of its direction vectors $-10$ degrees off from where other LDFCs are putting the location of the lightning, one can configure the LDFC which is out of alignment to add $+10$ degrees to all of the direction vectors it computes. This will bring the LDFC back in alignment with the rest of the Lightning Detection Network.

Switches in the parameter table which control whether over range, simulated, test pulser, or weak strokes are enabled or disabled to be sent back to the Network Controller are also present in the parameter table.

The way in which the LDFC groups individual lightning return strokes into flash records is also controlled by the parameter table. Control is provided to restrict the grouping of individual lightning return strokes with respect to the direction deviation from the first return stroke in a flash. One may also configure the amount of time to wait for additional lightning return strokes from the point in time when the first lightning return stroke of the flash occurred. A sample configuration might, for example: Restrict the grouping of individual lightning return strokes to those that deviate within $+1$ degree and $-1$ degree in direction from the first lightning return stroke in the flash and that occur within 1000 milliseconds of the first stroke.

ADF 80-02 Operational Parameters

It is possible to control the operation, and adjustments made to the ADF 80-02 by values configured in the parameter table.

The A/D adjustment table is a table of 8 entries used to make corrections to the digitized readings from the ADF 80-02. It allows adjustments based on the polarity of the flash, the ratio of the N/S signal to the E/W signal, and the gain mode used by the ADF 80-02 when the lightning return stroke was detected.

The enable and acceptance threshold voltage levels used by the ADF 80-02 for invoking its waveform discrimination circuitry are also set in the parameter table of the LDFC. These parameters are used to eliminate artificial lightning return strokes which may occur due to local noise sources.

The LDFC also has the ability to disable its ADF 80-02 device altogether. Though in doing so, the LDFC will be unable to detect any lightning. This is only done when the ADF 80-02 is streaming invalid data into the LDFC either due to local noise sources that could not be filtered out, or a failure of an ADF 80-02 unit.

Clock Parameters

Parameters which control the clock and affect the way in which time quality is determined at the Direction Finder site are also stored in the parameter table.

The latitude and longitude of the LDFC location are stored in the parameter table. The LDFC uses this to verify and/or correct the latitude and longitude values stored in the satellite clock. These values are important to the satellite clock in order for it to get the correct time from the GOES satellite.

The duration which the satellite clock will wait after it loses sync with the GOES satellite prior to notifying the LDFC can also be configured in the parameter table.

The initial satellite which the satellite clock will attempt to tune to (GOES EAST or GOES WEST), is also programmed into the parameter table. This was done since some locations have better reception of the timing signals from one satellite as opposed to the other.

The LDFC can also be programmed to disable it's satellite clock timing routines all together. This would only be done in the case where the satellite clock was determined to have failed, and one was able to remotely adjust the time at the LDFC such that it is in sync with the rest of the sites in the Lightning Detection Network.

The LDFC can be configured to send a message to the Network Controller whenever its internal time quality changes. This allows one to have a record when a LDFC loses or regains time sync with NIST time.

The parameter controlling the number of minutes to wait for the satellite clock to acquire time synchronization with one specific GOES satellite before changing its tune mode to the opposite GOES satellite is also configurable.

The internal delay parameter of the satellite clock is also downloaded to the LDFC, so that the LDFC may verify that the satellite clock has the correct internal delay, or correct the satellite clock delay if it is determined to be bad. The internal delay is used by the satellite clock for internal time corrections so that the time deviation is minimized when the clock is synchronized to NIST time.

General Operating Parameters

Both the ID number and the 2 character ASCII ID of the LDFC in the Lightning Detection Network are stored in the parameter table.

The CPU clock speed for the LDFC to operate under is also stored in the parameter table. This parameter controls whether the high speed clock rate or low speed clock rate is used to drive the CPU. Switches which control what sounds are enabled, and how they are enabled are also controlled by an entry in the parameter table. One may configure a LDFC to play 'tunes' when special events occur (such as a phone-ring sound when a message is received). One may configure the LDFC to beep every time a lightning return stroke is received, and the beep issued can be configured to vary in frequency with respect to the signal strength of the stroke. In addition, all sounds may be disabled at a specific site.

The maximum number of flash messages that the LDFC is allowed to buffer may also be configured.

STATUS AND DIAGNOSTIC CAPABILITIES

Lightning Data Status

A table of directions of where lightning return strokes are occurring with respect to the LDFC is maintained by the LDFC. This information can be used to look for holes (blind spots) in the detection efficiency of a LDFC.

Counts of flashes, strokes, and ADF 80-02 enables at the site are also maintained. A site which has a large enable to stroke ratio indicates a lot of local 'noise'.

The E/B (Electric Field Reading/Magnetic Field Reading) ratio is averaged and maintained for all strokes detected by the site.

Counts of bad ADF 80-02 interrupts, missed interrupts, stroke buffer overflows, over ranges, weak strokes, etc. are also maintained by the LDFC.

Time Synchronization Status

The LDFC counts the number of times which the LDFC had to sync its internal time with the time at the satellite clock. This occurs when the satellite clock resynchronizes its own internal time with NIST time, or when the LDFC finds that it's internal time has deviated from the time at the satellite clock.

The number of times that the LDFC's internal time was off by 100 microseconds from the time at the satellite clock is also maintained. Counts regarding the number of times the LDFC was slow by 100 microsecond and the number of times the LDFC was fast by 100 microsecond are also maintained in order to determine the general drift direction of the LDFC's internal time.

The number of times that the satellite clock failed to respond to a message from the LDFC is available, as is the number of serial BREAKS issued by the LDFC in an attempt to restore serial communications to the satellite clock. The number of power resets issued by the LDFC to the satellite clock in order to resume normal communications, or to force the satellite clock to resync its time with NIST, and the actual number of power resets reported by the satellite clock are also maintained.

A record is also kept of the total number of signal strength readings which the LDFC has received from the satellite clock, the sum of those readings and the average. The minimum and maximum values of the satellite clock signal strength readings are also maintained in order to determine signal strength fluctuations. This information can be used to determine how well the satellite clock antennae is aligned, or if there exist external noise sources which cause large fluctuations in the signal strength of the timing signals from one of the GOES satellites.

Error counts such as the number of general communications errors at the satellite clock, the number of calibration errors, and the number of oscillator errors are also maintained. The LDFC keeps track of the number of times and the last time its internal time was in sync with NIST time. It also keeps track of how long the LDFC has been in sync.

The LDFC keeps track of the last time its internal time lost sync with NIST time. It also keeps track of how long it has been out of sync. If the LDFC loses sync with NIST time, the LDFC will keep track of how much time is left until its internal time will be assumed to have drifted so much that its time is no longer accurate enough to properly time tag the lightning data. Once this point is reached, the time at which the point was reached will be saved so one may determine the last time this particular state occurred.

The LDFC keeps track of the current delay setting at the Satellite Clock. If this delay setting is different from the one stored in the LDFC parameter table, the LDFC will bump a bad delay counter, and send the correct delay to the Satellite Clock.

The LDFC keeps track of errors which occur due to communications with specific devices. These error counts are available to external devices so they may be analyzed in order to determine if there may be a problem with communications between the LDFC and one of its devices. Counts are also maintained with regard to how busy the communication devices are at the LDFC.

General Operation Status

The current, minimum and maximum temperature at a LDFC is monitored, so that one may determine if an air conditioning unit or heater unit needs repair.

The current, minimum, and maximum voltage measurements of the ADF 80-02 power supply are maintained, so that one may determine if the ADF 80-02 power supply has failed or is acting sporadically.

The software version is kept by the LDFC so that external devices may determine what commands the LDFC is capable of processing.

The duration that the LDFC has been up and running since it last rebooted is maintained in order to determine how reliable the communications are, or if power has been disrupted to the LDFC.

The duration since the current counts at the LDFC have been zeroed is maintained so that one may determine the time period over which the LDFC acquired its current count values. This information is used to compute rate changes of variables in question. For example, one can compute the average rate at which the ADF 80-02 unit is being enabled by dividing the enable count by the duration of time since it was last zeroed.

The current and maximum load on the LDFC due to external interrupts is kept so that one may approximate how much work the LDFC CPU is doing.

Pointers and counts associated with each external device with regards to the message buffer are maintained. The ability to go into the message buffer and examine messages which have been processed by the LDFC in order to determine what has happened at the LDFC is also possible.

Detailed Description of Preferred Embodiment
Network Configuration

The construction and operation of a preferred embodiment of the LDFC of the present invention will now be described in detail, beginning with the hardware and then followed by a description of the software. In operation, of course, the hardware and software are integrated to realize the full benefits of the invention.

First, the physical configuration of a typical Lightning Detection Network utilizing the LDFC of the present invention, is presented. Referring to FIG. 1, a lightning detection network 101 is shown, consisting of five exemplary remote direction finder sites 110, 116, 122, 128, 130, and a Network Controller 104 with associated equipment which can be located at an operations center. The number of direction finder sites in a network may, of course, vary from that illustrated. Each site is equipped with a LDFC.

Two different methods of data ingest to the Network Controller 104 from the LDFCs are illustrated. The LDFC supports satellite communications, e.g. via dish antennae 112, 118, 124, and 132, and synchronous communications, e.g. over dedicated land lines 126, at the direction finder sites. An LDFC as shown at direction finder site 130, may have both a synchronous and satellite connection so that data may be broadcast to the Network Controller 104 by either or both methods.

Diagnostic Devices, typically a personal computer, e.g. 114, 134, and 100, may be connected to the corresponding LDFC at Direction Finder sites, e.g. 110 and 130, or to the Network Controller 104, respectively. A Diagnostic Device's main use is for system checkout at a particular Direction Finder site. With the built in networking capabilities in each LDFC, a Diagnostic Device, e.g. 114, has the ability not only to perform a system checkout of the associated Direction Finder site, i.e. 110, but any other Direction Finder site, e.g. 116, 122, and 130, that is connected via satellite or direction finder site, e.g. 128, that is connected via dedicated land lines 126 using synchronous communications. Also, for example, Diagnostic Device 134, has the ability to simultaneously carry on message passing or file transfer between Diagnostic Devices 114 and 100. A detailed explanation of the communications networking capabilities of the LDFC is presented later. The LDFC also supports a local data storage device; for example, the LDFC at Direction Finder site 116 is shown with a local tape storage device 120 connected.

The Network Controller end of network 101 is shown above broken line 115 in FIG. 1 and includes:

1. Network Controller 104 designed to handle all data ingest and networking of the lightning data.

2. Location Processor Device 108 designed to determine the ground locations of the lightning data being ingested.

3. Archive Device 102 designed to handle the storage of all lightning data collected at the remote Direction Finder sites including all their status indications and counts.

4. Network Diagnostic Device 100 designed to provide the status of the Lightning Detection Network as a whole or of an individually selected Direction Finder site.

These components at the Network Controller end of network 101 do not form part of the present invention and are, therefore, not described in detail herein. They are presented only to help facilitate the detailed description of the present invention.

LDFC HARDWARE OVERVIEW

Figure 2:
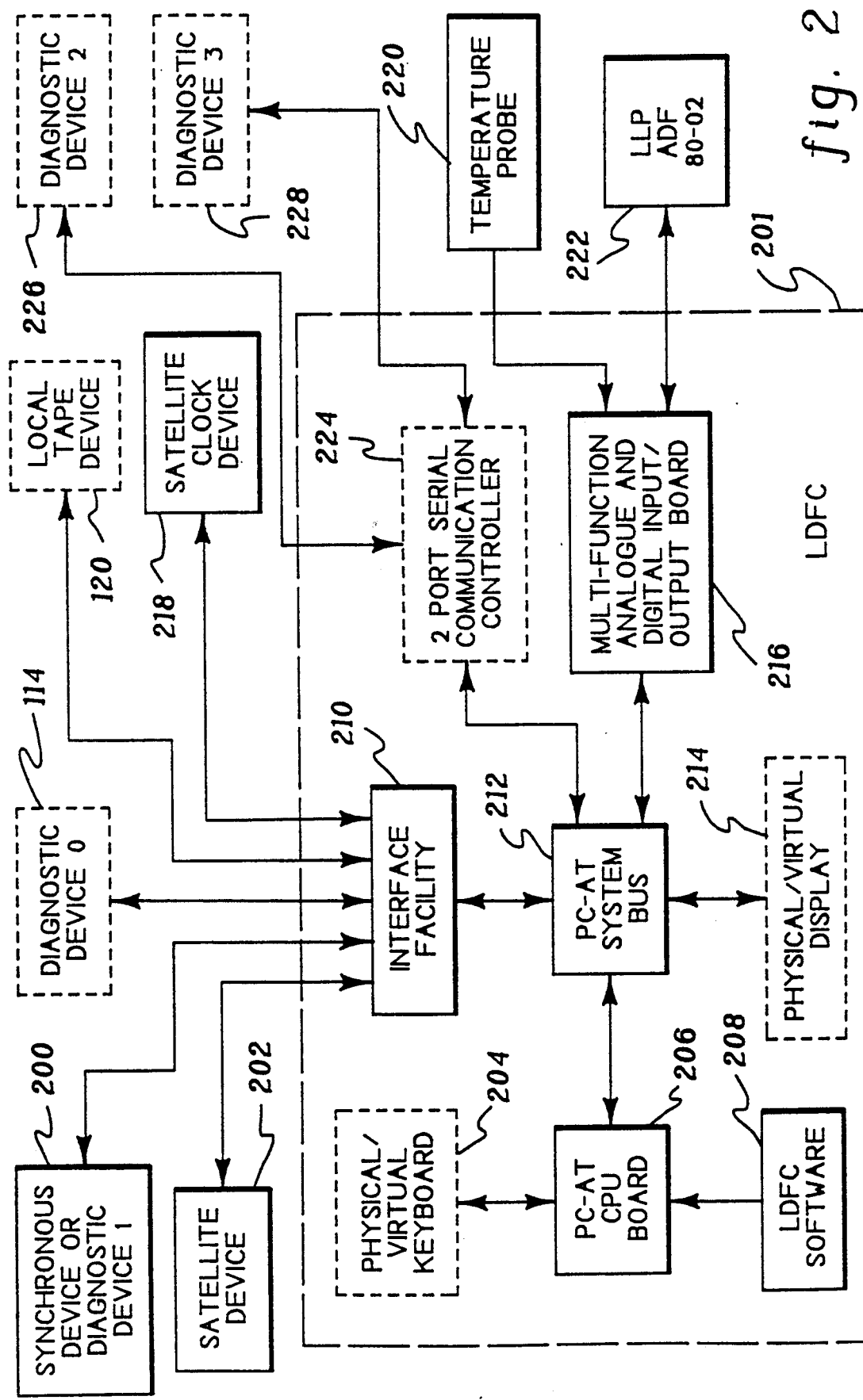
FIG. 2 is a block diagram of an LDFC and associated equipment at a direction finder site, in accordance with the present invention.

FIG. 2 presents a zoomed in view of a Direction Finder site displaying a configuration that a LDFC can presently be equipped with. Solid boxes designate the typical configuration while the dashed boxes indicate additional optionally connected equipment. Arrow heads indicate the flow of data between the devices or instrumentation. The LDFC 201 is preferably designed around a PC-AT bus 212. A typical configuration includes three PC-AT style plug in boards, namely a CPU board 206, a custom designed Interface Facility board 210, and a Multifunction Analog and Digital Input/Output board 216. The CPU board 206 is a complete PC-AT mother board on a single card typically running an Intel 80286 microprocessor at 10 or 12 Mhz, although an Intel 80386 or equivalent could also be used. The LDFC software 208 resides on two 64 kilobyte EPROMs located on the CPU board 206. At the start of the program, a complete copy of the LDFC software 208 is copied to an allocated section of RAM on CPU board 206. Program execution is passed to the start of the LDFC code in the RAM area. Program execution occurs mostly out of RAM rather than EPROM for three basic reasons:

1. Execution of code is faster in RAM than it is in EPROM.

2. The use of local variables referenced in the code segment.

3. In order to download code patches, the code must be in RAM.

The LDFC makes use of keyboard 204 entries for operation of different displays or diagnostic modes. The keyboard 204 can either be a physical or virtual device. For a virtual keyboard 204, the scan codes of the keyboard are passed to the LDFC either through the Interface Facility 210 or the 2 port serial communications controller 224. The LDFC then processes the scan code as if it was typed on a physical keyboard connected to the LDFC. The virtual keyboard concept is extremely useful for remote diagnostic operation.

A physical or virtual graphics display adapter 214 is also supported by the LDFC. Text mode on the MDA (Monochrome Display Adapter), CGA (Color Graphics Adapter), EGA (Enhanced Graphics Adapter), or VGA (Video Graphics Array) may all be used. An attribute table can be configured in the LDFC for the different types of display adapters (i.e. the monochrome or color display adapters). The LDFC displays most of its status, counts, and diagnostic indicators on its screen 214. Therefore the use of the virtual screen at a remote location will provide more information about a particular Direction Finder site than any other status command. The virtual display 214 implementation is composed of main memory on CPU board 206 allocated at run time. The allocated virtual display memory mimics a physical display adapter when in use.

LDFC INTERFACE TO ADF 80-02

Figure 2A:
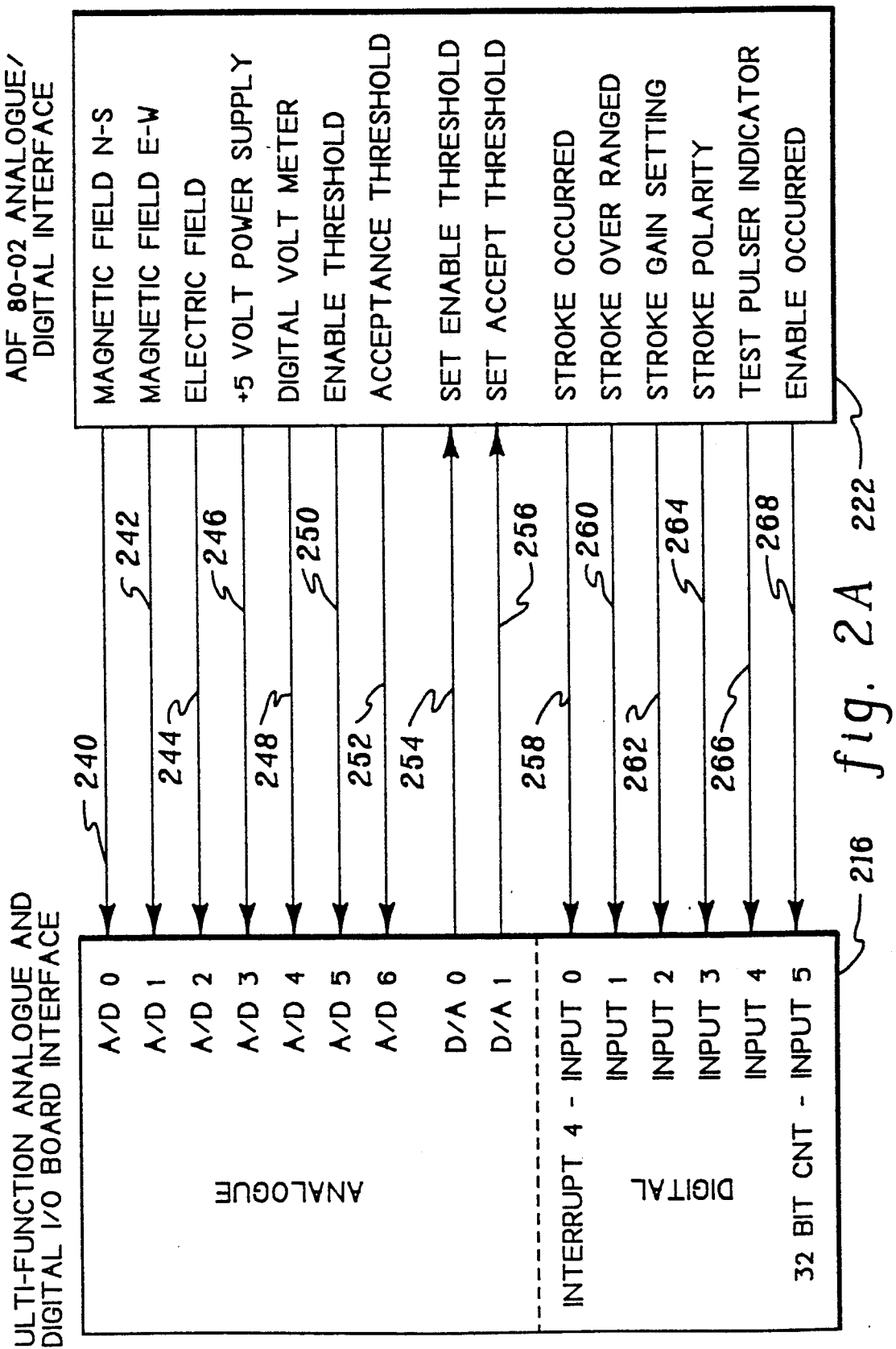
FIG. 2A is a diagram illustrating the interface between an ADF 80-02 analog direction finder and an LDFC.

The LDFC's interface to LLP's model ADF 80-02 analog Direction Finder 222, is through a commercially available Multifunction Analog and Digital Input/Output board 216 (e.g. model DAS-16F available from MetraByte Corp. of Taunton, Massachusetts). As illustrated in FIG. 2A, the ADF 80-02's magnetic field North-South and East-West analog signal outputs 240 and 242, respectively, and the electric field output 244 are each coupled to a corresponding analog to digital converter on the Multifunction Analog and Digital Input/Output board 216. The digitized peak magnetic field components along with the polarity of the lightning return stroke, signal 264, provide the necessary information for determining the direction to the stroke. When the ADF 80-02 determines that a stroke has occurred, it provides a signal 258 to the LDFC via digital input 0. This input is coupled through interface circuitry on the Multifunction Analog and Digital Input/Output board 216 to an interrupt on the PC-AT bus 212. This interrupt signals the return stroke interrupt routine to process the information from the ADF 80-02 on the stroke. Both the internal gain setting 262 and polarity 264 of the return stroke are provided by the ADF 80-02 at the time the ADF 80-02 signals that a stroke has occurred. The LDFC needs to know what internal gain setting 262 was applied by the ADF 80-02 when it sampled and held the peak incoming return stroke electromagnetic radiation so that correct digitization of the peak magnetic field components and peak electric field signal can be determined. The polarity 264 of the return stroke is used to both determine the charge that is lowered to ground by the stroke and also remove the ambiguity of determining direction to the stroke for both positive and negative return strokes. A digital input 260 is also provided by the ADF 80-02 for determining if the return stroke that has just occurred has caused the ADF 80-02 to over range. If the stroke has over ranged, the LDFC will only store the absolute time of the return stroke, no other characteristics of the stroke will be saved. The enable 254 and acceptance 256 thresholds can be remotely set by digital to analog converters on the Multifunction Analog and Digital Input/Output board. The enable threshold is the minimum voltage level that the incoming signal needs to exceed in order for the ADF 80-02 to start processing the signal. The acceptance threshold is the minimum voltage level that a positive return stroke needs to exceed in order to be accepted. The ability to remotely set the enable threshold 254 allows the ADF 80-02 to compensate for changing background noise levels at a particular Direction Finder site. If a Direction Finder site's background noise level has increased, causing too many false enable events to occur, the enable threshold 254 can be adjusted above the noise level causing the false enables to be minimized. Two analog to digital converters are used to read back the current values of the enable 250 and acceptance 252 thresholds. These digitized values provide a level of confidence that the enable 254 or acceptance 256 thresholds are set correctly. The number of enable events that occur are counted by the LDFC from the enable occurred digital output 268. A modification was made to the ADF 80-02 to allow for the counting of enable crossings. A one shot monostable multivibrator with a period of 1 millisecond is triggered for every enable that occurs, therefore providing a count with a minimum time of 1 millisecond between crossings The LDFC combines a 16 bit channel counter and a word in main memory to make up a 32 bit counter for the enable events. The enable crossing count 268 provides the necessary information to determine if the background noise level at a Direction Finder site has changed. During periods of no lightning activity, the enable crossing count at a Direction Finder site should be relatively low (i.e. 2 or 3 per minute). If this is not the case, the enable threshold 254 should be set to a value that minimizes the false enable crossings. The digitized peak magnetic field components and electric field are also used to form a ratio of the electric field to magnetic field (E/B ratio). An E/B ratio between 0.5 to 0.8 has been empirically derived to be a nominal value for a correctly installed ADF 80-02. This ratio should remain constant for a particular direction finder site. If the ratio starts to decrease over a period of time at a direction finder site, it most likely indicates a shielding of the electric flat plate antenna. Service at the direction finder site will be needed. Two diagnostic analog signal outputs are provided by the ADF 80-02. The first is the +5 volt output 246 of the ADF 80-02's power supply. Knowledge of this voltage level insures that the ADF 80-02 is at least plugged in and turned on with the voltage at the output of its power supply. The second is a convenient digital volt meter output 248 that can be used for measuring various voltages on the ADF 80-02 circuit boards. An additional modification was made to the ADF 80-02 so that when the test pulser on the ADF 80-02 is plugged in, a signal 266 on the test pulser indicator will be present. The test pulser provides test signals to be applied at the antenna input of the ADF 80-02 that simulate real lightning return strokes so that the ADF 80-02 can be calibrated. Knowledge of the presence of the test pulser, allows for the tagging of the return strokes as test strokes. The test return stroke data can then be sent through the network to the Network Controller 104 and archived at archive device 102 with an appropriate identification as test data. During real-time or historical processing of the lightning data, the real data can now be distinguished from test data.

TEMPERATURE PROBE INTERFACE

Referring again to FIG. 2, the temperature in degrees Celsius is constantly monitored inside the instrumentation shelter, which houses the direction finder electronics, by a commercially available temperature probe 220. The output of the temperature probe is connected to an analog to digital converter on the Multifunction Analog and Digital I/O board 216. Knowledge of the temperature inside the instrumentation shelter is used to determine if the heater or air conditioner is malfunctioning.

Interface Facility

The Interface Facility 210 is the heart of the LDFC's communications interface to the outside world. All data sent back to the Network Controller 104 through satellite device 202 or synchronous device 200 passes through the Interface Facility 210. Data is also transmitted between the LDFC and a local tape device 120, diagnostic device 114 and satellite clock device 218 through Interface Facility 210. The Interface Facility was specifically designed for the LDFC, although it could very well be used as a communications controller in other data collection devices designed around the PC-AT. The Interface Facility's physical structure consists of a four layer half height printed circuit board designed around the PC-AT bus.

Figure 3:
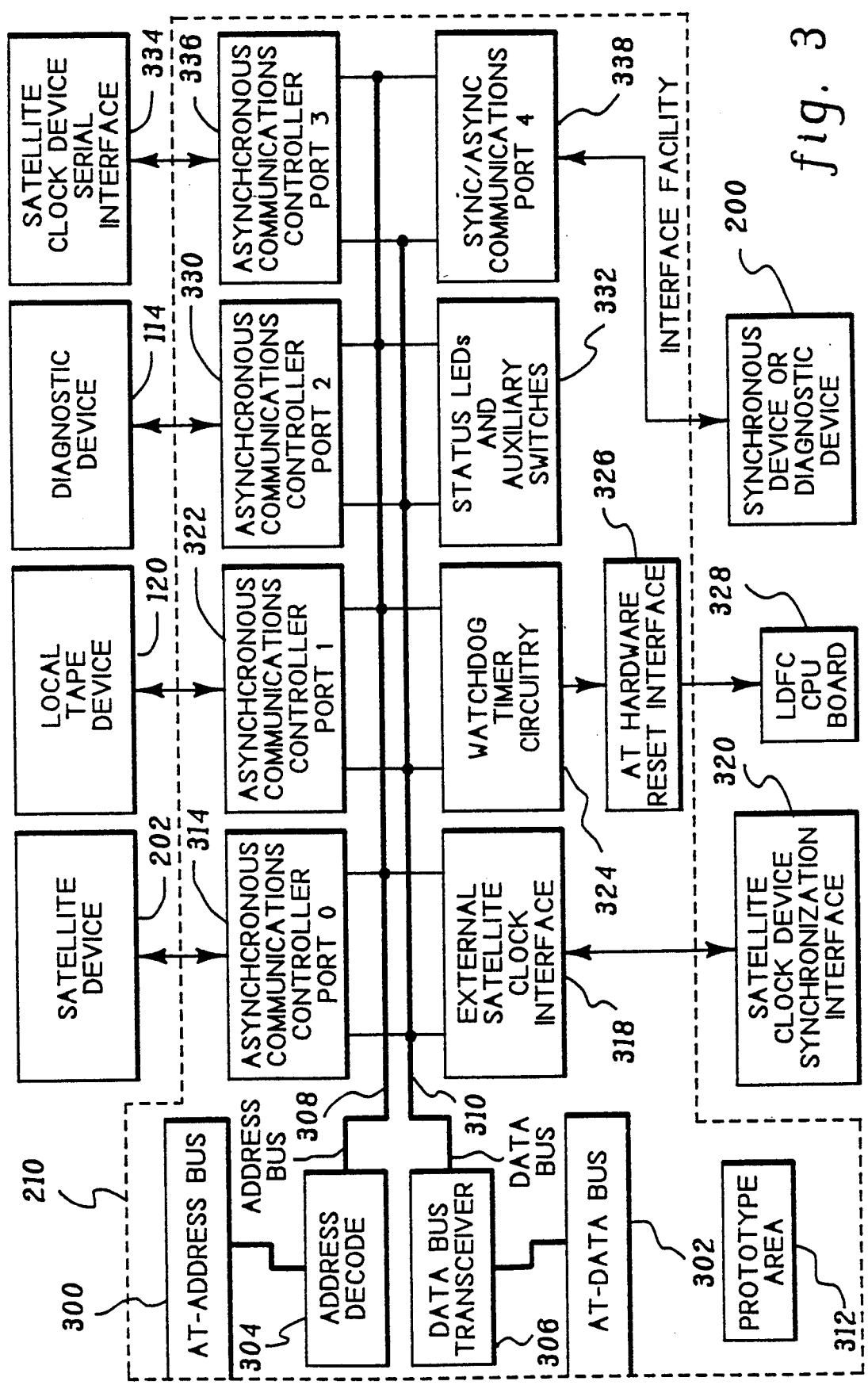
FIG. 3 is a block diagram of the Interface Facility of the LDFC of the present invention.

Referring to FIG. 3, access to any one of the functions on the Interface Facility requires the placement of the proper address on the PC-AT address bus 300, which then gets decoded by the address decode logic 304. Data sent to or received by any one of the functions has to pass through the data bus transceivers 306, and the PC-AT data bus 302. There are five independent serial communication controllers on board the Interface Facility. Communication controllers 314, 322, 330, and 336 are composed of two Intel 8274 Multi-Protocol Serial Controllers (MPSC). Each 8274 contains two independent serial channels. The 8274 was chosen for use to reduce the LSI chip count on board the Interface Facility. The 8274's are configured only to support asynchronous serial communications. The fifth communication controller 338, an Intel 8251A, was primarily used to support synchronous communications over a dedicated lease line 126 back to the Network Controller 104. One of the auxiliary dip switches 332 serves as a toggle for switching between synchronous or asynchronous serial transmission for this communications controller 338. The devices 202, 120, 114, 218 and 200 connected to the communication controller ports, as shown in FIG. 2 and FIG. 3, make up the default configuration at a LDFC. The Interface Facility provides the physical hardware synchronization interface 318 to a satellite controlled clock 320 so that absolute time synchronization of the LDFC with respect to NIST time can be accomplished with 100 microsecond accuracy. See the subsequent detailed description on 'Satellite Clock Hardware Interface' for an in depth discussion of this feature.

A programmable watchdog timer 324 is also designed within the Interface Facility. The typical programming mode of the watchdog timer will result in the reset of the LDFC's CPU via the hardware reset interface 326 if an abnormal operating condition exists, or if communications to the LDFC terminates for a predetermined time period. The use of a watchdog timer is essential for remote unmanned operations, so that in the event of a program crash, the system automatically resets itself. This alleviates the need for a field technician to make a service call to reset the system, which is usually costly and leads to long periods of down time. A detailed description of the watchdog timer can be found under the later sections entitled 'Watchdog Timer Hardware Interface' and 'Watchdog Timer Software Interface'.

The Interface Facility provides the LDFC with a hardware ID, and also an array of switches 332, which are used for initial configuration. A bank of ten LEDs are used on the Interface Facility for diagnostic purposes or describing different operational modes of the LDFC. The Interface Facility also provides an area 312 for prototype design so that modifications to the board can be made.

Referring back to FIG. 2, the LDFC's software 208 also provides for the addition of a 2 port serial communication controller 224. This PC-AT style board is a standard communications board used with PC-AT systems and is commercially available from many vendors. The use of the communications controller board 224 allows for the addition of two more diagnostic devices 226 and 228 or external data collection devices that need to send their data back to the Network Controller 104.

Satellite Clock Hardware Interface

Figure 4:
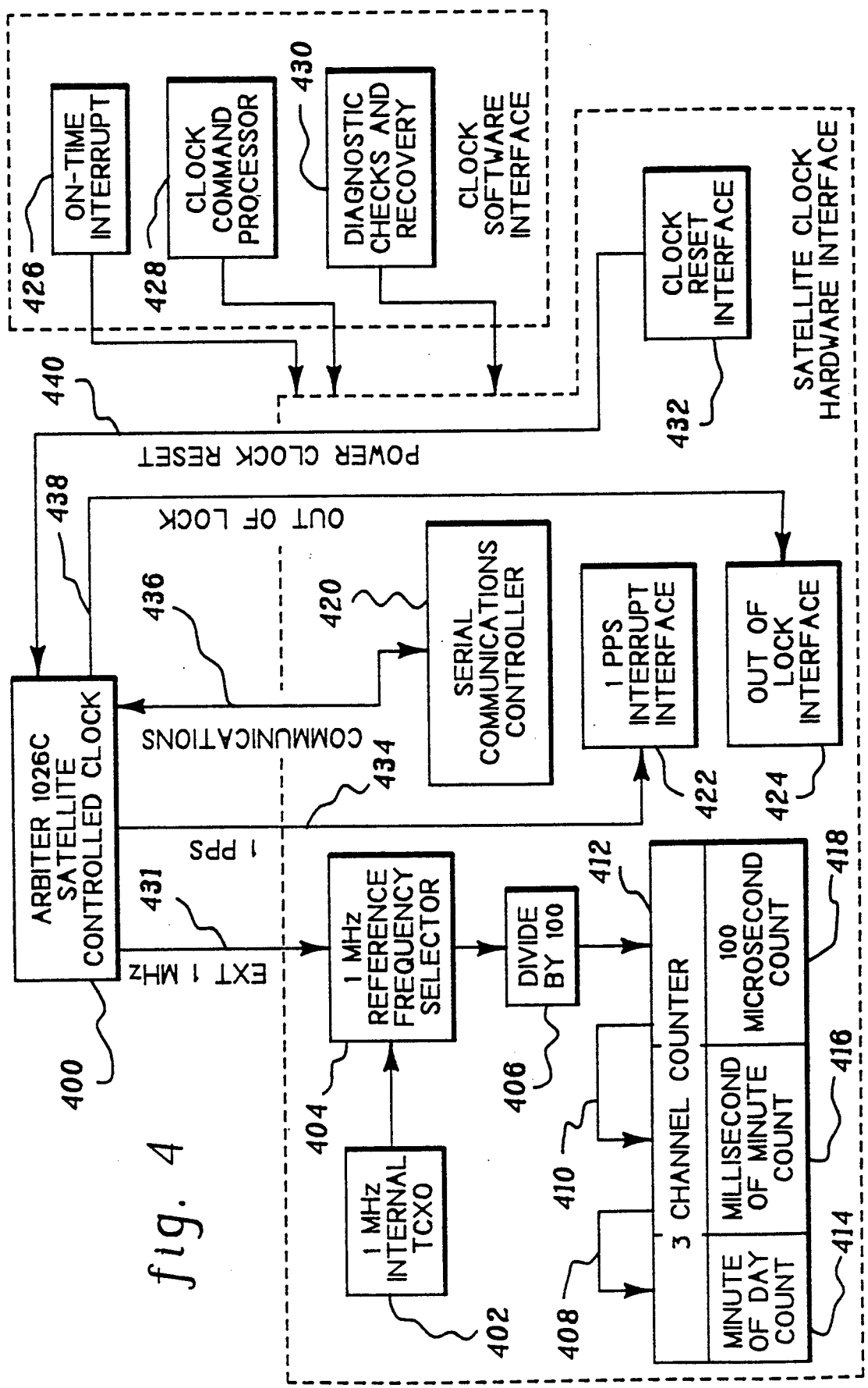
FIG. 4 is a block diagram of the timing interface of the LDFC.

FIG. 4 illustrates the physical hardware interface of the satellite controlled clock (Satellite Clock) 400 to the Interface Facility. The GOES satellite controlled clock chosen to interface to the LDFC is manufactured by Aribiter Systems, model number 1026C. When in synchronization with the GOES satellite, the 1026C has an accuracy of 100 microseconds with respect to NIST time. In order to synchronize the LDFC with the 1026C, multiple interconnections 431, 434, 436, 438, and 440 have to be made between the LDFC and the 1026C, which are all described below. A stable 1 Mhz reference frequency 431 is supplied by the 1026C for clocking the internal 3 channel counter 412 on the Interface Facility. The reference frequency 431 is accurate to better than one part in $10^8$ when the 1026C is in synchronization with the GOES satellite. If the 1026C is out of sync, the accuracy of the reference frequency 431 drops to 1 part in $10^7$. If the 1026C's reference frequency 431 fails, an automatic switch is made by selector 404 to a 1 MHz temperature compensated crystal oscillator (TCXO) 402 on board the Interface Facility which provides the reference frequency to the 3 channel counter 412. It is very important to have the internal TCXO reference frequency backup 402, because if the 1026C Satellite Clock 400 does fail, the LDFC's lightning data can still be used with the degraded epoch information. The accuracy of the TCXO 402 is good to 1 part in $10^6$. Hence, there are three different reference frequency stabilities associated with the Satellite Clock interface. The output of the 1 MHz reference frequency selector 404 feeds the divide by 100 circuit 406, so that a 10 KHz reference frequency is used to clock the 3 channel counter 412. The purpose of the divide by 100 circuit 406 is to provide a timing resolution of 100 microseconds. This is because the maximum accuracy that the 1026C clock 400 can achieve using the GOES Satellite Clock system respect to NIST time is to the nearest $10^{-4}$ second. The 3 channel counter 412 is composed of an Intel 8254 Programmable Interval Timer, which contains 3 independent 16 bit counters. The 10 KHz reference frequency clocks the 100 microsecond counter 418. When the 100 microsecond counter 418 reaches its terminal count, it then clocks the millisecond of the minute counter 416 via a cascaded connection 410. Similarly, when the millisecond of the minute counter 416 reaches its terminal count, it then clocks the minute of the day count 414 via a cascaded connection 408. When counters 414, 416 and 418 reach their terminal counts, they are automatically reinitialized to their starting values. The LDFC's clock software actually uses the 3 channel counter 412 as a very stable free running clock. Instead of using a very tedious procedure which adjusts each counter on the 3 channel counter 412 to its corresponding absolute time, a base time is kept in memory so that when an absolute time is needed, the current count of the counters 412 are subtracted from the base time to derive the absolute time. Any adjustments made to the LDFC's absolute time, in order to keep in synchronization with the 1026C clock, are made to the base time, and not to the 3 channel counter 412. A detailed description on synchronizing the LDFC's internal clock using a base time is found under the section 'LDFC Clock Software Interface'.

In order to know the exact second mark of absolute time, a 1 pulse per second (1 PPS) signal 434, provided by the 1026C, is fed to the 1 PPS interrupt interface circuit 422. The 1 PPS interrupt interface circuit 422, provides buffering and suppresses any transients that could cause false 1 PPS interrupts to occur. For a valid 1 PPS trigger, this circuit 422 then triggers an interrupt on the PC-AT bus 212, which is called the on-time interrupt 426. Hence, the on-time interrupt 426 is executed once each second to try and resync the LDFC's time with respect to the 1026C's time.

Another output provided by the 1026C satellite clock 400, called an out of lock signal 438, indicates when the clock is in time synchronization with the GOES satellite. This signal 438 is fed into the out of lock interface circuitry 424. The LDFC's clock software 430 can then interrogate the state of the 1026C's current synchronization with respect to the GOES satellite for knowledge of its own synchronization state. The 1026C also provides a rich set of ASCII commands, accessible through serial communications 436 that allows for total control of the clock. A serial communications controller 420 on the Interface Facility (336 in FIG. 3) is interfaced to the 1026C's serial port. The LDFC's clock command processor 428 software is the gateway to all commands sent and received from the 1026C. In case of a 1026C software crash or an abnormally operating clock, a special reset circuit was designed in the 1026C that allows for a power on reset of the clock to occur. The LDFC's clock reset interface 432 issues a 1 microsecond negative going pulse 440 to the 1026C when a power on reset to the clock is required. The ability to provide a power on reset to the satellite clock 400 is especially important due to the remote unmanned locations of the direction finder sites. The reset circuit for the satellite clock consists of an electronic buffer that is transient protected. The buffer is directly connected to the microprocessor on board the 1026C. Since there is a direct connection to the 1026C's CPU, a reset via the satellite clock reset circuit is independent of the 1026C's software state. This allows for a reset to be issued at any time.

Watchdog Timer Hardware Interface

Figure 8:
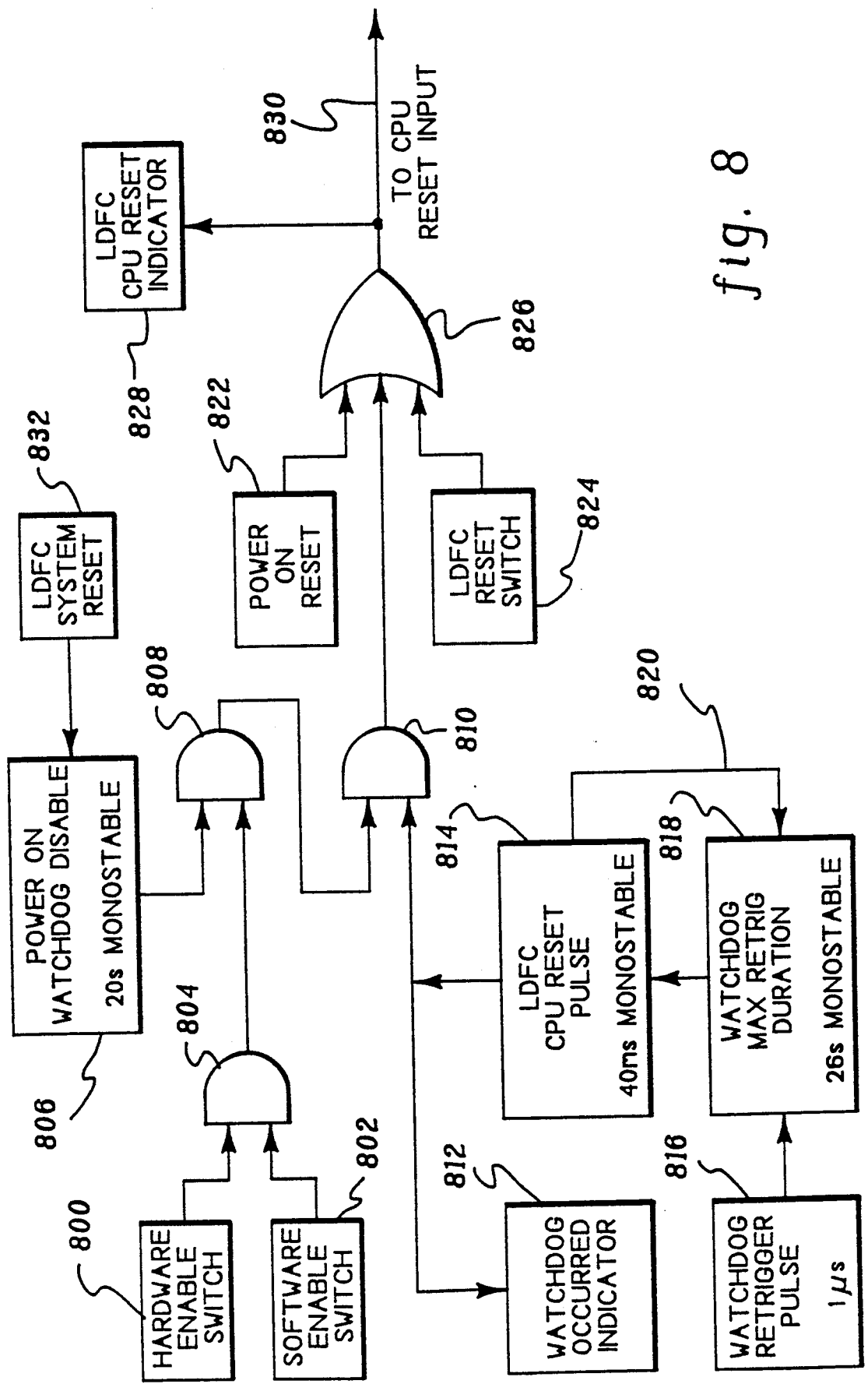
FIG. 8 is a logic diagram of the watchdog timer circuit of the present invention.

A quasi electronic schematic depiction of the watchdog timer hardware interface 324 on board the Interface Facility is shown in FIG. 8. There are three logical conditions that must be satisfied in order for the watchdog timer to be enabled, otherwise the watchdog will be disabled. One of the dip switches on the auxiliary dip switch array 332 is used as a hardware enable/disable switch 800 for the watchdog timer. Under normal operation, this switch 800 is enabled. When diagnostic checkout of the LDFC is performed, this switch 800 is used to disable the watchdog timer, so that it will refrain from resetting the LDFC. A software enable switch 802 also allows for software applications to enable/disable the watchdog timer. One of the uses of this switch 802 is to allow software to disable the watchdog timer from resetting the LDFC during periods of communication blackout. The software enable switch 802 can be forced true on the Interface Facility via a hardware jumper. In this mode, software applications are unable to disable the watchdog timer. Both the software 802 and hardware 800 enable/disable switch outputs are logically ANDed together by AND gate 804. If the LDFC under goes a system reset 832, a reset pulse will trigger the power on watchdog disable circuit 806. This circuit 806 consists of a retriggerable monostable multivibrator integrated circuit (IC), which disables the watchdog timer long enough (typically 20 seconds) so that initialization and memory validation code can be executed during system start-up. If the LDFC experiences a software crash during system start-up, the watchdog timer will eventually reset the LDFC after the power on watchdog disable 806 timeout period expires. The output of the power on watchdog disable circuit 806 is logically ANDed by AND gate 808 with the output of AND gate 804, the logical output of the hardware/software enable/disable switches. The output of AND gate 808 is fed to AND gate 810 and consists of the three logical conditions required for enabling the watchdog timer.

The heart of the watchdog timer circuit is composed of a dual retriggerable monostable multivibrator IC 818 and 814. In order for the watchdog timer circuit not to timeout, a retrigger pulse (typically 1 microsecond in duration) 816 must be issued to the watchdog maximum retrigger duration circuit 818 before its timeout period (typically 26 seconds) expires. If the watchdog maximum retrigger duration is exceeded without a retrigger, a pulse is then sent to the LDFC CPU reset circuit 814, which will try to reset the LDFC through AND gate 810. The LDFC will only be reset if the watchdog was enabled as described above. The duration of the pulse used to reset the LDFC's CPU is typically 40 milliseconds. In order to rearm the watchdog maximum retrigger duration circuit 818, a feedback pulse 820 is sent from the LDFC CPU reset circuit 814. One of the LED diagnostic indicators 812 will light when a watchdog timeout occurs. There are three sources that can perform a hardware LDFC reset. The first, is by the watchdog timer circuitry, which was described above. The second, is by a power on reset 822, which is composed of a resistor and capacitor (RC) circuit. This reset 822 is used when power is first applied to the Interface Facility to prevent multiple resets of the LDFC's CPU to occur in rapid succession. This can be caused by unknown start-up states of the ICs composing the watchdog timer circuitry. The power on reset 822 circuit actually holds the LDFC's CPU reset input 830 in a reset state long enough until the +5 voltage power supply is stable and the watchdog timer ICs are in known states. The third reset is a physical reset switch 824 located on the front enclosure of the LDFC. The three sources that can perform resets are logically ORed together by OR gate 826 and then fed to the LDFC's CPU reset input 830. One of the LED diagnostic indicators 828 will light when a LDFC system reset occurs.

Detailed Description Of Software Main Routine Schedule Handler

Figure 6:
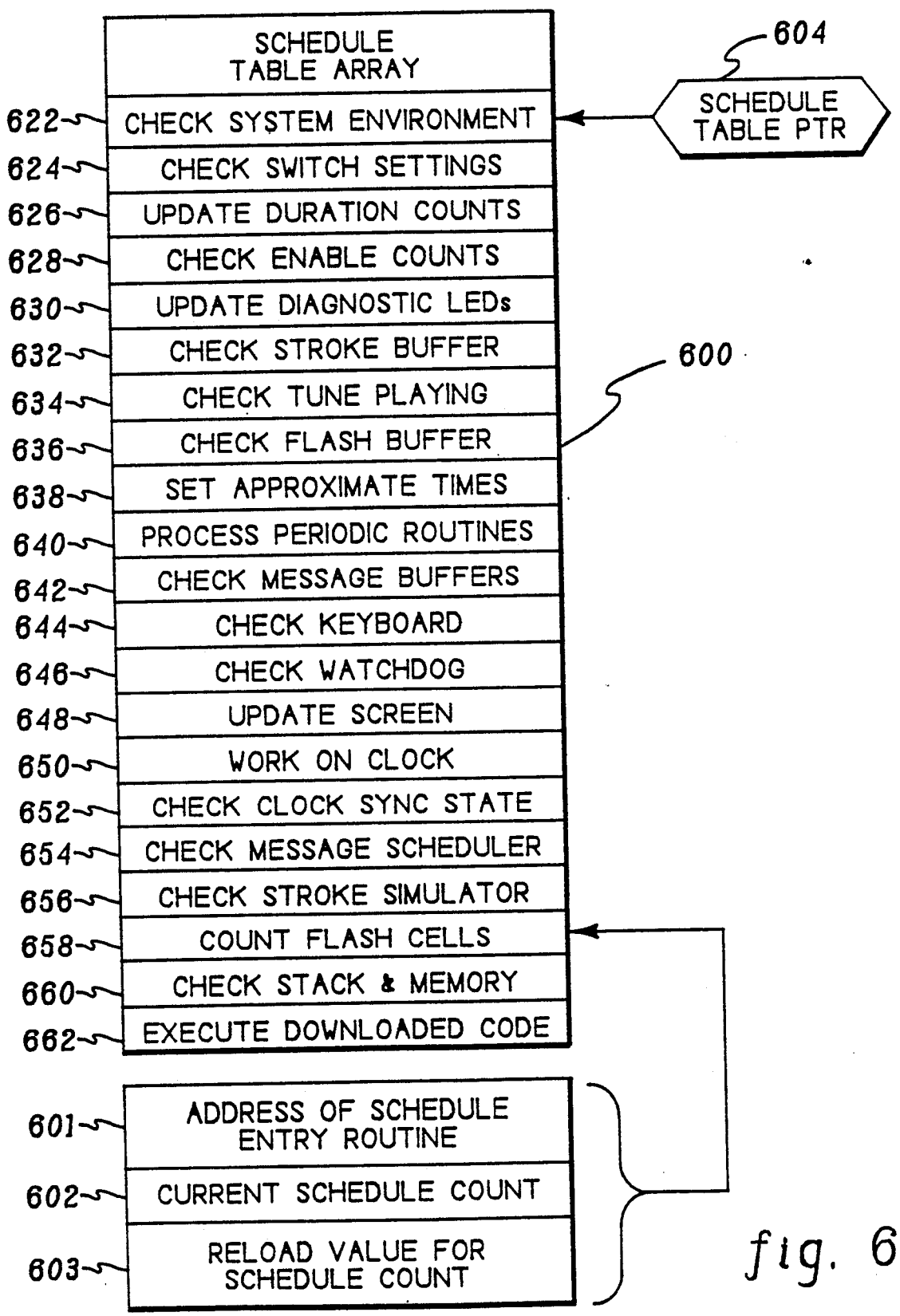
FIG. 6 is a flow diagram of the main routine of the LDFC.
Figure 6A:
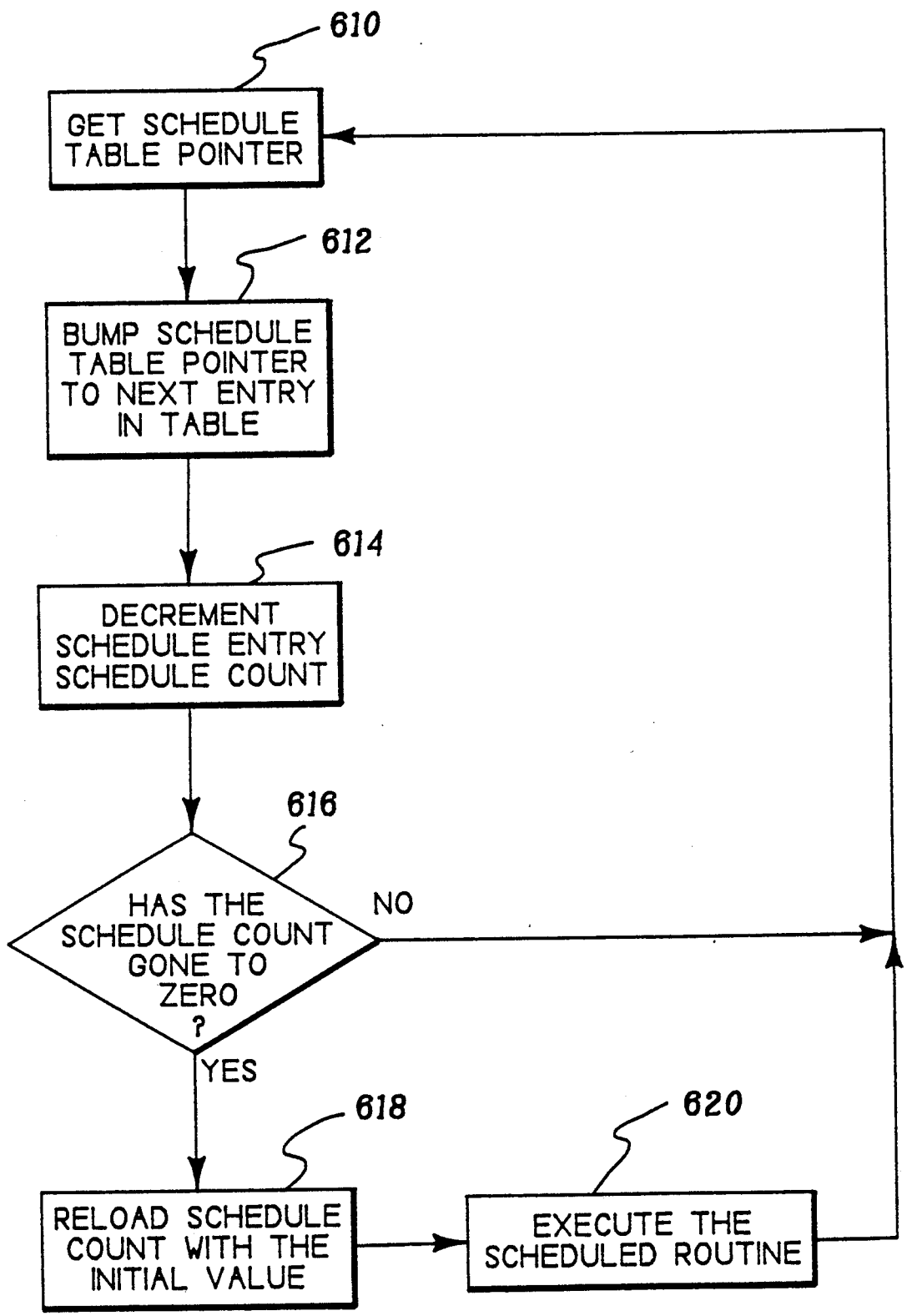

During the initialization process of the LDFC software, hardware configurable parameters are recorded, and the LDFC then waits for its parameter table, which configures operating parameters. Once the parameter table is received, the LDFC enables its Stroke Interrupt Routine 700, and then enters the Main Routine Schedule Handler depicted in FIG. 6.

The Main Routine Schedule Handler has the responsibility of executing individual tasks at the LDFC site based on a priority rate referred to as the Reload Value For Schedule Count 603. This method of 'scheduling' subroutines for execution allows for the more important LDFC processing to occur more frequently than less important LDFC processing. For example, the subroutine which checks the Message Buffers 642 is configured to be executed much more frequently than the routine used to Update the Screen 648. This allows the LDFC to be configured such that the most important processing for the collection of lightning data will have a higher priority than the LDFC routines that use the CPU for less important tasks in the LDFC code.

The Main Routine Schedule Handler retrieves the current Schedule Table Pointer (step 610) and bumps the Schedule Table Pointer 604 to the next schedule entry (step 612) in the Schedule Table Array 600. The Current Schedule Count 602 is then decremented for the current schedule table entry (step 614). If the Schedule Count 602 has not gone to zero (inquiry 616), program execution will continue back at the start of the Main Routine Schedule Handler (step 610), otherwise, the Current Schedule Count 602 of the current schedule record will be reloaded (step 618) with the Reload Value For the Schedule Count 603. The routine pointed to by the Address of the Schedule Table Entry Routine 601 will then be executed (step 620) and program flow will then continue with the processing of the Schedule Table Array 600 at the entry point of the Main Routine Schedule Handler (step 610). The Main Routine Schedule Handler continues to execute in this fashion forever, until the LDFC is reset. Prime numbers are typically chosen for the reload values for the schedule count. This minimizes the likelihood of scheduling multiple unequal priority routines for execution during a single pass of the schedule table array by the main routine schedule handler.

The currently preferred contents of the Schedule Table Array 600 and the purpose of each entry in the Schedule Table are described in the following sections.

Check System Environment 622

Execution of this routine updates the following internal LDFC variables:

1. The current temperature inside the enclosure housing the direction finder equipment, using temperature probe 220.
2. The current ADF 80-02 +5 volt output 246 from its power supply, and the current value of the diagnostic digital voltmeter input 248.
3. The input and output values of the enable and acceptance thresholds 250, 252, 254, and 256, respectively, are read and adjusted such that they meet the values specified in the parameter table.

Check Switch Settings 624

This routine is periodically executed to determine if any changes have occurred in the hardware configuration switches on the Interface Facility. If changes have occurred, the hardware ID of the LDFC will be updated, as well as the system flags which indicate whether to enable the screen update routine 648, whether tape output should be enabled or disabled, and whether the LDFC should use the speaker in the PC-AT for diagnostic sound output.

Update Duration Counts 626

Execution of this routine updates the internal timers used in recording how long the LDFC has been running, and the duration that has expired since the internal count and status tables have been zeroed.

Check Enable Counts 628

This routine is periodically executed to read the current value of the 16 bit counter on the Multifunction Analog And Digital Input/Output Board 216 which is used to record the enable crossing counts from the ADF 80-02. An internal 32 bit variable is used for holding the current enable count value. If the 16 bit counter has a value lower than the low 16 bits of the internal 32 bit counter, the high word of the internal counter will be incremented. The low word of the 32 bit internal counter is then loaded with the value read from the 16 bit counter.

Update Diagnostic LEDs 630

Execution of this routine causes the diagnostic LEDs on the Interface Facility to be updated to the proper state. Any of the eight LEDs can be configured to be lit for a specified amount of time. This routine determines whether each of the LEDs should remain lit, or be turned off. It then updates the bank of LEDs.

Check Stroke Buffer 632

This routine is used to check for new stroke data records registered by the stroke interrupt routine 700. Its functions are described in the 'Stroke Record Processing' section later in this document.

Check Tune Playing 634

The LDFC can be instructed to play notes for a specified amount of time or a collection of notes which form a tune. This routine periodically checks the note/tune playing pointers to see if any updates are required to the speaker output on the PC-AT in order to play the active note/tune, or if the speaker output should be disabled if there are no diagnostic notes/tunes to be played.

Check Flash Buffer 636

This routine checks the Link List Of Open Flash Cells 522 to see if any of the flash data records which are 'open' for the addition of subsequent strokes should be closed to the addition of subsequent stroke data. If so, the flash data record in the Link List Of Open Flash Cells 522 will be transferred to the Link List Of Closed Flash Cells 524. This process is further described in the 'Stroke Record Processing' section of this document

Set Approximate Times 638

The LDFC maintains several internal data structures which contain the approximate time at the LDFC and counts of the 3 Channel Counter 412. This routine updates these internal data structures with the current time and counts respectively. Other routines which are executed by the LDFC software that don't require the absolute time or counts may then access these internal data structures for approximate values of the current time and counts.

Process Periodic Routines 640

Each of the devices connected to a LDFC (such as the Local Tape Device 120, Diagnostic Device 114, etc.) may require the execution of special routines in the LDFC software. This routine executes the special procedures required by individual devices.

Check Message Buffers 642

As messages are received from various external devices, they are buffered in a large receive queue by the various interrupt routines. This routine is responsible for processing the messages which are present in the receive queue, and transmitting any results to the proper devices.

Check Keyboard 644

This routine checks to see if any keys have been pressed on the LDFC keyboard (if present). If so, the key code will be retrieved, and processed.

Check Watchdog 646

This routine checks to see if the watchdog timer circuit can be retriggered. This routine is more fully described in the 'Watchdog Timer Software Interface' section of this document.

Update Screen 648

This routine is responsible for updating the contents of the LDFC's physical or virtual screen if screen updating is permitted. It is more fully described in the 'Display/Sound/Keyboard Features' section of this document.

Work On Clock 650

This routine is responsible for the async communications with the Satellite Clock. It is more fully described in the 'LDFC Clock Software Interface' section.

Check Clock Sync State 652

This routine continually checks the current sync state of the Satellite Clock and maintains the current time quality of the internal time maintained by the LDFC. It is more fully described in the 'LDFC Clock Software Interface' section.

Check Message Scheduler 654

The LDFC has a table of 10 message cells that can be programmed to generate messages at specified time intervals. This routine checks to see if any of the 10 message cells are due to generate their respective message. If so, the message specified in the message cell will be generated. This routine allows for a LDFC to be programmed, on the fly to generate messages at specific time intervals which may either be processed internally by the LDFC or sent to an external device. An example of this would be to program a LDFC to report status information every 20 minutes to the Network Controller.

Check Stroke Simulator 656

This routine determines if the stroke simulator code has been enabled, and if any new stroke data records should be simulated by the software. The ability to simulate stroke data in software provides a means to test the stroke processing capabilities of a LDFC and the Lightning Detection Network.

Count Flash Cells 658

This routine is used to count the total number of flash cells used for buffering flash data. This number should be constant, and any deviations indicate that there are internal bugs in the software used in the flash buffer manipulations.

Check Stack & Memory 660

Initially, all of the stack memory, and the RAM which is not used by the LDFC software is filled with a specific value. This routine checks to see how much of the memory allocated for the stack has been used during run-time, and indicates when stack overflow has occurred or if the current stack allocation is excessive. It also checks to see if the RAM which is not used by the LDFC software is ever updated. If so, it indicates that there is a bug in the LDFC software which writes to an invalid memory address.

Execute Downloaded Code 662

The LDFC has the capability to have additional code downloaded to it during run-time for execution. This downloaded code can be programmed to be executed periodically in the Schedule Table Array 600 if desired. This entry in the Schedule Table Array 600 executes the downloaded code if the LDFC has been configured to allow downloaded code execution.

It is important to note that though the Main Routine Schedule Handler gives more CPU time to routines with higher priorities, it will always execute the lower priority routines eventually as time progresses. The affect is that lower priority routines will be executed much less often as the CPU at the LDFC site becomes busier processing lightning data.

Certain of the software routines employed by the LDFC will now be described in detail. Others of these routines can be readily implemented by those skilled in the art and, therefore, will not be detailed herein.

Collection/Grouping Of Lightning Data Stroke Interrupt Routine

Figure 7:
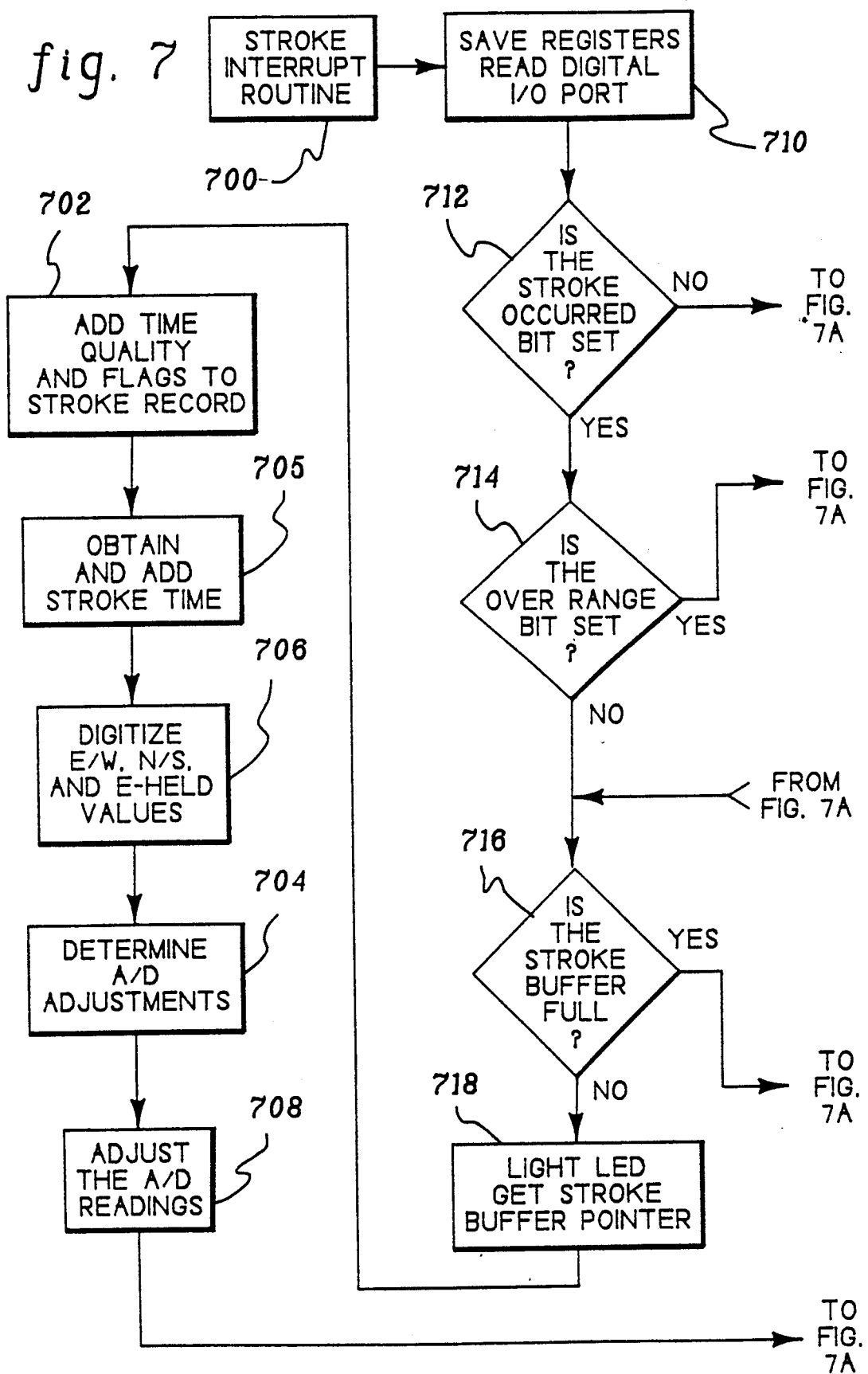
FIG. 7 is a flow diagram of the stroke interrupt routine.
Figure 7A:
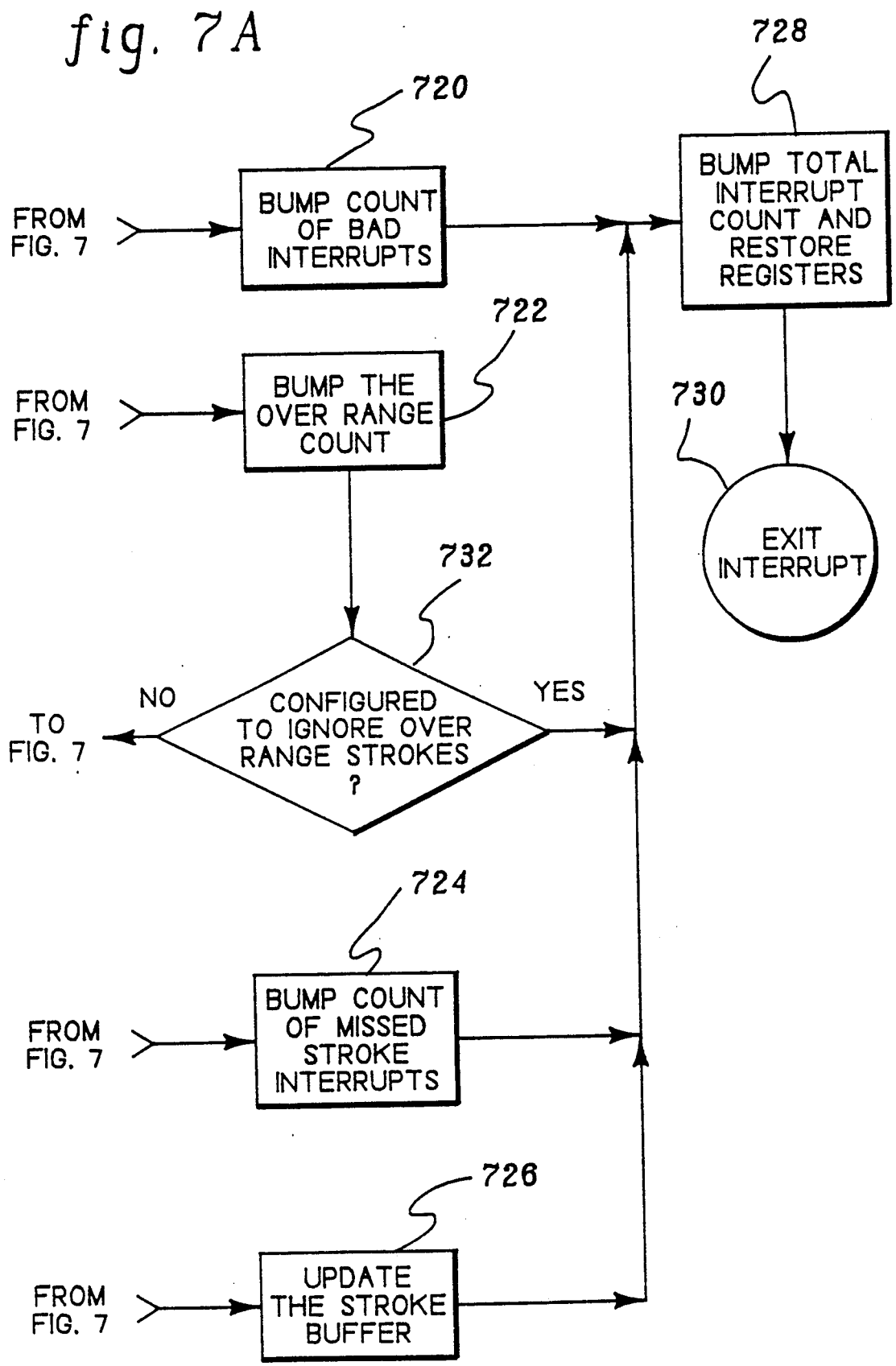

FIG. 7 shows the program flow of how lightning return stroke data is recorded by the LDFC. The Stroke Interrupt Routine 700 is entered after a signal is received over the Stroke Occurred line 258 from the ADF 80-02. At this point, registers are preserved, and the digital input lines 258, 260, 262, 264, 266, and 268 from the ADF 80-02 are read (step 710). The Stroke Occurred Mask Bit is now checked (Inquiry 712) to verify that the interrupt did actually occur from the ADF 80-02. If the Stroke Occurred Mask Bit was not set, then a count of Bad Interrupts will be incremented (Step 720), and the interrupt routine will exit to its cleanup point (Step 728).

Once the Stroke Occurred Mask Bit has been verified as set (Inquiry 712), the Over Range Bit, received from line 260 from the ADF 80-02, will be checked (Inquiry 714). If it is set, then the stroke has over ranged. The over range count is then incremented (Step 722), and the LDFC configuration is checked to see if Over Range Strokes are to be Ignored (Inquiry 732). If Over Range Strokes are to be ignored, then the interrupt routine will exit to its cleanup point (Step 728); otherwise, the interrupt routine will continue to its next check (Inquiry 716).

The stroke interrupt routine next determines if the stroke buffer is full (Inquiry 716) before continuing with the building of the stroke data record. If the Stroke Buffer Array 500 is full, then a count of Missed Stroke Interrupts will be incremented (Step 724) and the interrupt routine will exit to the cleanup point (Step 728). (A description of the Stroke Buffer Array and associated data records will be found in the following section.)

Once it has been determined that the Stroke Buffer Array 500 is not full (Inquiry 716), a pointer to the next available stroke data record (the Stroke In Pointer 504) will be retrieved, and a LED on the Interface Facility will be lit to indicate that the LDFC is processing stroke data (Step 718). Next, the current Time Quality 530 and Stroke Flags 532, 534, 536, 538, and 540, and Stroke Time 542 will be added to the stroke record (Steps 702 and 705). The E-W, N-S, and E-Held peak values are then digitized (Step 706). The adjustments to the E-W and N-S digitized values will be determined from the Stroke Gain Setting 536, the polarity of the N-S and E-W Digitized Peaks 544 and 546, and the A/D adjustment table 704. The N-S and E-W Digitized Peaks 544 and 546 will be altered with the specified adjustment values (Step 708). The values for the N-S, E-W, and E-Held Digitized Peaks will then be added to the stroke record, and the stroke buffer will be updated to indicate that a new stroke has been added (Step 726). The stroke interrupt routine will now continue with the cleanup and exit portion of the code (Steps 728 and 730).

At the cleanup point 728, the count of the total number of times which the Stroke Interrupt Routine 700 has been entered is incremented. All of the registers used by the interrupt routine are restored, and the interrupt routine exits (Step 730).

Stroke Data Record Description

The information recorded about an individual return stroke by the LDFC in the Stroke Interrupt Routine 700 contains both data from the ADF 80-02 and data from values internal to the LDFC at the time of the interrupt. The information collected on a single lightning return stroke is shown in FIG. 5 in a single stroke data record 502. The following describes each of the fields in a stroke data record.

Time Quality 530

This indicates how accurately the internal time at the LDFC is with respect to NIST time.

Stroke Occurred Flag 532

This Flag indicates that the ADF 80-02 did actually detect a lightning return stroke.

Stroke Over Ranged Flag 534

This Flag indicates whether a lightning return stroke caused an over range condition to occur at the ADF 80-02. If an over range did occur and the LDFC is configured to record information on the over range strokes, then only the time of the stroke will be meaningful in the stroke record.

Stroke Gain Setting 536

This flag indicates whether the ADF 80-02 was in Hi-Gain or Lo-Gain mode when it detected the lightning return stroke. If the ADF 80-02 was in Lo-Gain when the stroke data was recorded, then the signal strength computed from the E-W Digitized Peak 544 and the N-S Digitized Peak 546 will be multiplied by a gain factor of 5. This will put the Lo-Gain measurements in the same unit scale as the Hi-Gain measurements.

Stroke Polarity 538

This flag indicates if a stroke had a negative polarity (electron flow from cloud to ground) or a positive polarity (electron flow from ground to cloud). If the stroke has a positive polarity, then the Azimuth computed from the E-W and N-S Digitized peaks will need to be rotated 180 degrees.

Test Pulser Indicator 540

This flag indicates whether the stroke data being received from the ADF 80-02 is due to the Test Pulser circuitry in the ADF 80-02 or if it is due to actual lightning. The LDFC can be configured to filter Test Pulser stroke data, or to allow it to be transmitted back to the Network Controller 104. The importance of the Test Pulser Indicator 540, is that it allows one to distinguish between real and simulated lightning data.

Stroke Time 542

The stroke time is initially recorded as the current counts of the counter 412 in the LDFC. Once the counts are properly recorded, the time can be adjusted to an absolute time by subtracting the recorded counts from the base time value at the LDFC. This is not done in the interrupt routine, but after stroke records have been grouped into flash records, and the flash record is being moved from the Link List Of Open Flash Cells 522 to the Link List Of Closed Flash Cells 524.

E-W Digitized Peak 544

This field contains the signed 12 bit number which is the digitized value of the Magnetic Field E-W line 242 from the ADF 80-02. It is used in the computation of the Azimuth and Signal strength associated with the lightning return stroke relative to the LDFC site location.

Digitized Peak 546

This field contains the signed 12 bit number which is the digitized value of the Magnetic Field N-S line 240 from the ADF 80-02. It is used in the computation of the Azimuth and Signal strength associated with the lightning return stroke relative to the LDFC site location.

E-Held Digitized Peak 548

This field contains the signed 12 bit number which is the digitized value of the Electric Field line 244 from the ADF 80-02. This value is used in computing E/B ratio values for individual lightning return strokes.

Stroke Record Processing

The flow diagram in FIG. 5 illustrates how stroke data records 502 are taken from the Stroke Buffer Array 500 and grouped into flash records where they are further processed prior to being sent to the Network Controller 104. The software routines responsible for this are executed by two of the schedule entries in the main routine's Schedule Table Array 600. The Check Stroke Buffer routine 632 moves flash records from the Link List of Open Flash Cells 522 to the Link List Of Closed Flash Cells 524 when necessary, and moves new stroke data records 502 from the Stroke Buffer Array 500 to the Link List Of Open Flash Cells 522. The Check Flash Buffer routine 636 only moves flash records from the Link List Of Open Flash Cells 522 to the Link List Of Closed Flash Cells 524 when necessary. The following describes the flow of stroke data records 502 into flash records, and how the flash records propagate through various link list data structures in the LDFC until they are transmitted to external devices.

In FIG. 5 the Link List data structures 520, 522, 524 and 518 are all represented as Link Lists with exactly two cells present. For example, the Link List of free flash cells 520 is the first cell in a Link List. It has a pointer to a second cell in the same Link List and the next cell has a pointer to nothing, nil, indicating the end of the Link List. It should be noted that the actual number of data cells in each Link List 520, 522, 524 and 518 vary from zero, an empty list to two hundred four, the number of flash data cells allocated for the grouping of return strokes.

Adding Strokes To The Open List

When a new stroke record 502 is found in the Stroke Buffer Array 500 by the check stroke buffer routine 632, it will be pointed to by the Stroke Out Pointer 506. Prior to adding the new stroke to one of the open flash records in the Link List Of Open Flash Cells, or creating a new flash record, the Link List Of Open Flash cells is checked (Step 514) to see if it is time to move any of the flash data records in the link list to the Link List Of Closed Flash Cells 524 (described in the following section). Once this has been accomplished, the signal strength and the aximuth of the stroke (the direction the lightning return stroke is located at with respect to the LDFC site) are computed. Using the computed azimuth, the Link List Of Open Flash Cells is searched for a flash data record which has an azimuth within the configured tolerance level of the new stroke data record to determine if the return stroke is the first stroke of a new flash, or a subsequent stroke in an already opened flash. If a flash data record is found meeting this requirement (it is a subsequent stroke), the time offset of the stroke data record from the first stroke in the flash record is computed in 100 microsecond units, the multiplicity of the flash is updated, and the flash data record (flash cell) is updated with characteristics of the subsequent stroke (Step 512).

If none of the flash data records in the Link List Of Open Flash Cells has an azimuth within the configured tolerance level, then the return stroke will be considered as the first stroke in a flash. A flash cell will be allocated from the Link List of Free Flash Cells 520, or the Link List of Closed Flash Cells 524 if the Free List is empty (Step 529). This new flash cell will be initialized with a multiplicity of one, the data from the stroke record will be transferred to it as the first stroke in the flash, and the flash cell will then be added (Step 512) to the end of the Link List Of Open Flash Cells 522. Once the new stroke data record has been fully processed, the Stroke Out Pointer 506 will be adjusted to point to the next stroke data record in the Stroke Buffer Array 500.

Moving Open Flash Cells To The Closed List

Once a flash cell is created and added to the end of the Link List Of Open Flash Cells 522, it does not remain there indefinitely. The Open Flash Cells 522 are continually checked to see the duration for which they have existed. If this duration exceeds a configured number of milliseconds (typically 1000), the flash cell must be moved from Open Flash Cells list 522 to the Closed Flash Cells list 524. This aids in preventing a first stroke of a new flash from being improperly classified as a subsequent stroke of a detected flash located in a similar direction. As the flash cell is being transferred to the Closed Flash Cell list 524, the time of the first stroke in the flash record is adjusted to NIST time by subtracting the stroke time from the LDFC's base time. Since, all subsequent strokes in the flash record have their times recorded as offsets from the time of the first stroke, they do not need to be adjusted because the offsets do not change.

The Array Of 5 Flash Cells With Maximum Flash Qualities 508 contains five individual flash records which the LDFC detected that had the maximum multiplicity, positive Signal Strength, negative Signal Strength, positive E-Held Peak, or negative E-Held Peak respectively. The flash cell that is being transferred to the Closed Flash Cell List 524 is checked to see if it exceeds any of the values of the current 5 Flash Cells With Maximum Flash Qualities 508, if so, the table of Flash Cells With Maximum Flash Qualities 508 will be appropriately updated.

If any Local Tape Device(s) 120 are present at the LDFC, then a message will be built sending the flash data record to the local tape storage device(s) for archive purposes (Step 514). The current flash filter parameters which are currently configured in the LDFC parameter table will be applied to the flash record. These configurable filters may reduce the amount of unwanted data from the flash record prior to transmission to the network, thus reducing the load on the network communications. Once the flash record has been properly filtered, a flash data message containing information about each stroke in the flash will be constructed and sent to the Network Controller 104 over satellite if the LDFC is configured to operate with satellite communications. The flash cell is then moved to the end of the Link List Of Closed Flash Cells 524, and the Diagnostic Flash Ptr 526 is updated to point at this newly completed flash data record so that external Diagnostic Devices may have access to the most recent flash data recorded by a LDFC.

Flash cells in the Closed Flash Cell List 524 will remain there until they are requested by the Network Controller 104 through the Synchronous Device 200, or the Free List 520 becomes empty, and a new cell is requested (Step 529). When the LDFC is polled by the Network Controller 104 for flash data records through the Synchronous Device 200, the maximum number of Flash Data records that will fit in one message are removed from the Link List Of Closed Flash Cells 524, and transferred (Step 516) to the list of Flash Cells Buffered For the Bisync Device 518. After all of the flash data records in the Flash Cells Buffered For The Bisync Device 518 have been sent to the Network Controller 104, the cells are added to the end of the Free List 520 where they may be used for the storage of new flash data records collected by the LDFC (Step 510).

The above text and FIG. 5 and FIG. 7 illustrate how stroke information is recorded by the LDFC and the propagation of the stroke data as it is processed by the LDFC. As shown, after stroke data is recorded, it is grouped into flash records, and these flash records are then sent to the Network Controller 104 for further processing and archiving. It is the responsibility of the Location Processor Device 108 to take the individual flash records reported from the LDFCs and then compute flash and stroke locations.

LDFC Clock Software Interface

In order to time tag lightning return stroke data within the nearest $10^{-4}$ second of NIST time, it is necessary for the LDFC to maintain an internal clock which is in sync with NIST time. Though the requirement for this accurate absolute time tagging was designed for the purpose of time stamping lightning data, the techniques used for the internal time keeping can be applied to any data collection device which requires absolute time keeping. There are several important advantages to maintaining an accurate absolute time at the LDFC. These advantages are described below.

1. Any method of data communications can be used for transferring the data back to the Network Controller 104. In the previous version of the Lightning Detection Network, the Network Controller 104 was responsible for adjusting all of the time stamps on the reported lightning data to within a few milliseconds of the absolute time. This was done using a polling method, where the communications path delays in both the transmit and receive directions were assumed to be equal. By time stamping the data at the LDFC with an absolute accurate time, the transmit and receive communications delays no longer need to be the same in duration. Since the Network Controller 104 does not need to adjust the time stamps on the data, any form of communications may be used to send the data back to the Network Controller 104.

2. The CPU load on the Network Controller is significantly reduced, since it is no longer required to synchronize each of the LDFCs in the network to NIST time.

3. By recording an absolute time with the data, lightning return stroke data from multiple networks can be easily combined. This is due to the fact that all of the internal times at each of the LDFC sites will be synchronized to the same timing source regardless of what network they are connected to.

During the development of the interface between the LDFC and the satellite clock, undesired problems were encountered. A general overview of the problems and their solutions follows.

1. The Satellite Clock could not always gain or maintain synchronization with NIST time. This resulted in a degraded belief as to how accurate the internal time at the LDFC was with respect to NIST time. To address this issue, a Time Quality variable is maintained internally which represents how accurate the current internal time at the LDFC is believed to be with respect to NIST time. Whenever lightning return stroke data requires an absolute time stamp, the current value of the Time Quality variable is also included. This is desirable so that the Network Controller 104 will have a degree of accuracy of the reported time stamp. The time quality values used to represent the 'degree of accuracy' of the internal time maintained by the LDFC with respect to NIST time are described below (symbols in parenthesis are the indicators associated with the respective time qualities on the LDFC's display).

Excellent ('') - (intentionally blank)
  Having an 'Excellent' time quality indicates that the current internal time maintained by the LDFC is in sync with the Satellite Clock, and that the Satellite Clock is in sync with NIST time.

Marginal ('? ')
  Having a 'Marginal' time quality indicates that the LDFC is still in sync with the Satellite Clock, however, the Satellite Clock has just recently lost sync with NIST time. The time maintained by the LDFC when in this mode is assumed to be fairly accurate (within a few 100 microsecond units of NIST time). The time quality will remain in the 'Marginal' state until the Satellite Clock regains sync, or a duration specified by a configurable parameter has elapsed (typically 60 minutes).

Poor ('*')
  Having a 'Poor' time quality indicates that the Satellite Clock has lost sync with NIST time for an extended duration (typically 60 minutes). This indicates that the internal time maintained by the LDFC should not be regarded as accurate.

Never ('@')
  Having a 'Never' time quality indicates that the Satellite Clock has never gained sync with NIST time since the LDFC software has been running. This indicates that a Satellite Clock may need repair, or external 'noise' sources are present around a LDFC location preventing the Satellite Clock from obtaining the time sync signal from the GOES satellite.

Disabled ('#')
  Having a 'Disabled' time quality indicates that the LDFC is not in sync with NIST time, and that the Satellite Clock synchronizing routines are disabled. In this mode, all times reported by the LDFC are regarded as inaccurate.

Disabled Corrected ('!')
  Having a 'Disabled Corrected' time quality indicates that the LDFC is not in sync with the Satellite Clock and that the routines used to synchronize the LDFC with the Satellite Clock are disabled. However, it also indicates that some other external device besides the Satellite Clock has applied a correction to the LDFC's internal time. If the external device applying the correction can determine the LDFC's offset from NIST time, then the applied correction will bring the LDFC back in sync with NIST time, and the times reported by the LDFC can be regarded as accurate.

Enabled Corrected ('~')
  Having an 'Enabled Corrected' time quality is similar to the 'Disabled Corrected' time quality except for one difference. When this time quality is active, the routines used to synchronize the LDFC with the Satellite Clock are still active. If the Satellite Clock regains sync with NIST time in this mode, then the LDFC will automatically resync itself with the time at the Satellite Clock.

2. It was found that the Satellite Clock could 'believe' that it was in sync with NIST time when in fact it actually had determined a bad time from the timing signal broadcasted over the GOES satellite. In order to address this problem, the LDFC issues a request to the Network Controller 104 for the current network time whenever the Satellite Clock regains sync with a GOES satellite. The time returned from the Network Controller 104 is then compared to the current time at the Satellite Clock. If the two times differ by an amount greater than 10 seconds, it is assumed that the Satellite Clock has improperly deciphered the NIST time. The LDFC will then reset the satellite clock through the Clock Reset Interface 432, hence forcing the Satellite Clock to reacquire the NIST time.

3. It was found that the Satellite Clocks will occasionally fail to respond to ASCII commands received from the asynchronous communication lines 436. In this condition, communications can normally be restored by either transmitting a BREAK condition to the Satellite Clock, or by resetting the Satellite Clock. The LDFC software is designed to recognize this communications failure condition and to take the appropriate action to restore communications to the Satellite Clock.

4. In severe cases, it is possible that the Satellite Clock will fail completely, or fail to ever gain sync with NIST time due to external 'noise' sources close to the LDFC location. When this happens, the LDFC is capable of being configured to disable its Satellite Clock synchronizing routines, and accept synchronization adjustments from other external devices which are capable of determining the amount of adjustment required to bring the internal time maintained at the LDFC in sync with NIST time. A discussion of the method of correcting the LDFC internal time can be found under 'Time Correction Method'.

Reading The Internal Time

The time is maintained in the LDFC by using a counter in conjunction with a base time to produce time stamps that are some offset from a fixed point in time (i.e. the number of 100 microsecond units from 01/01/1980 00:00:00.0000). The 3 Channel Counter 412 FIG. 4 is a down counter which is programmed initially with a Minute Of Day Count 414 of 1440 (Number of minutes in 1 day), a Millisecond Count 416 of 60000 (Number of milliseconds in a minute), and a 100 microsecond Count 418 of 10 (Number of 100 microsecond units in a millisecond). This 3 Channel Counter 412 is constantly decrementing, and rolls over once a day. A fourth counter is maintained in memory which keeps track of the Day roll overs. The 16-bit Day count is initialized to FFFF (hex) and is decremented once each time the Minute Count rolls over (once a day). This 4 part counter (Day, Minute, Millisecond, 100 microsecond) continues to count the number of 100 microsecond units since it was initially programmed while the LDFC software is executing.

In order to convert the 4 part down counter into a time which is progressing from some starting point, a 4 part base time data structure is used. This 4 part base time contains a Day Count, Minute Count, Millisecond Count, and 100 microsecond offset from a fixed point in time (01/01/1980 00:00:00.0000). At the start of the LDFC software, all 4 parts of the base time are initialized to zero (representing 01/01/1980 00:00:00.0000). By subtracting the current value of the 4 part down counter from the current values in the base time, an actual time can be derived. For example, assume that the four part down counter has decremented 1,512,678 times (2 minutes and 31.2678 seconds have elapsed). The current value of the 4 part down counter will be {−1,1437,28732,2} subtracting this from the 4 part base time of {0,0,0,0} yields a time of (0,2,31267,8} which is 01/01/1980 00:02:31.2678.

One additional note, in the present invention all times and durations are stored in a four part data structure consisting of a 16-bit Day Count (values ranging from 0–65535), a 16-bit Minute count (values ranging from 0–1439), a 16-bit Millisecond count (values ranging from 0–60000), and an 8-bit 100 microsecond unit count (values ranging from 0–9). These four parts can be regarded as a duration (number of 100 microsecond units of time which have elapsed), or as a time stamp (number of 100 microsecond units from a fixed point in time). After implementation of the invention, a better form for time storage was determined. The improved method stores times and durations by combining the 4 parts data structure into a single 48-bit count of 100 microsecond units. A single 48-bit counter will actually be able to span greater durations of time, and is much easier to manipulate mathematically than the 4-part data structure used by the LDFC. All further discussion will be in regard to the 4-part data structure, though what is discussed applies equally if the 48-bit counter format is used for duration and time storage.

Adjusting The Internal Time

The above has described how the time is maintained and retrieved internally by the LDFC. Unfortunately the time keeping method currently described assumes that the LDFC software always starts at the exact point in time of 01/01/1980 00:00:00.0000. Since this is never the case, the time kept by the LDFC will initially be off from the actual time by some fixed value. In order to allow corrections for this offset from the actual time, a means by which to accurately adjust the current time at the LDFC was required. If one is able to determine the offset that the internal LDFC time is from the actual NIST time, it is a trivial task to adjust the internal LDFC time to be in sync with NIST time.

All adjustments to the internal time at the LDFC are done by subtracting an offset, which represents how much the LDFC is out of sync with NIST time, from the base time. For example, if the current base time is {0,0,0,0}, and the LDFC is determined to be slow by 3596 days 800 minutes and 32.4558 seconds, then the adjustment would take place in the following manner. Since the LDFC is slow, the amount of time the LDFC was slow by would be converted to a negative 4-part time data structure of (−3596,−800,−32455,−8), and this value would be subtracted from the base time. The subtraction of the negation of the offset is equivalent to advancing the time at the LDFC site by the amount of time which the LDFC was slow by. The new resulting base time will be {3596,800,32455,8}, hence, the base time has been adjusted from 01/01/1980 00:00:00.0000 to 11/05/1989 13:20:32.4558. Since all time stamps are derived by subtracting the current 4-part down counter from the base time, the net affect of the adjustment to the base time will adjust all time stamps which are hereafter recorded at the LDFC by the amount of time which the LDFC was out of sync with respect to NIST time. This causes all subsequent time stamps recorded by the LDFC site to be in sync with NIST time.

Synchronizing The Internal Time With An External Clock

It has been shown that keeping track of the time at the LDFC site and being able to adjust the time can be easily implemented. And even though the method of adjusting the internal time is trivial, the process which determines how much to adjust the internal time by is nontrivial. In order to synchronize the LDFC with NIST time, the LDFC was designed to determine how much the internal time in the LDFC differed from a Satellite Clock which was in sync with NIST time. The Interface Facility provides the necessary hardware required to interface with the Satellite Clock. The LDFC software uses the Interface Facility to access the Satellite Clock in order to determine the adjustment required to its base time which will result in time synchronization with the Satellite Clock. In addition, the LDFC software uses the Interface Facility's hardware interface to monitor and control the operation of the Satellite Clock. The process to accomplish this, is broken into three different tasks, and these three different tasks are more fully described in the following sections.

On-Time Interrupt 426

Figure 4A:
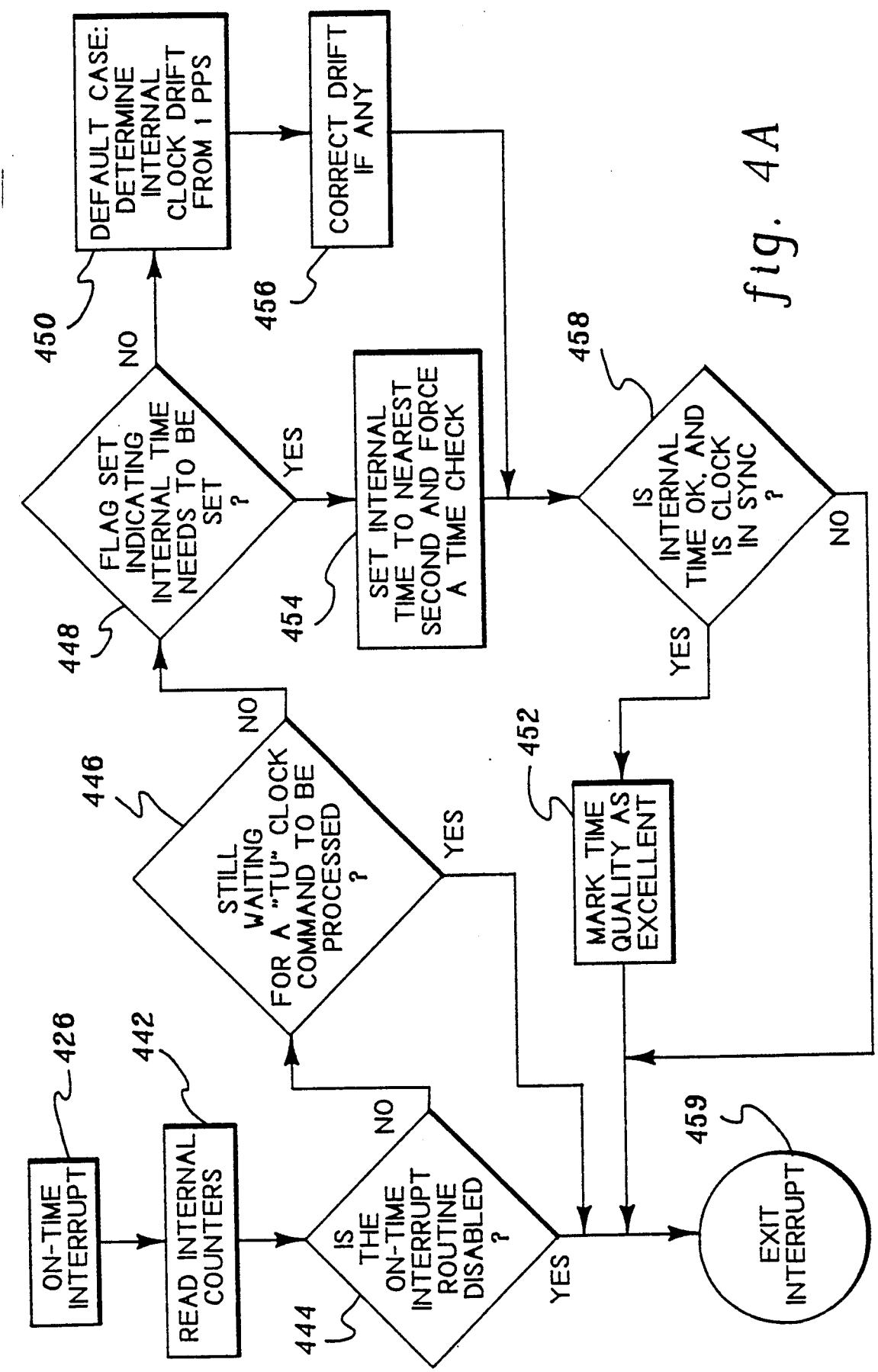
FIG. 4A is a flow chart of the on-time interrupt routine used to synchronize the LDFC to NIST time.

The On-Time Interrupt Routine 426 is executed once a second from an external 1 PPS signal 434 generated by the Satellite Clock. When the On-Time Interrupt Routine is executed, the LDFC knows the exact second which the 1 PPS has occurred with respect to NIST time. The LDFC also knows its own current internal time. If the two times are different, then the LDFC is not in sync with the Satellite Clock. If the LDFC is out of sync, then the current known NIST time will be subtracted from the current LDFC time forming an adjustment amount (the amount of time the LDFC's internal time is fast or slow with respect to NIST time). This adjustment amount is then applied to the current base time, as described previously, to bring the LDFC's internal time in sync with NIST time. It should be noted that if it is determined that the external Satellite Clock is not in sync with NIST time, then no time synchronization will take place during the On-Time interrupt routine. It should also be noted that the syncing of the LDFC's internal time with the external Satellite Clock can be disabled by a configurable parameter. If this is done, then some other external device in the network must send the proper adjustment values to the LDFC in order to bring the LDFC's internal time in sync with NIST time. The way in which the On-Time Interrupt Routine 426 synchronizes the LDFC's internal time with NIST time is shown in FIG. 4A, and described in the following text.

Upon entry into the On-Time Interrupt Routine 426, the internal time at the LDFC is read (Step 442). If the LDFC is configured to disable the LDFC from syncing its internal time with the external Satellite Clock (Query 444), then the interrupt routine will exit (Step 459). Otherwise, a check (Query 446) will be made to see if the LDFC knew what the current NIST time was when the 1 PPS interrupt occurred. It is possible that the LDFC won't have known the current NIST time if the ASCII command ('TU') which requests the current time to the nearest second from the Satellite Clock has not yet been processed by the Clock Command Processor routine 428. If the NIST time was not known to the nearest second, then synchronization is not yet possible and the interrupt routine will exit.

If the Clock Command Processor 428 or the Diagnostic Checks And Recovery Routines 430 determine that the LDFC's internal time is out of sync with NIST time, they will set a flag indicating that the LDFC's internal time must be adjusted. If this flag is set (Inquiry 448), then the proper adjustment amount will be determined and the base time will be updated accordingly (Step 454). After the adjustment is made, the LDFC will set a flag that will force the Diagnostic Checks And Recovery Routines 430 to issue a request to the network controller for the current network time (Step 4410 of FIG. 4C) in order to verify that the external Satellite Clock properly decoded the NIST time 454. If the flag indicating that the LDFC's internal time must be adjusted is not set, then it will be determined if the internal LDFC time has drifted from the Satellite Clock time 450. If a drift is detected, and it is greater than 100 microseconds, then internal flags will be set that will force the LDFC to go through the process of resyncing its internal time with the Satellite Clock (Step 450). If the drift is determined to be exactly 100 microseconds in either direction (slow/fast), then the internal time will be adjusted by exactly 100 microseconds in the proper direction to bring the internal time back in sync with NIST time (Step 456). If an on-time interrupt occurs that is more than 500 microsecond units different than the LDFC's internal time, it will be ignored unless the drift of the subsequent on-time interrupt is also greater than 500 microseconds. This allows for spurious interrupts (false interrupts due to external noise sources) to occur into the 1 PPS interrupt interface 422 without resyncing the LDFC's internal time. The drift that is actually calculated by 450 is averaged over the last 4 on-time interrupts that have occurred. Calculating the drift value by averaging actually removes subtle fluctuation in the syncing process of the LDFC.

At this point, if the internal time has been properly synchronized with the Satellite Clock, and the Satellite Clock is properly synchronized with NIST time (Inquiry 458), then the internal variable which indicates the time quality will be updated to the 'Excellent' state (Step 452). An 'Excellent' time quality indicates that the LDFC's internal time is synchronized with NIST time within 100 microseconds. Any lightning return stroke data recorded after this point will have a time recorded with the stroke data that is accurate to 100 microseconds of the absolute NIST time.

Clock Command Processor 428

During the execution of the LDFC software, a clock state table of ASCII commands is periodically processed which will send a state specific ASCII command to the Satellite Clock. The Satellite Clock will process this ASCII command, and return a response. Depending on the response returned from the Satellite Clock, a new state in the clock state table will be entered, and a new ASCII command will be scheduled to be sent to the Satellite Clock. This process continues indefinitely while the external Satellite Clock synchronization routines are enabled. The normal clock state flowing process may be interrupted when special conditions arise, and reset to a different clock state which handles the special condition. An example of when this might occur, is when it has been determined that the Satellite Clock has regained sync with NIST time, and the ASCII time request command ('TU') is required in order to synchronize the LDFC with NIST time. In this case, the normal flow of clock states would be interrupted, and reset to the clock state containing the ASCII time request command ('TU'). It is also possible for other devices, external to the LDFC, to insert an additional clock state into the current clock state flow which allows them to send their own message to the Satellite Clock. This is the means by which the LDFC allows other external devices access to the Satellite Clock. The Clock Command Processor 428 is also responsible for determining when asynchronous communications have failed between the LDFC and the Satellite Clock, and will attempt to restore them.

Figure 4B:
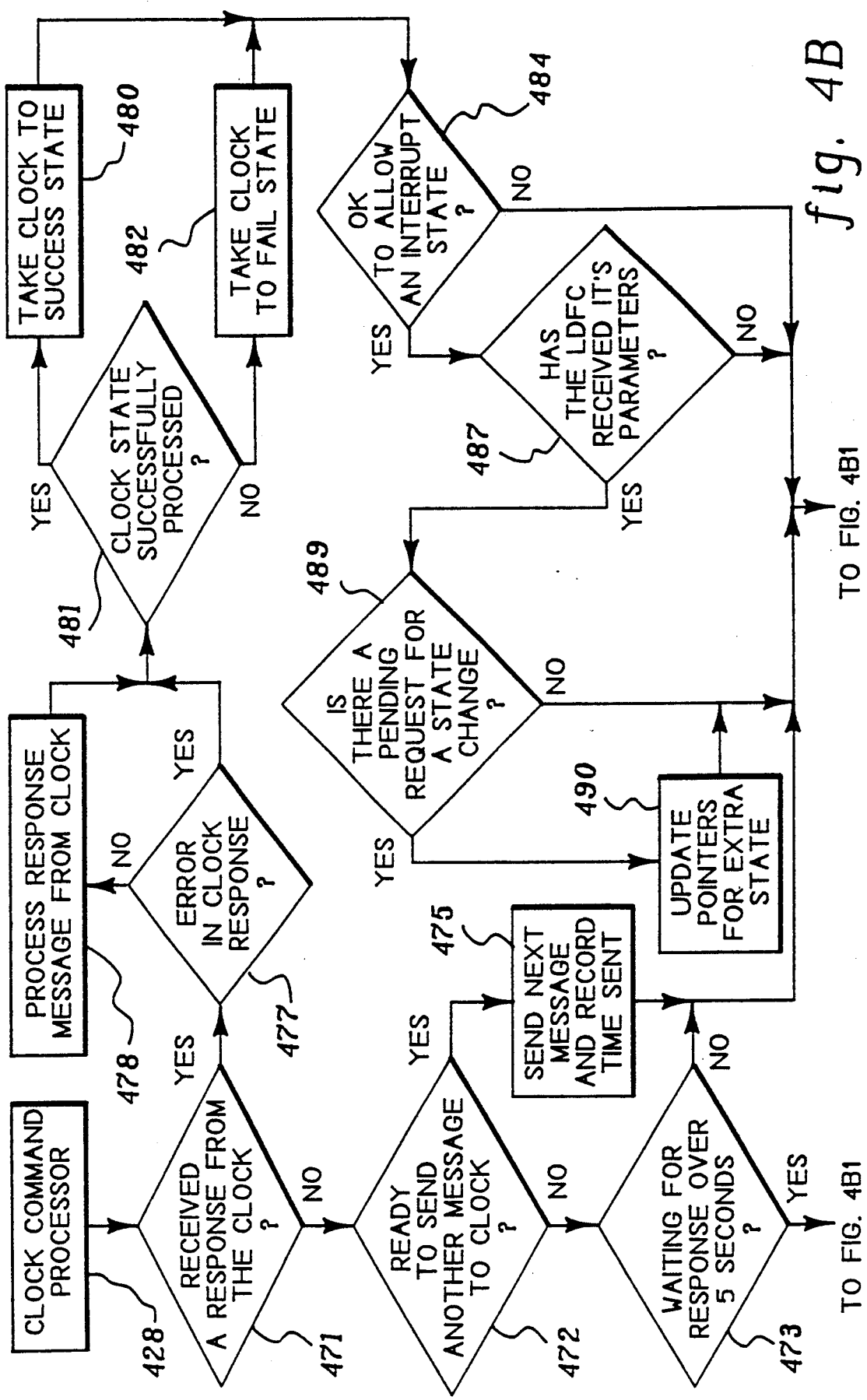
FIG. 4B is a flow diagram of the clock command processor which processes various satellite clock commands.

The Clock Command Processor 428 program flow is shown in FIG. 4B. Initially, a check is made to see if an ASCII response message has been received from the Satellite Clock (Inquiry 471). If no response has been received, then a check will be made to determine if it is time to send the next ASCII command to the Satellite Clock for processing (Inquiry 472). If so, the ASCII message contained in the current clock state will be sent to the Satellite Clock for processing (Step 475) and the routine will exit (Step 475).

Once an ASCII command has been sent to the Satellite Clock, the Clock Command Processor Routine will continue to wait for the response up to 5 seconds (Inquiry 473). If a response is received (Inquiry 471), it will be checked for an error indicator (Inquiry 477). If no errors were present in the response message, the clock state routine responsible for processing the response message will be executed (Step 478).

It is now determined whether the clock state which is responsible for processing the ASCII response message received from the Satellite Clock was satisfied with the response (Inquiry 481). If the response message was satisfactorily processed then the next clock state executed will default to the success state (Step 480); otherwise, the default clock state will be the fail state (Step 482). After determining the next clock state to process 480 or 482, a check will be made to determine whether interrupt states are allowed before accepting the new state (Inquiry 484). If the new clock state is allowed to be interrupted, and the LDFC has received its parameter table from the Network Controller (Inquiry 487), and there is a pending request to interrupt the current clock state flow (Inquiry 489), then the currently determined new state will be ignored, and the interrupt state will be executed next (Step 490).

The flow of the clock command processor continues in the fashion described above indefinitely, or until the Satellite Clock fails to respond to an ASCII message within 5 seconds (Inquiry 473). If this occurs, the current state will be checked to see if it is the special clock state which is used by devices external to the LDFC to access the Satellite Clock (Inquiry 474). If so, then a "No Response From Clock" message will be returned to the external device which was accessing the Satellite Clock when the Satellite Clock failed to respond (Step 476).

When the Satellite Clock has failed to respond, an internal counter representing the No Response Count will be incremented (Step 479). If it is the fifth time in a row that the clock has not yet responded (Inquiry 483), it will be assumed that the asynchronous communications at the Satellite Clock have locked up. If there have been fewer than two attempts in a row to restore the serial communications by the issue of a BREAK interrupt to the Satellite Clock through the communications lines (Inquiry 485), then another serial BREAK interrupt will be issued (Step 488). Otherwise, a power interrupt will be issued (Step 486). The LDFC will continue to issue BREAK and power interrupts to the Satellite Clock until communications are restored, or the time synchronization routines are disabled.

Diagnostic Checks And Recovery 430

Figure 4C:
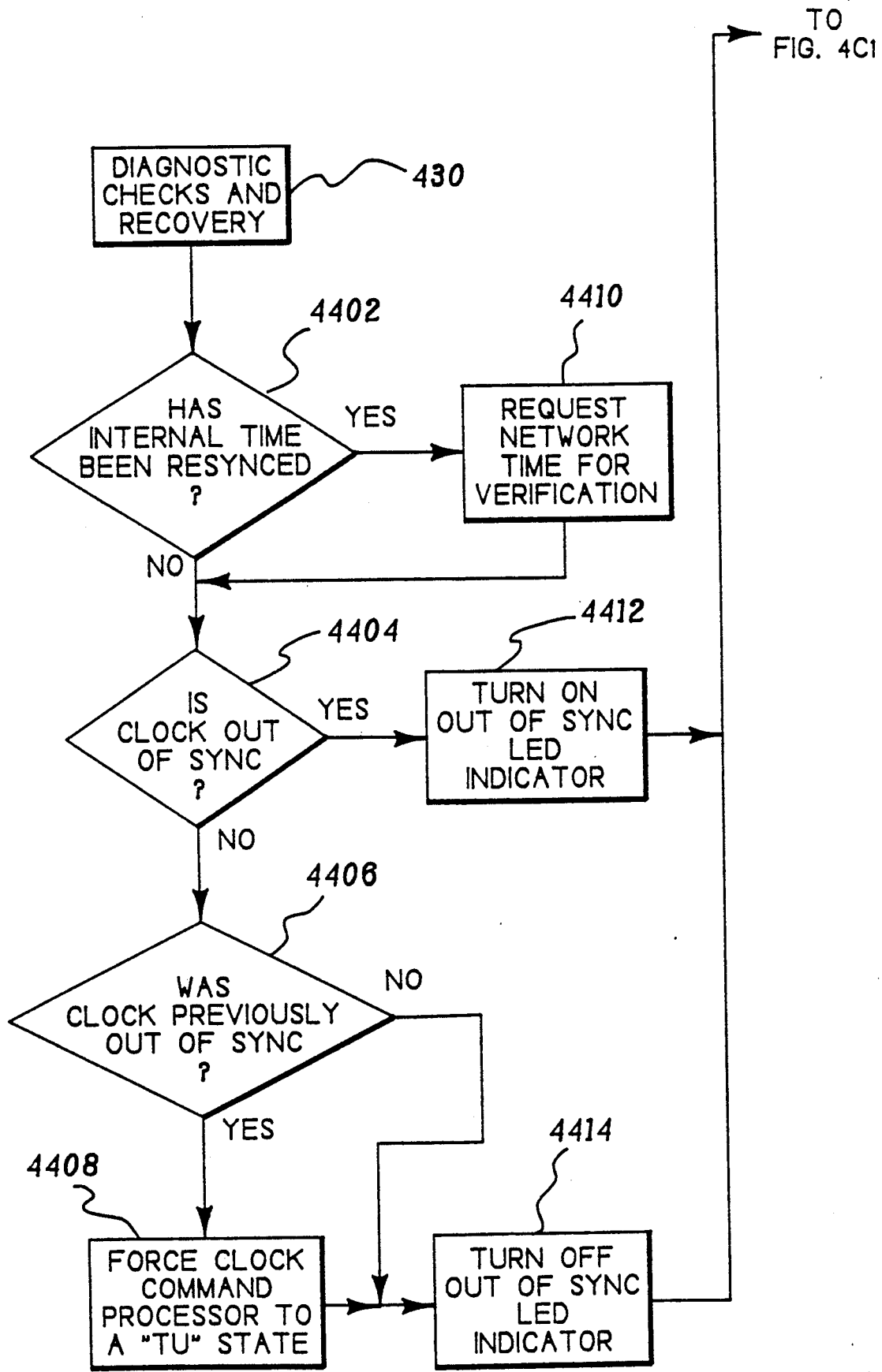
FIG. 4C is a flow diagram of the clock diagnostic checks/recovery routines.

The third routine used in maintaining absolute time at the LDFC is the Diagnostic Checks And Recovery Routine 430. The flow diagram of this routine is shown in FIG. 4C. When the Satellite Clock time synchronization routines are enabled at the LDFC, this routine takes the following responsibilities in maintaining time accuracy.

1. Whenever the Satellite Clock regains sync with NIST time, and the LDFC has resynced its time to the Satellite Clock (Inquiry 4402), a request message will be sent to the Network Controller asking for the current network time. The time returned from the Network Controller will be compared to the time decoded by the Satellite Clock to verify that the two times are within 10 seconds of one another. If not, the Satellite Clock will be assumed to have improperly decoded the NIST time, and the Satellite Clock will then be reset forcing it to reacquire the NIST time.

2. The routine determines the whether the Satellite Clock is in or out of lock (sync) (Inquiry 4404) with respect to the Out Of Lock Interface 424 (FIG. 4). If it is determined that the Satellite Clock is out of Lock, then a diagnostic LED on the Interface Facility will be lit indicating this condition (Step 4412), otherwise, the diagnostic LED on the Interface Facility used to indicate this condition will be turned off (Step 4414).

3. If the LDFC time is currently out of sync with NIST time, and the Satellite Clock has just regained sync with NIST time (Inquiry 4406), then a clock state interrupt will be issued that will force the Clock Command Processor routine 428 to retrieve the current time ('TU') from the Satellite Clock (Step 4408), and force the On-Time Interrupt routine 426 to synchronize the LDFC time with the time at the Satellite Clock.

4. Based on the current sync state of the Satellite Clock, and a sync state of recent history, one of the following actions will occur.

In Sync Now, Previously In Sync (Inquiry 4416)

In this case, the current time will be recorded as the last time which the LDFC was in sync with NIST time (Step 4428). This recorded time is used when the Satellite Clock loses sync in order to determine how long the LDFC has been out of sync, and hence when the time quality transition from 'Marginal' to 'Poor' should occur.

In Sync Now, Previously Out Of Sync (Inquiry 4418)

In this case, the current time will be recorded as the last time which the LDFC was in sync with NIST time 4430. The internal variable used to hold the previous sync state used by this routine is then updated from 'Previously Out Of Sync' to 'Previously In Sync' (Step 4436).

Out Of Sync Now, Previously In Sync (Inquiry 4420)

In this case, the data structure containing the last time the LDFC was out of sync is updated with the current time (Step 4432). The duration which the Satellite Clock has been out of sync with NIST time is computed. This computed duration is compared to the configurable parameter which governs how long to wait before updating the current time quality from 'Marginal' to 'Poor' (typically 60 minutes) (Step 4438). If this time has been surpassed, then the time quality will be updated to the 'Poor' state (Step 4444), and the internal variable used to hold the previous sync state used by this routine will be updated from Previously In Sync to 'Previously Out Of Sync'. Otherwise, the time quality at the LDFC will be set to the 'Marginal' value (Step 4440).

Out Of Sync Now, Previously Out Of Sync (Inquiry 4422)

In this case, the data structure containing the last time the LDFC was out of sync is updated with the current time 4450. The number of minutes that the LDFC has waited for the Satellite Clock to tune to the currently selected GOES satellite is then determined (Step 4434). If this number is larger than the configurable parameter (Inquiry 4442) (typically 10 minutes), the Satellite Clock will be instructed to switch its tuning from the current GOES satellite to the other GOES satellite (Step 4446).

In Sync Now, Never In Sync Before (Inquiry 4424)

In this case, all that is done is to update the internal variable used to hold the previous sync state to 'Previously In Sync' instead of 'Never In Sync' (Step 4426). The routine is then exited (Step 4448).

Out Of Sync Now, Never In Sync Before (Inquiry 4424)

In this case, the number of minutes that the LDFC has waited for the Satellite Clock to tune to the currently selected GOES satellite is determined (Step 4434). If this number is larger than the configurable parameter (Inquiry 4442) (typically 10 minutes), the Satellite Clock will be instructed to switch its tuning from the current GOES satellite to the other GOES satellite (Step 4446).

Diagnostic And Debugging Features

The LDFC provides many diagnostic features in the form of tables of internal counts which external devices may have access to through the use of message passing. In addition, all of the diagnostic messages can also be executed in a Reroute/Header message form, hence diagnostics on any specific LDFC may take place from any point in the entire Lightning Detection Network. Many of the diagnostic counts maintained by the LDFC are mentioned later in the Display/Sound/Keyboard section. Some of the diagnostic features maintained by the LDFC include the following.

1. A status table with a variety of information with regard to clock operations.
2. A table containing times and Time Qualities at points in time which Time Quality transitions occurred. This information is used to determine how frequently Time Quality transitions are occurring at the LDFC.
3. The current internal time and Time Quality at a LDFC site. This is useful in determining whether the LDFC is reporting lightning return stroke information that can be used by the Location Processor Device 108 in order to compute lightning return stroke locations.
4. A table of directions and azimuths of the last 25 strokes to have been detected by the LDFC. This information can be used to indicate roughly where lightning return strokes have occurred relative to the LDFC site.
5. An array of 5 flash records that had maximum flash qualities since the LDFC software has been running. This information is of interest when one is looking for a flash with a maximum multiplicity or signal strength component.
6. Several arrays of stroke counts in different sectors with different signal strengths are also kept. This information can be used for approximate stroke densities relative to the LDFC location, and can be used to help determine blind spots at the Direction Finder site.
7. Direct memory and I/O operations can be performed on a LDFC from a remote device. This gives remote devices access to all memory and I/O operations at a LDFC. This information is of use for testing and development of new LDFC software.
8. Tables containing statistics and counts, as well as all of the counts displayed in the various display modes may be zeroed. This is useful when one wants to determine how frequently a specific count is currently being updated.
9. Any of the A/D channels, and the digital inputs on the Multi-Function Analog And Digital I/O Board 216 may be accessed by external devices. This allows for a Diagnostic Device to determine the current readings of any or all of the A/D inputs to the LDFC.
10. The contents of the screen display memory area, whether real or virtual, may be retrieved by external devices. This allows external devices to pull up the current contents of the LDFC screen on their own monitors. This is further discussed in the 'Display/Sound/Keyboard Features' section.
11. All of the buffers used for buffering messages and lightning return stroke data can be cleared.
12. A stroke simulator in the LDFC software can be configured and activated in order to determine whether a LDFC site and the Network Controller can process lightning data properly. This is used for testing purposes, when nature does not provide lightning, and all of the lightning return stroke information which is simulated is marked as such so that archived data will not be unwittingly contaminated with simulated stroke data. Using the stroke simulator, one can determine what kind of flash and stroke rates can be handled by the communications medium used in the Lightning Detection Network.
13. The values of the most recently seen stroke, and the most recently closed flash record are also available from an LDFC. Using this information, an external Diagnostic Device can continually poll an LDFC for stroke or flash data records, and then present the data, which the LDFC is collecting, for examination.

Parameter, Message Schedule Table, and Program Downloading

LDFC Parameters

The LDFC has to be downloaded with its particular parameters before it can process data from lightning return strokes which are detected. This allows for customizing each LDFC operating environment before it becomes functional. The exact type of parameters which are present in the parameter table, and the way in which the LDFC uses these parameters is discussed in the following text.

It is possible for a LDFC to have errors or other problems with its detection of lightning return strokes. Some of the associated problems/errors can be corrected by configurable parameters in the LDFC parameter table.

Parameters which filter out which lightning return strokes the LDFC will send back to the Network Controller are configurable. These filters work by requiring negative discharges to be above some configurable threshold level, and the positive discharges to be above another configurable threshold level.

If the LDFC has its direction finding antennae out of alignment, all directions reported by the LDFC will be off by a constant number of degrees. This error can be corrected by setting the rotational parameter such that it will neutralize the fixed error due to improper alignment. For example, if a LDFC is reporting all of its direction vectors −10 degrees off from where other LDFCs are putting the location of the lightning, one can configure the LDFC which is out of alignment to add +10 degrees to all of the direction vectors it computes. This will bring the LDFC back in alignment with the rest of the Lightning Detection Network.

Switches in the parameter table which control whether over range, simulated, test pulser, or weak strokes are allowed to be sent back to the Network Controller 104 are also present in the parameter table. These switches are used to restrict the data which a particular LDFC site will report back to the Lightning Detection Network.

The way in which the LDFC groups individual lightning return strokes into flash records is also controlled by the parameter table. Control is provided to restrict the grouping of individual lightning return strokes with respect to the direction deviation from the first return stroke in a flash. One may also configure the amount of waiting time for additional lightning return strokes from the point in time when the first lightning return stroke of the flash occurred. A sample configuration may include something such as: Restrict the grouping of individual lightning return strokes to those that deviate within +1 degree and −1 degree in direction from the first lightning return stroke in the flash and that occur within 1000 milliseconds of the first stroke.

It is possible to control the operation, and adjustments made to the readings from the ADF 80-02 by values configured in the parameter table. The following describes the controlling parameters which are available.

The A/D adjustment table is a table of 8 entries used to make corrections to the digitized readings from the ADF 80-02. It allows adjustments based on the polarity of the N-S signal 240, the E-W signal 242, and the gain mode 262 recorded from the ADF 80-02 when the lightning return stroke was detected. This table allows for a more individualized calibration of the ADF 80-02 unit than was previously possible using a set of potentiometers that controlled the analog offset on the ADF 80-02 unit.

Enable and acceptance threshold voltage levels used by the ADF 80-02 for invoking its waveform discrimination circuitry are also set in the parameter table of the LDFC. When local noise sources are present (e.g. electric fences or airport ground radar), it is possible that the sferics produced by these noise sources are similar to the sferics produced by lightning return strokes. When this occurs, the ADF 80-02 unit will process the local noise sources as if they were actual lightning return strokes. This results in the false detection of lightning return strokes. The local noise source can also cause the ADF 80-02 detector to be busy by enabling its waveform discrimination circuitry. While the ADF 80-02 is busy, it cannot process sferics from naturally occurring lightning return strokes.

The LDFC also has the ability to disable its ADF 80-02 device inputs altogether. In doing so, the LDFC will be unable to detect any lightning. This is only done when the ADF 80-02 is streaming invalid information into the LDFC either due to local noise sources that could not be filtered out, or a failure of an ADF 80-02 unit.

Parameters which control the clock and affect the way in which the Time Quality is determined at the Direction Finder site are also stored in the parameter table.

The latitude and longitude of the LDFC location are stored in the parameter table. The LDFC uses this to verify and/or correct the latitude and longitude values stored in the Satellite Clock. The Satellite Clock uses the latitude and longitude of the LDFC in combination with the location of the GOES satellite in order to compute the distance of the Satellite Clock from the GOES satellite. Using this distance information, the Satellite Clock then computes the time delay required for the timing signal to reach the Satellite Clock from the GOES satellite, hence providing 100 microsecond accuracy with respect to NIST time.

The duration which the Satellite Clock will wait after it loses sync with the GOES satellite, prior to notifying the LDFC, can also be configured in the parameter table. This value is typically set to 10 minutes. After losing sync with the GOES satellite timing signal for the specified duration, the Satellite Clock will notify the LDFC by use of the Out Of Lock line 438 (Reference FIG. 4). After the notification, the LDFC will change its internal Time Quality from 'Excellent' to 'Marginal' indicating that time information is less reliable.

The initial satellite which the Satellite Clock will attempt to tune to (GOES EAST or GOES WEST), is also programmed into the parameter table. This is done since some locations have better reception of the timing signal from one GOES satellite as opposed to the other.

The LDFC can also be programmed to disable its Satellite Clock timing routines altogether. This would only be done in the case when the Satellite Clock was determined to have failed, and one was able to remotely adjust the time at the LDFC such that it is in sync with the rest of the sites in the Lightning Detection Network (see the section on the Time Correction Method).

The LDFC can be configured to send a message to the Network Controller whenever its internal time quality changes. This allows one to have a record at the Network Controller when a LDFC loses or regains time sync with NIST time. This information can then be processed at the main operations center at a later time in order to determine which LDFCs are having trouble in maintaining NIST synchronized time.

The parameter controlling the number of minutes to wait for the Satellite Clock to acquire time synchronization with the timing signal broadcast from one specific GOES satellite before changing its tune mode to the opposite GOES satellite is also configurable. This allows one to configure the number of minutes which the LDFC will wait for the Satellite Clock to get in sync with NIST time on one GOES satellite prior to forcing the Satellite Clock to try and establish time synchronization with the other GOES satellite.

The internal delay parameter of the Satellite Clock is also downloaded to the LDFC, so that the LDFC may verify that the Satellite Clock has the correct internal delay, or correct the Satellite Clock delay if it is determined to be bad. The internal delay is used by the Satellite Clock for internal time corrections so that the time deviation is minimized when the clock is synchronized to NIST time.

General Operating Parameters

Both the ID number and the 2 character ASCII ID of the LDFC in the Lightning Detection Network are stored in the parameter table. This information is necessary for external devices wishing to gain full access to the Lightning Detection Network from the LDFC using Reroute/Header messages. In order for any external device to access a different LDFC in the network, it must know how to set its header bytes such that the response from the remote LDFC will be correctly routed back to the external device. The ID number is used in the Reroute/Header messages in order to determine how to route messages from the Network Controller to a specific LDFC.

The CPU clock speed for the LDFC to operate with is also stored in the parameter table. This parameter controls whether the high or low clock rate is used to drive the CPU (typically 12 or 6 MHz).

A byte value containing four sound switches which control what sounds are enabled, and how they are enabled, is also present in the parameter table. One may configure a LDFC to play 'tunes' when special events occur (such as a phone-ring sound when a message is received). One may configure the LDFC to beep every time a lightning return stroke is received, and the beep issued can be configured to vary in frequency with respect to the signal strength of the lightning return stroke. In addition, all sounds may be disabled at a specific site if required.

The LDFC only transmits information to the Network Controller when it detects lightning return stroke data or it receives a specific request message. In order to indicate to the Network Controller that the LDFC is still functioning properly, the LDFC will generate a short 'Alive' message periodically when there is no other information to transmit. The dead time period which must elapse before this short 'Alive' message will occur is set in the parameter table as a specific number of milliseconds (typically set to 30000 milliseconds).

The maximum number of flash messages that the LDFC is allowed to buffer may also be configured. This is done to allow for the ability to reduce the amount of lightning return stroke information which the LDFC can buffer. It is typically set to the largest value possible to allow for the maximum buffering which the LDFC is capable of.

Message Scheduling

The LDFC has a Message Scheduling table used to generate messages at specific time intervals at the direction finder location. The ability to program the LDFC in this manner eliminates the need for some of the communications bandwidth which would normally be used by external devices in order to instruct the LDFC to generate the message which is desired. This ability is currently used to program the LDFC to send back status information to the Network Controller at specific points in time.

Each schedule table message contains information regarding: how often to generate the scheduled message, the last time which the scheduled message was generated, what devices are to receive the results of the processing of the scheduled message, and the contents of the scheduled message which should be processed.

Program Downloading

The LDFC was designed such that additional subroutines could be appended to the end of the LDFC code. These appended subroutines could then either be executed once per external request, or they could be configured to be executed continually by use of a Schedule Table Entry 662 in the Schedule Table Array 600. The way in which the downloaded code is either included or excluded from the Schedule Table Array 600, is by the use of a 'gate' byte. The gate byte is the very first byte of the downloaded subroutine, and must be a NOP (no operation) instruction in order for the downloaded code to be continually executed by the main routine. If one does not wish for the code to be continually executed by the main routine, then the gate byte will be set to the RET (return) instruction. The message handler which processes the external request to execute the downloaded code exactly once always calls the downloaded routine one byte past the gate byte, hence ignoring the gate byte. The ability to add additional code to the LDFC software on the fly allows for program enhancements to occur at remote locations without travel to the location.

Networking Capabilities

Figure 9:
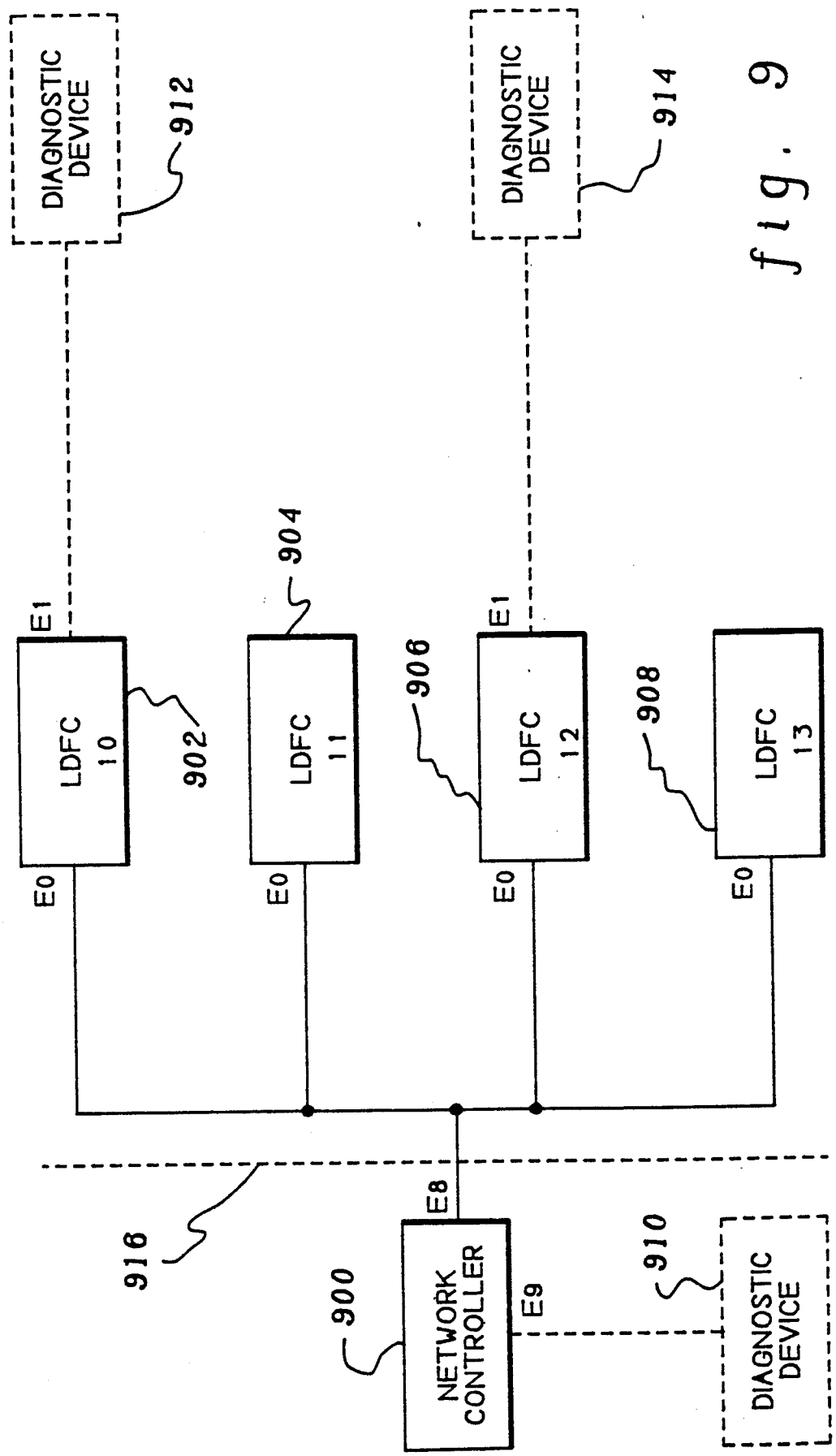
FIG. 9 is an illustration of a simplified network of LDFCs useful in understanding the reroute/header message feature of the present invention.

The following discussion of the Reroute/Header message processing capability of the present invention will be presented in the context of the sample Lightning Detection Network shown in FIG. 9. This network contains one Network Controller 900 and four LDFCs 902, 904, 906, and 908 and three Diagnostic Devices 910, 912, and 914. It will be shown how the Reroute/Header technique may be used to pass messages from any point in the network to any other point in the network for processing, and have the results of the processed message sent to any point in the network. An example showing the use of the Tail option of Reroute/Header messages, as shown in FIG. 9F, will also be discussed. Once the examples of Reroute/Header messages have been demonstrated, a description of the sample code, used to implement the Reroute/Header feature will be discussed.

Before illustrating the processing of the example Reroute/Header messages, a description of the capabilities of each of the devices in the sample Lightning Detection Network needs to be addressed. The following assumptions have been made:

LDFC Assumptions

Each LDFC 902, 904, 906, and 908 in FIG. 9 is assumed to have two ports available for communications with external devices. Device E0 of each LDFC will be considered as the first port, and it will be assumed that this is the port/device which connects the LDFC to the Network Controller 900. Device E1 of each LDFC will be considered as the second port, and it will be assumed that this port/device is used to optionally connect a Diagnostic Device e.g. 912 or 914 to the LDFC. The four LDFCs have a unique address which is used by the Network Controller in sending messages to a specific LDFC. The address of each LDFC is: 10 for LDFC 902, 11 for LDFC 904, 12 for LDFC 906, and 13 for LDFC 908. Each LDFC is assumed to be able to process each of the following message types:

---

<00>    Reset the LDFC.

| | |
|---|---|
| <01> | Get the ASCII representation of the time at the LDFC. Returns an 8 byte response message in the form: <"HH:MM:SS">. |
| <0D> | Reroute message type. |
| <0E> | Header message type. |

Network Controller Assumptions

The Network Controller 900 is assumed to have two ports available for communications with external devices. Device E8 of the Network Controller will be considered as the first port, and it will be assumed that this is the port/device which connects the Network Controller to all of the LDFCs in the network 902, 904, 906, and 908. Device E9 of the Network Controller will be considered as the second port, and it will be assumed that this port/device is used to optionally connect a Diagnostic Device 910 to the Network Controller. The unique address of each of the four LDFCs is used by the Network Controller in sending messages to a specific LDFC. In order for the Network Controller to send a message to a specific LDFC, it is assumed that the implementation of the Network Controller code will use the first byte of the message to be sent out device E8 as the address of the LDFC which the message is intended for. It is also assumed that the Network Controller will not include the address in the message which is actually sent to the LDFC (For example, if the following message was sent out device E8 at the Network Controller 900: <13> <00>, the Network Controller 900 would treat the <13> as the address of the LDFC to which the message is being sent, and send only the <00> byte of the message to the corresponding LDFC 908). The Network Controller is assumed to be able to process each of the following message types:

| | |
|---|---|
| <00> | Reset the Network Controller. |
| <01> | Get the ASCII representation of the time at the Network Controller. Returns an 8 byte response message in the form: <"HH:MM:SS">. |
| <0D> | Reroute message type. |
| <0E> | Header message type. |

Diagnostic Device Assumptions

Each Diagnostic Device 910, 912, and 914 is assumed to have the ability to transmit and receive messages to the device (either a Network Controller or LDFC) which it is connected to. No special message processing capabilities will be assumed about any of the Diagnostic Devices. Hence, they will be assumed to be the terminating nodes in the hypothetical network. This means that once a message reaches one of the Diagnostic Devices, it will not be able to re-enter the network, although this feature is just a further extension of what is being described.

Figure 9A:
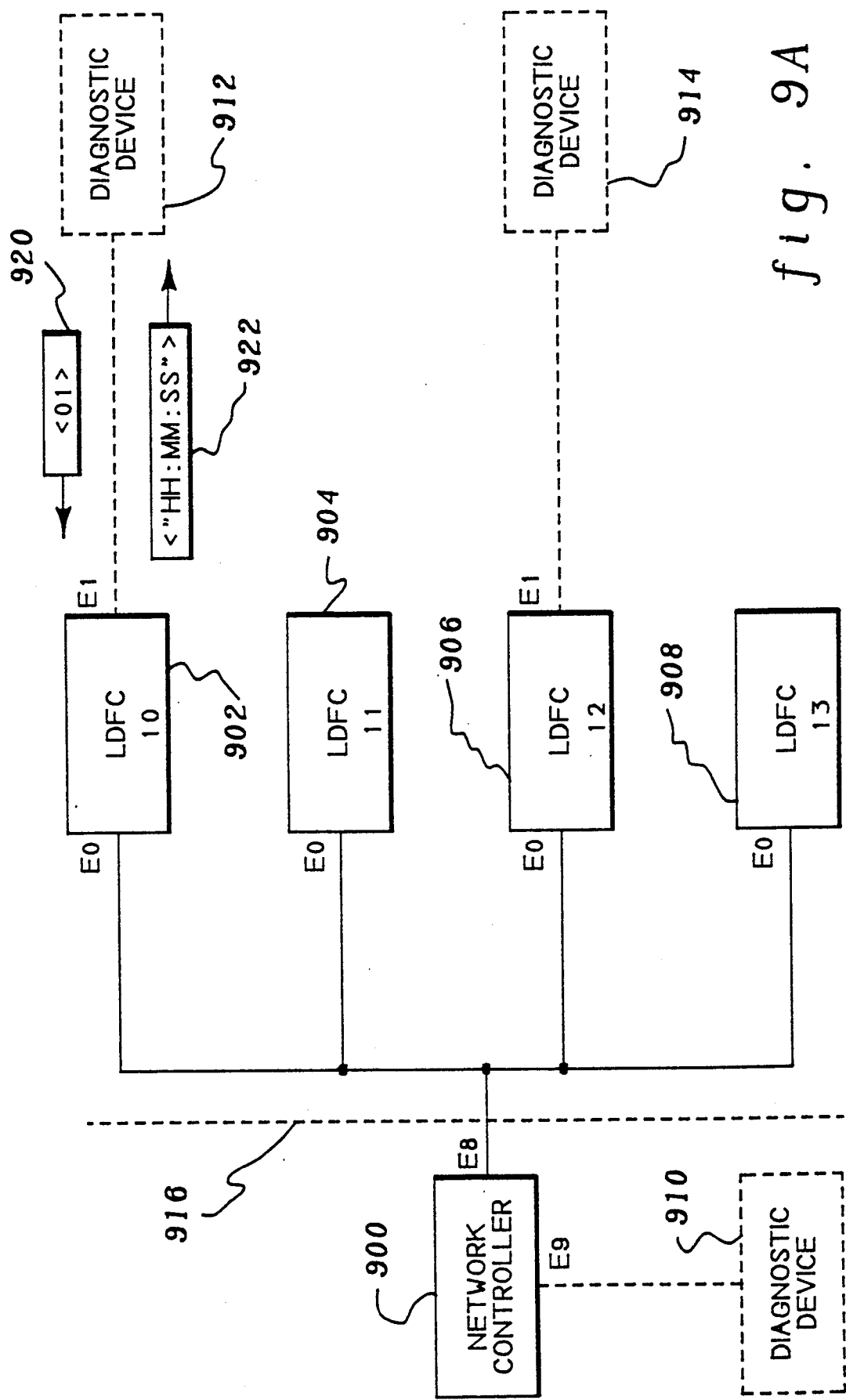
FIG. 9A is an illustration useful in understanding a simple technique of interrogating a LDFC.

Typical LDFC Interrogation FIG. 9A

A typical form of device message processing is shown in FIG. 9A. In the standard technique, a message 920 requesting the ASCII time, <01>, is sent by the Diagnostic Device 912 to the LDFC 902. The LDFC 902 recognizes the message 920 as a request for the ASCII time, and sends the response message 922, <"HH:MM:SS">, back to the Diagnostic Device 912.

This has demonstrated the simple technique of allowing one device to send a message to another, have the other device process the message, and return the results back. Using this simple technique, it is not possible for the Diagnostic Device 912, to access any of the other points in the network other than LDFC 902. The addition of Reroute/Header capabilities will allow access to all points in the network, and still maintain compatibility with this simple technique of message passing between devices, to allow maximum flexibility in the design of Diagnostic Devices.

Reroute Messages

Reroute messages are used to control the destination of a message. They do not necessarily return a response to the device where the message originated from, but instead send a portion of the received message to the devices specified by the contents of the message. Reroute messages in the sample network are composed in the following form: <0D> <Receiver List> <Message To Reroute>. The three parts of a reroute message are described below:

<0D>
This byte is the message type. It indicates to the device receiving the message to process the message as a Reroute message.

<Receiver List>
These byte(s) make up the list of devices which the message is to be rerouted to. In the sample implementation, a Receiver List is terminated by a non-zero value in the high nybble of a byte. Examples of valid <Receiver Lists> for the Network Controller 900 are: <E9> (a single device to send to), and <09> <E8> (interpreted as: send the message to both device E9 and device E8).

<Message To Reroute>
These byte(s) make up the message that the device will actually pass along to each of the device(s) specified in the <Receiver List>. It is important to note that there are no restrictions on what the contents of the <Message To Reroute> may contain. Often, one may nest further Reroute/Header messages inside the <Message To Reroute> portion of the message.

Figure 9B:
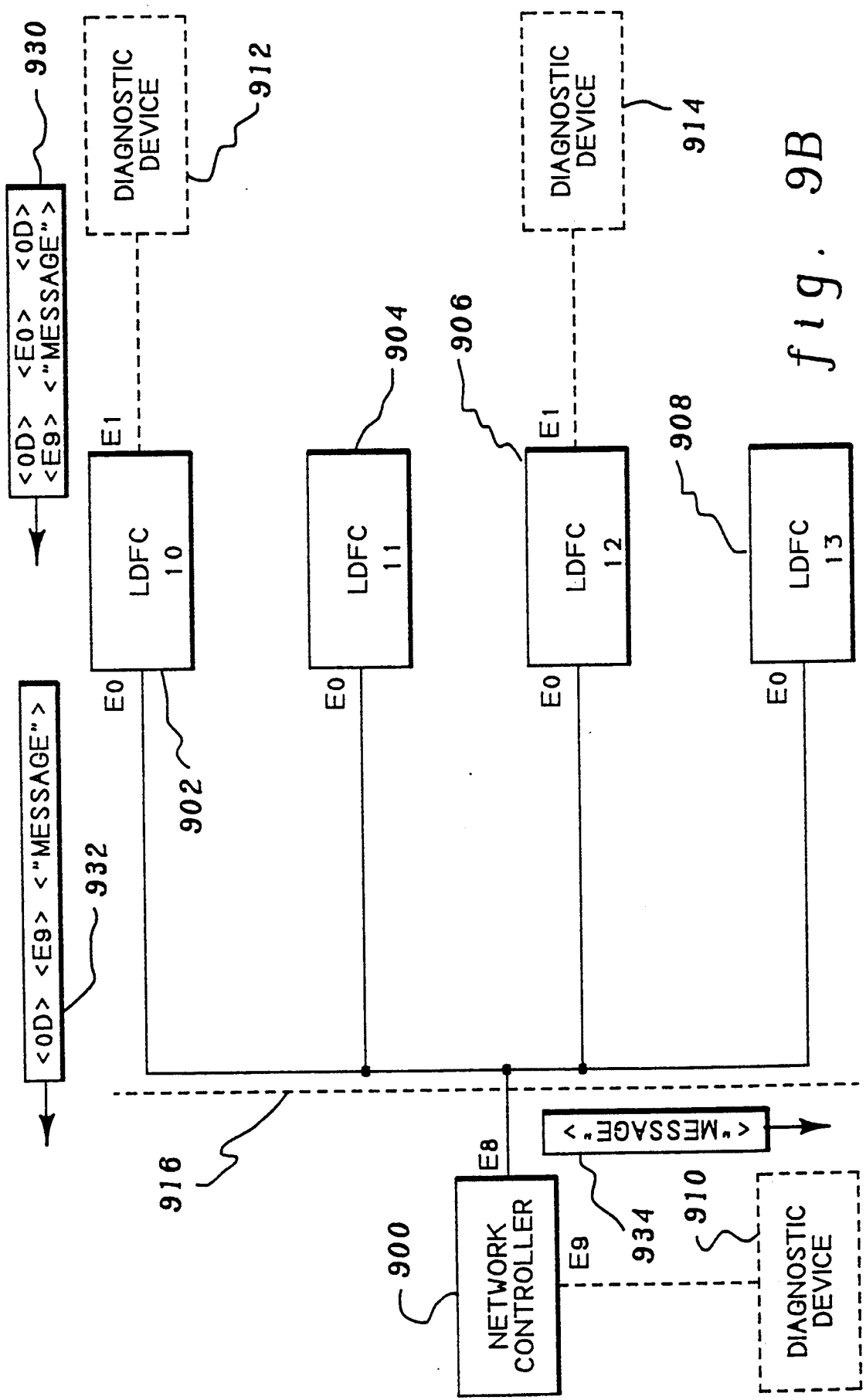
FIG. 9B presents an example of a reroute message originating from a diagnostic device connected to a LDFC and passing to another diagnostic device connected to a network controller.

FIG. 9B illustrates the processing of a Reroute message used to pass a desired <"Message"> 934 from Diagnostic Device 912 to another Diagnostic Device 910. In order for the <"Message"> 934 to get to Diagnostic Device 910, it must pass through LDFC 902 and the Network Controller 900. This is done by nesting one Reroute message inside another. Diagnostic Device 912 sends the message 930: <0D> <E0> <0D> <E9> <"Message"> to the LDFC 902. The LDFC 902 will determine that the message type is <0D>, which is the reroute message type, and that the <Receiver List> is <E0>. It will then send the remainder of the message 932, 0D> <E9> <"Message"> out to device E0. This results in the Network Controller 900 receiving the following message 932: <0D> <E9> <"Message">. The Network Controller 900 processes this message as a reroute message (due to the <0D>), and routes the remainder of the messages out to its device E9. This results in the message 934: <"Message"> being sent to Diagnostic Device 910. This has demonstrated the technique of using the Reroute processing capabilities in the routing of a message from one Diagnostic Device to another, and how the Lightning Detection Network can be used as a communications medium.

Figure 9C:
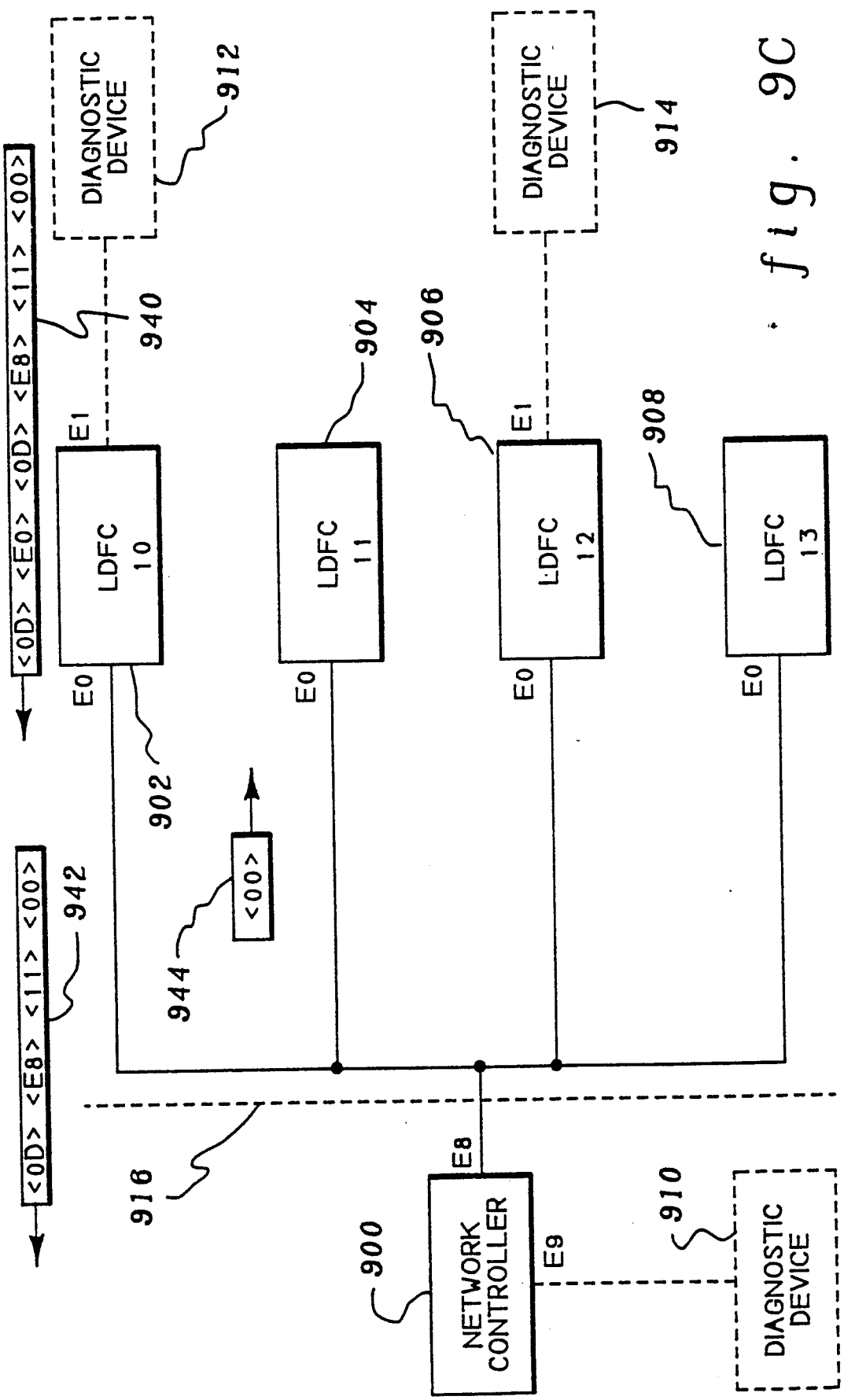
FIG. 9C presents an example of a reroute message originating from a diagnostic device connected to a LDFC and passing to another LDFC in a network.

FIG. 9C illustrates the processing of a Reroute message sent by a Diagnostic Device 912 to reset a LDFC 904 which it is not directly attached to. Initially, the message 940: <0D> <E0> <0D> <E8> <11> <00> is sent by Diagnostic Device 912. This message is received by LDFC 902 and processed as a Reroute message. The LDFC 902 reroutes the message to device <E0>, and sends the following message 942 to Network Controller 900: <0D> <E8> <11> <00>. This is then received by the Network Controller 900 which processes the reroute message <0D> instructing it to send the message contents to device <E8>. Since the message is being sent out to the network, the Network Controller 900 uses the first byte <11> to determine which LDFC is to receive the message. As a result of this processing, the Network Controller 900 will send the following message 944 to LDFC 904: <00>. The LDFC 904 will receive the message <00> and process it. This message instructs the LDFC 904 to reset as specified by our assumptions of the message processing capabilities of each LDFC in the network. This has shown how the Reroute messages may be used to allow a message to enter the network at one point, and be processed at another.

The previous examples have shown that the addition of Reroute messages has added the ability to send a message from one point in the network to any other point in the network. The Reroute message does not, however, enable one to send a message to be processed by one device and have the results of the processed message returned to any point in the network. This limitation is addressed and removed by the addition of the Header message.

Header Messages Without Tails

These messages are used in order to set the leading bytes in the response returned from a LDFC. This allows routing information to be added to the front of the normal response message, hence allowing one to reroute the destination that the LDFC or Network Controller will send its response message to.

Header messages take the general form of: <0E> <Receiver List> <0:1 Header Length:7> <Header> <Message>. The individual parts of the Header message are as follows:

<0E>
This byte is the message type. It indicates to the device receiving the message to process the message as a Header message.

<Receiver List>
These byte(s) make up the list of devices which the results of processing the message are to be routed to. In the sample implementation, a Receiver List is terminated by a nonzero value in the high nybble of a byte. Examples of valid <Receiver Lists> for the Network Controller 900 are: <E9> (a single device to send to), and <09> <E8> (interpreted as: send the results of processing the message to both device E9 and device E8).

<0:1 Header Length:7>
This byte contains the length, in bytes, of the <Header> section in the lower 7 bits (allows for a <Header> up to 127 bytes long). The upper bit being set to 0 (0:1) indicates that there is NOT a Tail portion present. Header messages with tails will be discussed later.

<Header>
These byte(s) are what the LDFC or Network Controller is to start the response message with. The <Header> bytes typically contain nested Reroute messages which will direct the response generated by the LDFC or Network Controller to the desired destination in the network.

<Message>
These byte(s) make up the message that the LDFC or Network Controller will process. The results of processing this message is appended to the end of the <Header> bytes, and the entire message is then sent to the devices specified in the <Receiver List> portion of the message.

The net affect of processing a Header message, is that the LDFC or Network Controller will send to the Device(s) specified in the <Receiver List> the following: <Header> <Response To Message>. Since the <Header> is determined by where the original message came from, it may be used to route the <Response To Message> to any point in the network.

Figure 9D:
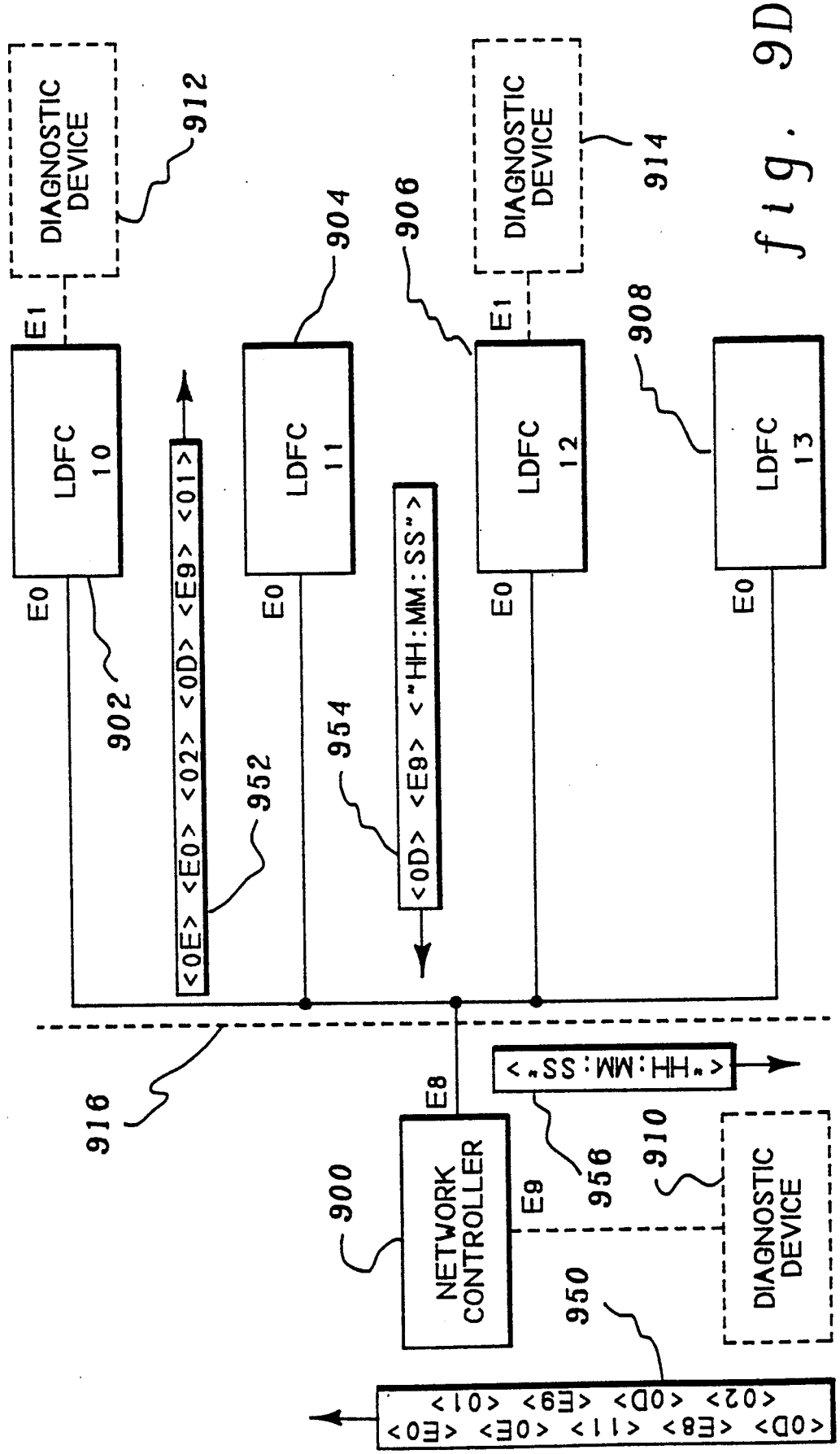
FIG. 9D presents an example of a header message originating from and returning to a diagnostic device connected to the network controller.

FIG. 9D shows the routing of a message from Diagnostic Device 910 to a remote LDFC 904 which processes the message and returns the results to the Diagnostic Device 910. In this example, it was desired for the Diagnostic Device 910 to get the current ASCII time at LDFC 904, even though the Diagnostic Device 910 was not directly connected to LDFC 904. The initial header message 950 of: <0D> <E8> <11> <0E> <E0> <02> <0D> <E9> <01> was sent by Diagnostic Device 910 to the Network Controller 900. This was then received by the Network Controller 900 which processed the reroute message <0D> instructing it to send the message contents to device <E8>. Since the message is being sent out to the network, the Network Controller 900 uses the first byte <11> to determine which LDFC is to receive the message. As a result of this processing, the Network Controller 900 will send the following message 952 to LDFC 904: <0E> <E0> <02> <0D> <E9> <01>. The LDFC 904 will receive this message 952 and process it as a Header message since the first byte is <0E>. The <Receiver List> is determined to be <E0>, and the <0:1 Header Length:7> (<02>) indicates that there is NOT a Tail portion, and that the <Header> portion is 2 bytes long. The LDFC 904 will send a response message out to its device E0 (back to the Network Controller), with the first two bytes being: <0D> <E9>. The LDFC 904 then processes the <01> as a request for its ASCII time, and appends its current ASCII time onto the end of the response message being built. As a result of the LDFC 904 processing the Header message, the following message 954 is returned to the Network Controller 900: <0D> <E9> <"HH:MM:SS">. After the Network Controller 900 receives the response message from LDFC 904, it processes the message as a reroute message due to the <0D> byte at the front of the message. The Network Controller 900 then determines the Receiver List to be only device E9, and sends the rest of the message out to its device E9 (to Diagnostic Device 910). This results in the message 956: <"HH:MM:SS"> being sent to Diagnostic Device 910. This has shown how the use of Reroute/Header messages may be used to access a remote device in a network, and return the response from the remote device to any other point in the network.

Figure 9E:
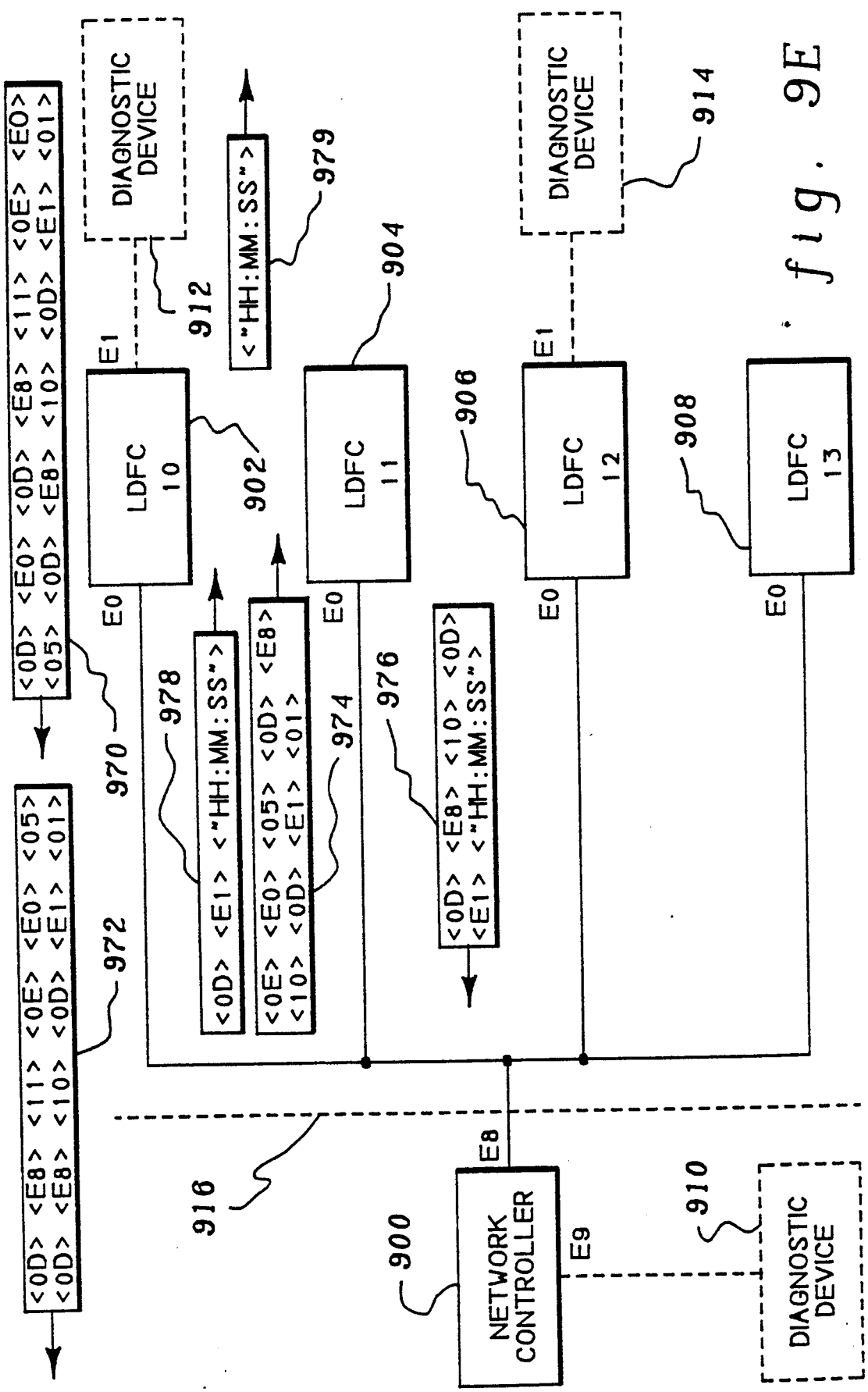
FIG. 9E presents an example of a header message originating from and returning to a diagnostic device connected to a LDFC.
Figure 9F:
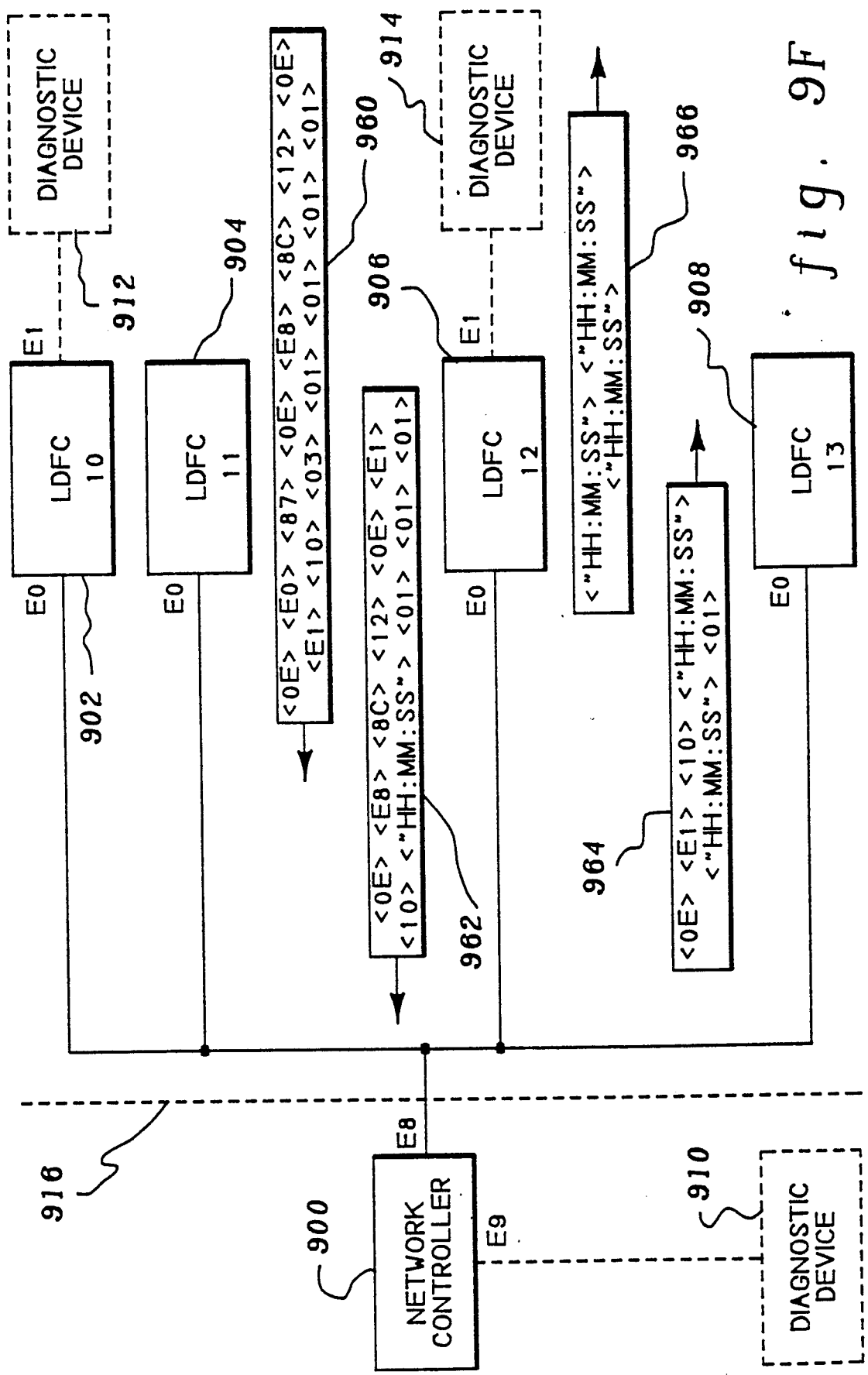
FIG. 9F presents an example of a header message with a Tail, originating from and returning to a diagnostic device connected to a LDFC.

FIG. 9E is a similar example to that shown by FIG. 9D. The difference is that the message originates from Diagnostic Device 912 which is not connected to the Network Controller 900, but to LDFC 902 instead. The purpose of this example is to show the flexibility of the Reroute/Header design in allowing access to remote points in the network regardless of the location of the device which is connected to the network. In this example, it was desired for the Diagnostic Device 912 to get the current ASCII time at LDFC 904, even though the Diagnostic Device 912 was not directly connected to LDFC 904 or the Network Controller 900. The initial message 970 of: <0D> <E0> <0D> <E8> <11> <0E> <E0> <05> <0D> <E8> <10> <0D> <E1> <01> was sent by Diagnostic Device 912 to LDFC 902. The LDFC 902 then processed the message 970 as a reroute message, and sent the following message 972 to the Network Controller 900: <0D> <E8> <11> <0E> <E0> <05> <0D> <E8> <10> <0D> <E1> <01>. This was then received by the Network Controller 900 which processed the reroute message <0D> instructing it to send the is being sent out to the network, the Network Controller 900 uses the first byte <11> to determine which LDFC is to receive the message. As a result of this processing, the Network Controller 900 will send the following message 974 to LDFC 904: <0E> <E0> <05> <0D> <E8> <10> <0D> <E1> <01>. The LDFC 904 will receive this message 974 and process it as a Header message due to the first byte being <0E>. The <Receiver List> is determined to be <E0>, and the <0:1 Header Length:7> (<05>) indicates that there is NOT a Tail portion, and that the <Header> portion is 5 bytes long. The LDFC 904 will send a response message out to its device E0 (back to the Network Controller), with the first five bytes being: <0D> <E8> <10> <0D> <E1>. The LDFC 904 then processes the <01> as a request for its ASCII time, and appends its current ASCII time onto the end of the response message being built. As a result of the LDFC 904 processing the Header message, the following message 976 is returned to the Network Controller 900: <0D> <E8> <10> <0D> <E1> <"HH:MM:SS">. After the Network Controller 900 receives the response message from LDFC 904, it processes the message as a reroute message due to the <0D> byte at the front of the message 976 and sends the following message 978 out to LDFC 902: 0D> <E1> <"HH:MM:SS">. The LDFC 902 receives this message 978 and processes it as a reroute message, which generates the message 979 <"HH:MM:SS"> being sent to Diagnostic Device 912. This has shown how the use of Reroute/Header messages may be used to access a remote device in a network, and return the response from the remote device to any point in the network, even if the network connection is made through a remote LDFC.

This section has demonstrated how the header messages are processed in order to allow one to interrogate any of the LDFCs (and optionally Network Controllers), from any point in the network, and then route the information returned from the LDFC back to any point in the network. The Reroute/Header messages permit the development of Diagnostic Devices which can perform diagnostics on any LDFC in the network or the Network Controller itself without being directly attached to the device on which diagnostics are to be performed. There are some situations where a single Header message is not enough to accomplish a desired task. These tasks happen when one wants to send a Header message to one device, and reroute the results to another device, and have that device append more information on, and so on. An example of such a task is one which measures communication delays. Communication delays are the amount of time it takes for a message to be sent from a LDFC to the Network Controller or vice versa. The next section describes how tails are used in Header messages in order to allow for tasks of this type to be done.

Header Messages With Tails

These are messages used in order to set the leading and trailing bytes in a message returned from a LDFC or Network Controller. This allows routing information to be added to the normal response, and hence allows one to reroute where the LDFC or Network Controller will send its response (as shown by the Header message examples). The ability to add tail bytes; however, provides a new capability in which it becomes possible for a single message to pass to multiple devices on the network and query each device for a specific response. For example, it will now become possible to send a message to a LDFC, and have the LDFC append it's time, and send the results to the Network Controller and have the Network Controller append its time, and send the results back to the same LDFC where it can again append its time, and then send the final resulting message (3 time stamps) to a Diagnostic Device. The Diagnostic Device can then compute from the 3 time stamps the communications delay from a LDFC to the Network Controller, and from a Network Controller to a LDFC and the total trip time.

Header messages which have tails in this example of the Reroute/Header implementation take the general form of: <0E> <Receiver List> <1:1 Header Length:7> <Header> <Tail Length> <Tail> <Message>. The individual parts of the Header message are as follows:

<0E>
This byte is the message type. It indicates to the device receiving the message to process the message as a Header message.

<Receiver List>
These byte(s) make up the list of devices which the results of processing the message are to be routed to. In the sample implementation, a Receiver List is terminated by a nonzero value in the high nybble of a byte. Examples of valid <Receiver Lists> for the Network Controller 900 are: <E9> (a single device to send to), and <09> <E8> (interpreted as: send the results of processing the message to both device E9 and device E8).

<1:1 Header Length:7>
This byte contains the length, in bytes, of the <Header> section in the lower 7 bits (allows for a <Header> up to 127 bytes long). The upper bit being set to 1 (1:1) indicates that there is a Tail present.

<Header>
These byte(s) are what the LDFC or Network Controller is to start the response message with. The <Header> bytes typically contain nested Reroute messages which will direct the response generated by the LDFC or Network Controller to the desired destination in the network.

<Tail Length>
This byte indicates the length of the tail portion of the message.

<Tail>

These byte(s) make up the tail portion of the message. The <Tail> bytes will be appended to the end of the message AFTER the LDFC or Network Controller has appended any results from processing the <Message> portion. The tail bytes are used primarily to include further <Tails> and/or <Messages> to be processed by other devices in the network as the message propagates through the network.

<Message>

These byte(s) are the message that the LDFC or Network Controller is to process. The results of processing this message is appended to the end of the <Header> bytes, and then the <Tail> bytes are appended. The resulting message is then sent to the devices specified in the <Receiver List> portion of the message.

The net affect of processing a Header message with a tail, is that the LDFC or Network Controller will send to the Device(s) specified in the <Receiver List> the following: <Header> <Response To Message> <Tail>. Since the <Header> is determined by where the original message came from, it may be used to route the <Response To Message> to any point in the network. Since the <Tail> is also determined by the originator of the message, it may be used to add further messages to process at other points in the network.

FIG. 9F demonstrates the flow of a Reroute/Header message with a tail as it propagates through the network collecting ASCII time stamps from LDFC 906, the Network Controller 900, and again from LDFC 906 returning the resulting message to the Diagnostic Device 914. The resulting message contains three time stamps which can then be used to compute communication delays from the LDFC 906 to the Network Controller 900, from the Network Controller 900 to the LDFC 906, and the round trip time. The purpose of this example is to show how the addition of Tails to a standard Header message can be used to allow multiple devices to process the same message and concatenate results to the response message. The initial message 960 of: <0E> <E0> <87> <0E> <E8> <8C> <12> <0E> <E1> <10> <03> <01> <01> <01> <01> was sent by Diagnostic Device 914 to LDFC 906. The LDFC 906 then processed the message 960 as a header message with a tail. The seven byte <Header> was <0E> <E8> <8C> <12> <0E> <E1> <10>, and the <Tail> was <03> bytes long containing <01> <01> <01>, and the message processed was <01> which caused the LDFC 906 to build a message in the following form: <Header> <"HH:MM:SS"> <Tail>. This resulted in the following message 962 being sent to the Network Controller 900: <0E> <E8> <8C> <12> <0E> <E1> <10> <"HH:MM:SS"> <01> <01> <01>. This was then received by the Network Controller 900 which processed the Header message <0E> with a tail (<8C> has the Hi-Bit set) instructing it to send the resulting message to device <E8>. The 0C <Header> bytes (<12> <0E> <E1> <10> <"HH:MM:SS"> 962) will start the response message, only one Tail byte is present (<01>), and the message to process is a request for the ASCII time (<01>). Since the message is being sent out to the network, the Network Controller 900 uses the first byte <12> to determine which LDFC is to receive the message. As a result of this processing, the Network Controller 900 will send the following message 964 to LDFC 12 906: <0E> <E1> <10> <"HH:MM:SS"> <"HH:MM:SS"> <01>. The LDFC 906 will receive this message 964 and process it as a Header message due to the first byte being <0E>. The <Receiver List> is determined to be <E1>, and the <0:1 Header Length:7> (<10>) indicates that there is NOT a Tail, and that the <Header> portion is sixteen (10 hex) bytes long. The LDFC 906 will send a response message out to its device E1 (back to the Diagnostic Device 914), with the first sixteen bytes being: <"HH:MM:SS"> <"HH:MM:SS">. The LDFC 906 then processes the <01> as a request for its ASCII time, and appends its current ASCII time onto the end of the response message being built. As a result of the LDFC 906 processing the Header message, the following message 966 is returned to the Diagnostic Device 914: <"HH:MM:SS"> <"HH:MM:SS"> <"HH:MM:SS">. This has shown how the use of Reroute/Header messages with tails may be used to access several devices in a network, and return the response from each of the devices accessed to any point in the network, even if the network connection is made through a remote LDFC.

Reroute/Header Code

The addition of the Reroute/Header processing to the normal message processing routines, which is done by the LDFC, is simple to implement. Two additional routines are added to the table of message types which the LDFC processes. The reroute message handler redirects the destination of the response message. The header message handler is more involved. While the header message also redirects the destination for the resulting message, it also starts the response message with the header bytes specified by the incoming message, and then makes a recursive call back to the normal message processing routines. By making the recursive call to the normal message processing routines, the header message routine allows header messages access to all of the functions at the LDFC which are available. Since the addition of Reroute/Header messages can be difficult to visualize, a sample section of code has been included which demonstrates how the Reroute/Header messages may be added as an "invisible" overlay to the normal message processing routines. The following will describe the included block of code used to demonstrate the addition of Reroute/Header message processing.

An example of how the Reroute/Header processing may be implemented in assembly code is shown in Appendix A. This example was compiled using Borland's Turbo Assembler version 1.0 on a COMPAQ Portable III (Intel 80286 based machine). The sample code is for a very simple LDFC. It contains two functions. The first function is message <00> which causes the LDFC to reboot. The second function (message <01>) causes the LDFC to return its current time in an ASCII format. Two other message types are used for the addition of the Reroute/Header capabilities. These are <0D> for the Reroute messages and <0E> for the Header messages.

The way that messages received and sent by the LDFC are stored in memory is shown by the data structure in lines 9002-9012. The Receivers mask 9004 contains a 16 bit field where each bit field indicates one of 16 devices (E0-EF) as the designated receiver of the message. When a Receiver List is converted into a Receiver mask by the ScanReceiverList routine 9700, the each lo-nybble is translated from its numeric representation of 0-F hex to a bit field representation of the number (ie, 0 is mapped to bit 0, 1 is mapped to bit 1, and so on). This translated value is stored in the Receivers mask field 9004. When a message has completed, such as when the EndMsg routine is called 9134, the current bit field setting in the Receivers mask 9004 is used to determine what devices to send the completed message to. The Reroute/Header messages make use of this in order to override the default value of the Receivers mask setting, and setting a new value which will determine what external devices will actually receive the resulting message. The MsgLength field 9006 is used to store how long the actual contents of the message is. The ReceivedFrom field 9008 is a byte used to store the ID of the device which the message was received from (E1 for example). The Contents field 9010 is a 256 byte space used to store the actual contents of the message in.

There are several external routines and one external data field which are used by the example code 9018-9026. These external routines are not directly related to the implementation of the Reroute/Header messages, but are used for the general purpose message processing. The implementation of each would be related to the design of a specific LDFC. A brief explanation of each of the externals follows.

AsciiTime 9018

This external is used to get the address of the location in the CODE segment where the hypothetical LDFC stores and updates its current ASCII time. It is used when processing message type <01> which requests the current ASCII time of the LDFC.

BeginMso 9020

This external routine is used to start a message. It allocates a new MsgCell 9002, and fills the Receivers field 9004 with the default value of a mask which will return the message to the device which initiated the response. It also returns a pointer to the Contents 9010 portion of the message, so data may be added to the response.

CancelMsg 9022

This external routine is used to cancel or abort the building of a message. It releases the memory used for the message, and does NOT allow the message to be sent to any external devices.

EndMsg 9024

This routine is used when a response message has been completed. It sets the MsgLength field 9006 of the response message, and prepares the message to be sent to all of the devices which are specified in the Receivers field 9004.

ReleaseMsg 9026

This routine is used once a message received by the LDFC has been completely processed. It releases the memory used for the message.

The ProcessMessage procedure 9100 is the initial entry point once a message has been received by the LDFC. It is responsible for processing the received message, and generating an appropriate response. Upon entry, it is passed a pointer to the MsgCell 9002 which contains the message to be processed. This routine then sets a pointer to the first byte of the Contents 9010 and reads in the first byte in the message 9102-9104. If the message type to process is invalid, the message will be ignored 9106-9112, otherwise, a pointer to the jump table used for processing the various message types will be computed 9114-9118. A new MsgCell 9002 will be allocated and initialized to build the response message in by a call to BeginMsg 9120. The newly allocated MsgCell 9002 will have its Receivers field 9004 set to the device which the message being processed was received from. This is the default case, where it is assumed that all response messages will be sent back to the device where the query message came from (as shown in the typical message processing example in FIG. 9A). At this point, the pointer to the message being processed is saved, and the routine which will process the received message is called 9122-9124. If the routine which processed the received message does not return any response message, it will set the Receivers field 9004 to 0 to indicate that no response message is to be sent, if this is the case, then the response message will be canceled 9128-9130. Otherwise, the response message will be sent to the devices designated in the Receivers field 9004 by a call to EndMsg 9134. Once, the message has been completely processed, the pointer to the original MsgCell will be restored, and the memory for that message will be released 9138-9140. This completes the processing of a message.

The Reboot routine 9200 simply causes the machine to reset. It will NOT return any response to a message due to the machine reset. This routine is executed whenever message type <00> is being processed.

The GetAsciiTime routine 9300 stores the current ASCII time at the LDFC on the end of the response message being built 9302-9310. Once the ASCII time has been appended to the end of the response message, it returns to the procedure which called it.

The Available routine 9400 is used to handle all of the 'holes' in the MsgJumpTbl 9030-9062. It is the routine that is called if the LDFC ever attempts to process message types ranging from <02>-<0C>. It handles these requests by setting the Receivers field 9004 in the response message to 0 so no response will be generated.

The ProcessReroute routine 9500 is used to process the reroute messages. It does so in the following manner:

1. It converts the Receiver List bytes at the front of the message to process to a Receivers mask field 9004, and resets the Receivers field in the response message being built to this new value 9502-9504.

2. The routine then computes the length of the remaining portion of the message being processed 9506-9510. Note, this implementation depends on the message being processed to be in the proper format. In order to prevent system crashes due to invalid messages, the computed length should be checked to verify that it is a positive nonzero value before continuing.

3. Once the length of the message to be rerouted has been determined, the contents of the message to reroute are added to the end of the response message being built 9512.

4. The routine then returns with the response MsgCell 9002 updated so that when the call to EndMsg is made, the response message will be sent to the devices specified in the Receiver List of the query message which may be different than the device which the message originated from.

The ProcessHeader routine 9600 is used to process the Header messages. It does so in the following manner:

1. It converts the Receiver List bytes at the front of the message to process to a Receivers mask field 9004, and resets the Receivers field in the response message being built to this new value 9602-9604.

2. The current pointer to the Header/Tail section of the message is saved 9606, and the <Header> bytes are placed at the front of the response message, and the message pointer is adjusted past the Tail section, if one is present, to the <Message To Process> 9608-9632.

3. The message type is loaded 9634, and verified to be in the acceptable range 9636-9642. If the message type is found to be invalid, further processing is halted, and the ProcessHeader routine terminates.

4. A pointer in the MsgJumpTbl 9030 is computed, and the proper routine is called to process the <Message To Process> 9644-9650. The routine called will append any results (if necessary) to the end of the <Header> portion of the response message.

5. The pointer to the Header/Tail section of the original message is restored, and any tail bytes which are present in the query message are added to the end of the response message 9652-9670.

6. The routine then returns with the response MsgCell 9002 updated so that when the call to EndMsg is made, the response message will be sent to the devices specified in the Receiver List of the query message which may be different than the device which the message originated from. The resulting response message will be in the form of: <Header> <Response To Message> <Tail>.

The ScanReceiverList routine 9700 is used to convert a Receiver List into a bit mask representation (Receiver Mask) where each bit corresponds to one of the sixteen different devices. In this implementation, a Receiver List is assumed to have no specific length. It is made up of a sequence of bytes where the Lo-Nybble represents the device number (0-F interpreted as E0-EF), and a nonzero value in the Hi-Nybble marks the end of the Receiver List. Initially, the ScanReceiverList routine 9700 clears the register used to store the resulting Receiver mask 9702. It then loads one byte at a time from the pointer passed to it, converting the Lo-Nybble to a bit mask and adding the new bit mask to the Receiver mask being built 9706-9716. Once a byte has been reached such that the Hi-Nybble is not zero, the resulting Receiver mask is returned to the calling procedure 9718-9720.

The addition of networking capabilities to the LDFC have been added by the addition of the three routines ProcessReroute 9500, ProcessHeader 9600, and ScanReceiverList 9700. The addition of these capabilities is invisible to the original design of the LDFC since it will still process any of the originally designed messages the same as it always has. The addition has required a minimal amount of code to be added (less than 256 bytes), and no impact upon the processing power available to the LDFC for continuing in its task of collecting data. The addition has, however, provided a means in which external devices connected to the network may access and control any other device connected to the network without a direct connection being made between the two devices.

Watchdog Timer Software Interface

Figure 8A:
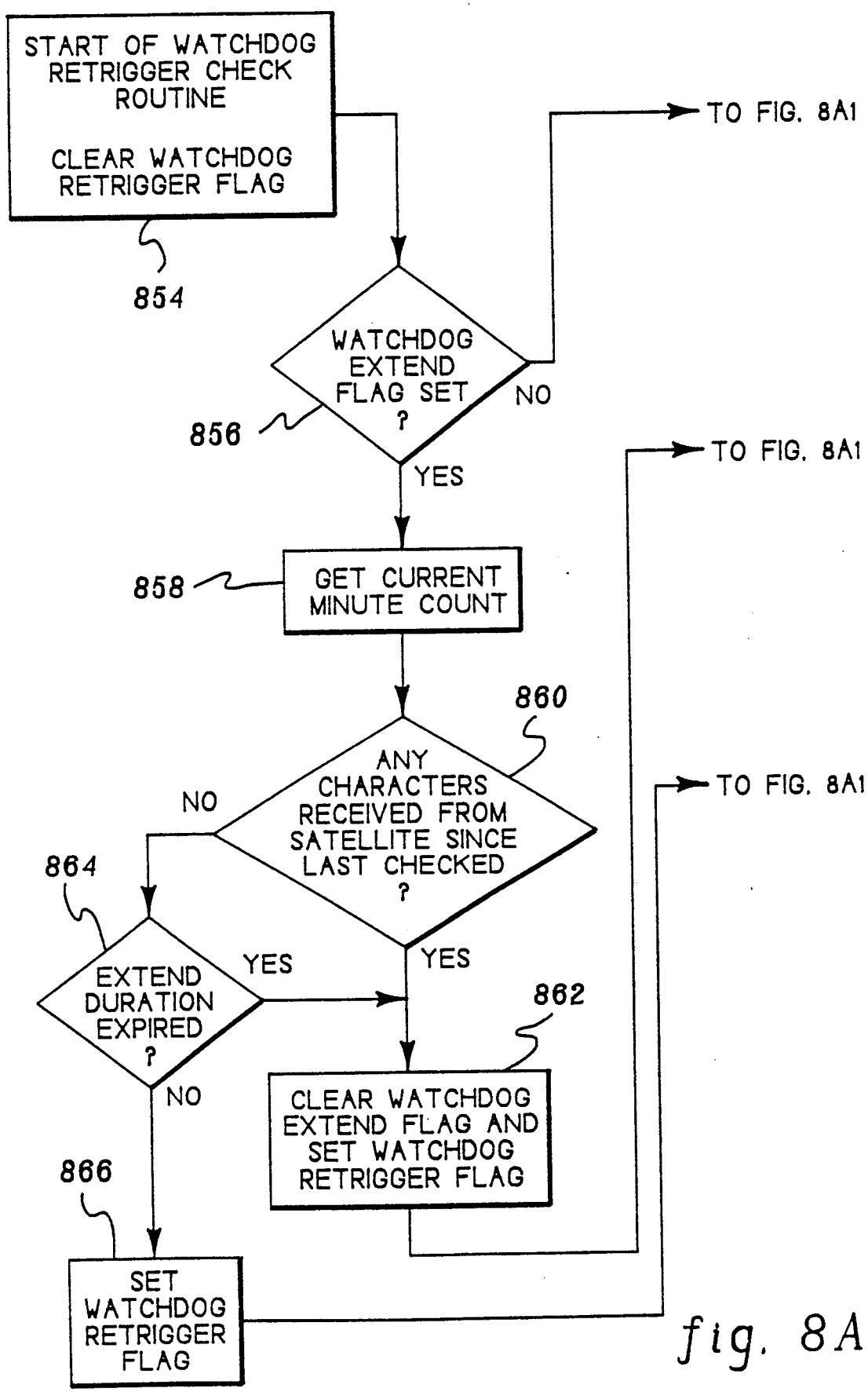
FIG. 8A is a flow diagram of the watchdog timer routines employed after LDFC initialization.
Figure 8B:
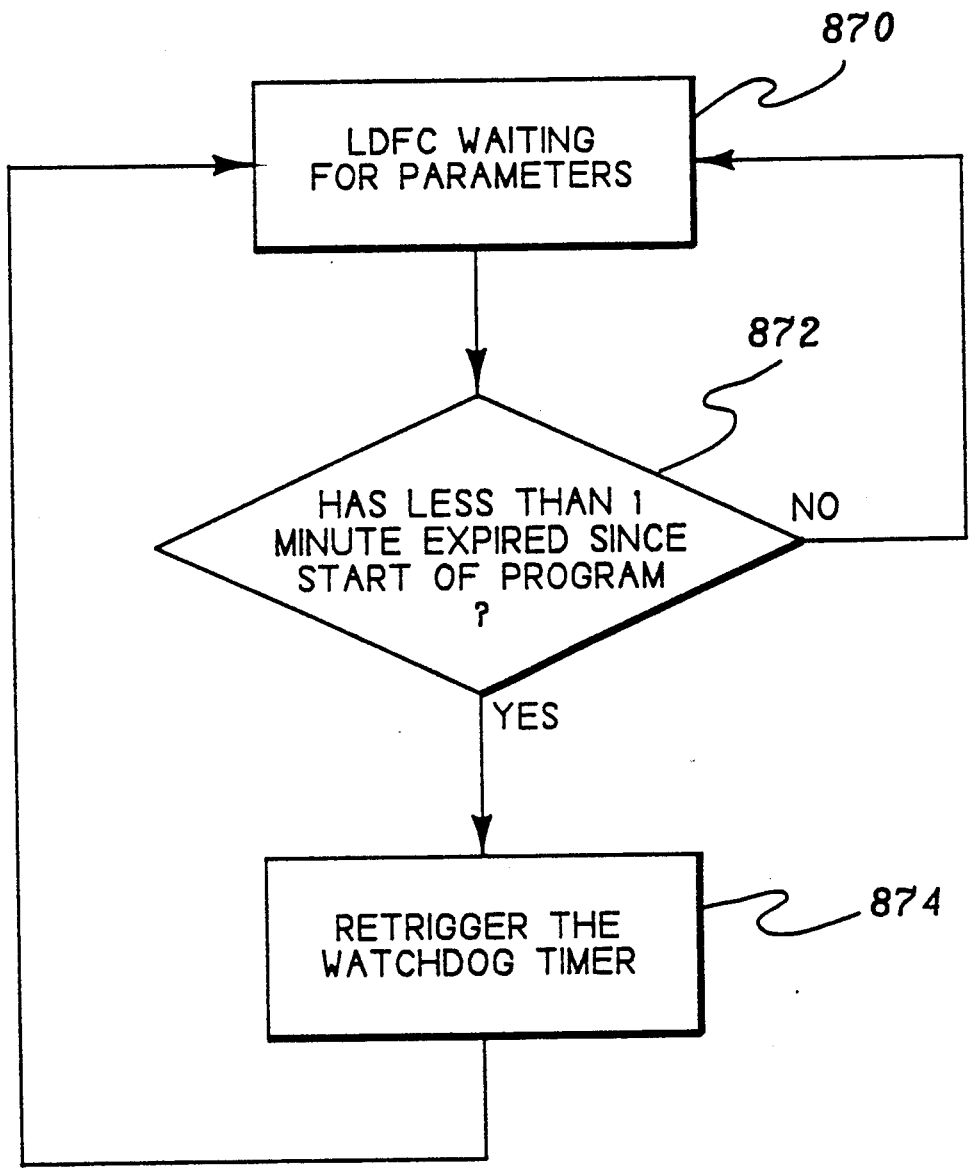
FIG. 8B is a flow diagram of the watchdog timer routines employed prior to LDFC initialization.

FIG. 8A and FIG. 8B demonstrate by means of flow diagrams the actual software routines that are used in conjunction with the watchdog timer circuitry. FIG. 8A pertains to the code that is normally executed in the main routine once the LDFC is up and running, while FIG. 8B relates to the code that is executed while the LDFC is waiting for its parameter table from the Network Controller 104 during initialization. The main concept associated with the watchdog timer, designed on the Interface Facility, requires the watchdog to be retriggered prior to the timeout period of the watchdog maximum retrigger duration 818 (typically 26 seconds), otherwise, the LDFC will be reset. This concept allows the software to check for the occurrence of certain conditions at the LDFC before the watchdog is retriggered. The current implementation of the LDFC's software checks for the presence of data communications, either by satellite of synchronous ingest, before retriggering the watchdog. Also, if the LDFC's software crashes, the watchdog will not be retriggered regardless of data communications.

Referring now to FIG. 8A, one of the main routine's schedule handler entries 646 checks and determines if the watchdog timer needs to be retriggered. The periodicity of checking to retrigger the watchdog timer is variable due to the nature of the execution of main routine scheduled entries, but this is much less than the timeout period of the watchdog maximum retrigger duration 818. Upon entering the watchdog check routine, the watchdog retrigger flag is cleared (Step 854). If this flag is set at the end of this routine, then the watchdog timer will be retriggered, thus preventing a reset to the LDFC. The watchdog extend flag is checked next to see if it is set (Inquiry 856). The use of the watchdog extend flag allows the LDFC not to be reset if data communications terminates over the satellite communication link. This is very useful when planned downtime occurs at the Network Controller 104 and lightning activity is occurring within the network. To avoid the loss of detected lightning data during the downtime, a special watchdog extend command, which sets the watchdog extend flag, can be sent to all the LDFCs throughout the network. This extends the watchdog retriggering at the LDFCs, even though data communications has terminated. The watchdog extend command contains a duration in minutes for the length of time the extend period is to last. A maximum of 60 minutes is allowed in the present implementation. One has to be careful not to allow this to be too long in duration, because of the possibility of the satellite serial communications failing. The watchdog extend flag is cleared (Step 862) by two different conditions. The first, the watchdog extend period has expired (Inquiry 864), or the second, communications has resumed over the satellite link (Inquiry 860) prior to the extend duration expiring. If the watchdog extend flag is set, then the current minute count is obtained (Step 858) so that the extend duration can be checked (Inquiry 864). If satellite communications has not yet resumed (Inquiry 860), and the extend duration has not expired (Inquiry 864), then the watchdog retrigger flag will be set (Step 866), hence extending the LDFC's operation without resetting.

The majority of the time, the extend flag is cleared and the code will determine if communications over the satellite link has occurred since last checked (Inquiry 842). If so, the watchdog retrigger flag is set (Step 850). The code next determines if communications over the synchronous link has occurred since last checked (Inquiry 844). Once again, if synchronous communications has occurred, the watchdog retrigger flag is set (Step 852). Finally, at the end of the routine, the watchdog retrigger flag is checked to see if it is set (Step 846). If set, the watchdog timer is retriggered (Step 848) and the LDFC's operation is extended without resetting. If cleared, program flow will return back to the main routine's schedule handler (Step 840). The watchdog retrigger flag being cleared indicates that data communications was absent the last time the watchdog check routine was executed. If the absence of data communications persists, the watchdog timer circuit will eventually timeout and reset the LDFC.

Referring now to FIG. 8B, when the LDFC software is initializing, it must obtain its parameters (Step 870) from the Network Controller 104 in order to establish its operational state. During the waiting period, the watchdog timer is continually being retriggered (Step 874) for a period of one minute (Inquiry 872). If the parameters at the LDFC are not received within this minute, the retriggering of the watchdog timer will discontinue. The LDFC will then continue to wait for its parameters until the timeout period of the watchdog maximum retrigger duration 818 expires or the parameters are received. In the present LDFC implementation, the total waiting time period for parameters is approximately 86 seconds (1 minute for parameter waiting, and 26 seconds for the watchdog maximum retrigger duration) before the LDFC will be reset and restart the same procedure over again. The extended retriggering time period during initialization is necessary to guarantee parameter reception at the LDFC.

Display/Sound/Keyboard Features

The LDFC can be configured to provide diagnostic output to a real or virtual display and the PC-AT speaker in addition to the LED display on the Interface Facility. The LDFC will also accept input from a real or virtual keyboard as well as from messages received from external devices. These additional input/output functions are supported in order to aid in diagnostics, repair, and the installation processes associated with an LDFC, as well as to help in the development of software enhancements.

Sound Output

Normally, a LDFC will not have a physical display system attached due to the extra cost in providing a video display adapter and monitor, and to the extra power required to drive the monitor. The only visual output as a result of this is the bank of 10 LEDs located on the Interface Facility. These LEDs aren't even visible if the PC-AT which contains the Interface Facility has not been opened. In order to provide a field service engineer who is either repairing or installing a LDFC with some feedback as to the performance of the LDFC without using a display system, use is made of the internal speaker on the PC-AT. On power up, the LDFC will continually emit a low pulsating beat if program execution has reached the point where the LDFC waits for its parameter table from the Network Controller. If this sound is heard, it indicates to the field service engineer that the LDFC hardware is functioning well enough for the software to start executing. If this sound is not heard, it indicates to the field service engineer that the LDFC hardware is faulty and requires repair.

Once the parameter table has been received, the LDFC will play the first few notes from the "We're in the Money" melody. If this tune is heard by the field service engineer, then it can be assumed that the LDFC was able to communicate with the Network Controller properly. Failure of this tune to be played (low pulsating beat continues until the LDFC resets), indicates that the LDFC is unable to communicate with the Network Controller.

Once the LDFC has received its parameters, it will use the speaker output to indicate when special conditions have occurred (such as when the internal counts at the LDFC are being zeroed by an external device, or another external device is accessing the LDFC's Satellite Clock). In addition to playing tunes to indicate special conditions, the LDFC will also issue a short distinguishable beep each time a lightning return stroke is detected. The stroke beep is used by the field service engineer to verify that the LDFC is recording lightning return stroke data on the lightning return strokes detected by the ADF 80-02.

While the sound output is very useful, it is not always appropriate for the LDFC to emit diagnostic tones. Such cases occur when the housing for the LDFC equipment is in an environment shared by people. The diagnostic sound output at the LDFC can be disabled when necessary by setting a configurable flag in the parameter table which the LDFC receives from the Network Controller. The low pulsating beat which the LDFC emits prior to receiving its parameter table can also be disabled when necessary by the use of one of the auxiliary switches on the Interface Facility.

The Keyboard

The use of a keyboard and display was found to be very helpful in the LDFC software design, development, and testing process. During this time, different versions of the LDFC software could be compiled, and run on a dedicated test system. Different commands could then be issued to the LDFC by use of the keyboard, such as being able to reset the internal buffers, or zero the internal counts. It was desired to allow for the keyboard commands to still be functionally available on all LDFCs in a Lightning Detection Network, even if the LDFC did not have a physical keyboard attached to it. This lead to the 'virtual' keyboard concept which was programmed into the LDFC software.

Since the Reroute/Header capability programmed into the LDFC software allows any external device in the Lightning Detection Network to access any LDFC in the network, it was possible to design a Reroute/Header message which contains a keyboard scan code for the LDFC to process. This allows for keyboard commands, which are to be processed by the LDFC, to originate not only from a physical keyboard, but also in a message form from an external device. Using this technique, a Diagnostic Device was later designed, which could record keyboard scan codes from the keyboard attached to it, and send them to a specific LDFC in the Lightning Detection Network to process as if the keyboard scan codes originated from a physical keyboard attached to the LDFC.

LED Output

A bank of 10 LEDs 332 are present on the Interface Facility. Two of the LEDs are used to indicate status on the Watchdog Timer Hardware and System Reset Occurrence and are not accessible by the LDFC software. The other 8 are used by the LDFC software for visual output to indicate operation status. Initially, the entire set of 8 LEDs are flashed on and off in unison until a parameter table is received from the Network Controller. Once the parameter table has been received from the Network Controller, then each of the 8 LEDs accessible by the LDFC software is used in the following manner.

LED 1

This LED is continually blinked on and off by the main routine of the LDFC software to indicate that the main routine is running properly.

LED 2

This LED is briefly lit by the Stroke Interrupt Routine whenever a lightning return stroke is detected.

LED 3

This LED is lit whenever the Out Of Lock Interface 424 has indicated that the Satellite Clock has lost sync with the GOES satellite timing signal for an extended duration of time (typically 10 minutes).

LED 4

This LED is lit whenever the temperature in the structure enclosing the Direction Finder equipment has fallen below 0 degrees Celsius or risen above 40 degrees Celsius.

LED 5

This LED is briefly lit whenever a message is received over the Satellite Device. It is used to indicate that communications from the Network Controller to the LDFC are working properly.

LED 6

This LED is briefly lit whenever a message is transmitted to the Satellite Device. It is used to indicate that messages are being emitted from the LDFC towards the Network Controller.

LED 7

This LED is briefly lit whenever an ASCII message is received from the Satellite Clock. It is used to indicate that the Satellite Clock is responding to the ASCII messages which the LDFC has sent to it.

LED 8

This LED is briefly lit whenever an ASCII message is being sent to the Satellite Clock. It is used to indicate that the LDFC is issuing ASCII commands to the Satellite Clock.

The Display

The use of a display was found to be very helpful in the LDFC software design, development, and testing process. It was later desired to have the ability to activate the LDFC display software at remote direction finder locations which did not have video adapters or monitors. In order to accomplish this, the LDFC software was designed to detect the presence of a hardware video adapter 214 installed in the LDFC. If an adapter was detected, then the LDFC will do all of its screen I/O to the adapter. Otherwise, a block of system RAM will be allocated, and used as a 'virtual' screen adapter 214 (all screen I/O will take place in this allocated block of RAM). Regardless of whether an LDFC has a real or virtual screen, all of the screen information currently displayed may be accessed by any external device in the network using the proper Reroute/Header message.

Since most LDFCs are not normally monitored visually, and the updating of screen information requires CPU time, the LDFC was designed such that its screen I/O could be enabled and disabled on the fly. A summary of the different display modes supported by the LDFC are shown in FIG. 10-FIG. 10G. The following description explains the importance of each of the display modes, and how the display modes may be used for diagnostics.

The title line which appears on the first line in all of the display modes is used to show the 2 character network abbreviation for the LDFC (MS), the network ID byte (1B), the title 'SUNY-ALBANY LDFC', the version of software (v2.1P), the current temperature (+21), and the current time and time quality at the LDFC (01/05/90 19:39:40.8831 - the blank in the middle indicates an 'Excellent' Time Quality). Additional warning indicators may appear on this line if circumstances warrant such an event.

The 9 lines below the title line that appear on the screens shown in FIG. 10, FIG. 10A, FIG. 10B, FIG. 10E, FIG. 10F, and FIG. 10G are used to show information about the various devices attached to the LDFC, and the general system information. Information in this area indicates the number of bytes in the receive or transmit buffer of each device, and the number of errors which have occurred on the device, and the last 8 error codes. The System area contains information with regards to the state of the Satellite Clock, the run time, the duration elapsed since the counts have been zeroed, Interface Facility information, and ADF 80-02 information.

Figure 10A1:
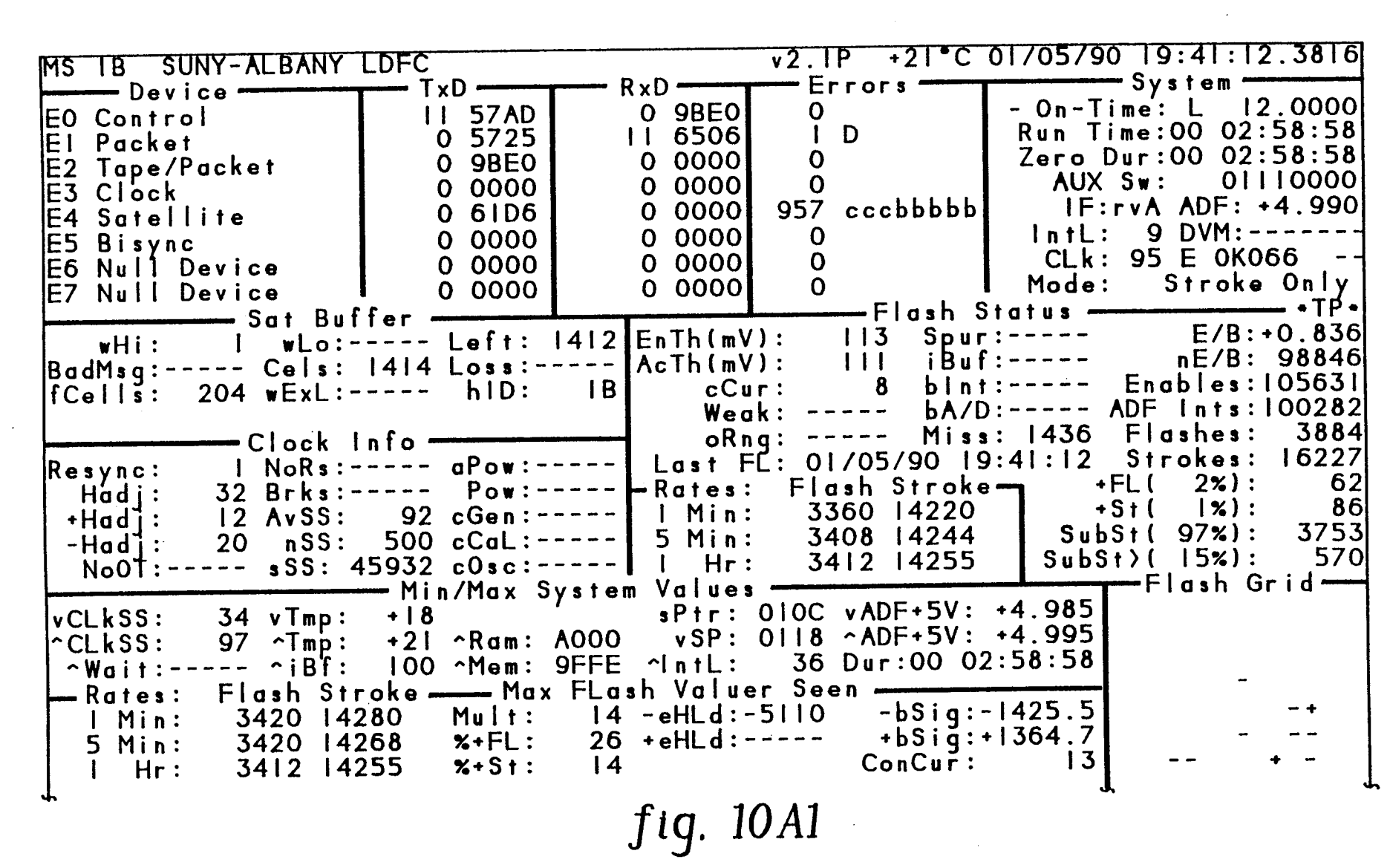

The Main Buffer Usage area FIG. 10, FIG. 10A, and FIG. 10B contains information describing the memory usage for messages which have been received or are buffered for transmission. When an extended watchdog retrigger period is entered (as described previously in the Watchdog Timer Software Interface), the wExL field will indicate the number of minutes until the extend period ends. The current hardware ID, which is determined from the Interface Facility, is also displayed in this area.

The Flash Status area FIG. 10, FIG. 10A, and FIG. 10B contains information in regard to lightning return stroke data collected by the LDFC. Items in this area relate to: E/B ratios, enable counting, interrupts from the ADF 80-02, flashes seen by the LDFC, strokes seen by the LDFC, statistics on positive flashes and flashes with more than one return stroke, the time of the last flash, the current enable and acceptance threshold values, counts of undesired events, and a table containing the hourly flash and stroke rate as computed over the last minute, last 5 minutes, and last hour of time.

The Clock Info area FIG. 10, FIG. 10A, and FIG. 10B contains information in regard to the synchronization and communications errors which may occur between the LDFC and the satellite clock. The following values are included: the number of times which the LDFC was required to resynchronize its internal time with the time at the Satellite Clock, the number of times the LDFC's internal time had drifted by exactly 100 microseconds with respect to the Satellite Clock, the number of times which the On-Time interrupt ceased, the number of failures of the clock to respond to an ASCII message, the number of serial BREAK interrupts issued to the Satellite Clock to restore communications, statistics on the signal strength at the Satellite Clock from the GOES satellite, the number of power interrupts issued to the Satellite Clock to restore communications, the number of times the clock experienced power interrupts, the number of general communications errors which have occurred in messages processed by the clock, the number of calculation errors, and the number of oscillator errors at the Satellite Clock.

The Min/Max System Values area FIG. 10, FIG. 10A, and FIG. 10B contains minimum and maximum values related to observed events. These values include the following: the minimum and maximum signal strength registered by the Satellite Clock with regard to the timing signal broadcast over the GOES satellite, the maximum number of messages that were ever buffered for the satellite device, the minimum and maximum temperature inside the structure housing the Direction Finder equipment, the maximum number of strokes that were ever buffered at one time in the stroke buffer array 500, the total amount of RAM in the system, the maximum memory address which the LDFC software uses, the current stack pointer, the minimum size (in bytes) which was left in stack memory at any point during program execution, the maximum load detected on the system due to interrupt processing, the minimum and maximum voltage readings from the +5 volt output from the ADF 80-02 power supply, and the duration that has elapsed which these counts were collected over.

The Max Flash Values Seen area FIG. 10, FIG. 10A, and FIG. 10B contains values related to maximum flash qualities which were detected by the LDFC. These include the following: the maximum hourly flash and stroke rates ever seen by the LDFC, the maximum multiplicity in a flash detected by the LDFC, the maximum negative and maximum positive E-held signals digitized from the ADF 80-02, the maximum negative and maximum positive B-Field signal strengths seen by the LDFC, and the maximum number of concurrent flashes which were open for additional stroke records at one point in time.

The Flash Grid area FIG. 10, FIG. 10A, and FIG. 10B is a display which estimates the relative locations where the lightning return stroke data detected by the LDFC is with respect to the direction finder location. Note, that these locations are only estimates based on azimuths and signal strengths of each stroke and not very accurate. This display is use when one wants a general approximation of what direction the lightning is with respect to the LDFC location.

The Satellite Clock Status area FIG. 10, FIG. 10A, and FIG. 10B, contains additional information with respect to clock synchronization. These include the following: the time which the LDFC last gained synchronization with the Satellite Clock, the time which the LDFC was last in sync with the Satellite Clock, the last time the LDFC had a 'Poor' time quality, the number of times which the LDFC left the 'Excellent' time quality state, the number of times which the Satellite Clock improperly decoded the NIST time, the number of times which the Satellite Clock was determined to have an improper internal delay value setting, the actual delay value stored in the Satellite Clock, the duration which the LDFC has been in sync, the duration which the LDFC has been out of sync, and the time period remaining until the LDFC will transition from a 'Marginal' ('?') time quality to a Poor ('*') time quality.

The DFC Parameters area FIG. 10, FIG. 10A, and FIG. 10B contains the current settings of each of the configurable parameters stored at the LDFC site. What each of the values displayed here are used for was more thoroughly described previously in the Parameter Table section of this document.

The Bisync Status area FIG. 10, FIG. 10A, and FIG. 10B, contains information with regard to the performance of the bisynchronous communications device. The information displayed in this area includes: the number of parity errors, the number of flashes sent, the number of checksum errors, the number of flashes which were unable to be sent to the bisynchronous device, the overrun errors, the number of strokes which were unable to be sent to the bisynchronous device, the number of times which the LDFC was polled by the Network Controller, the number of flashes buffered to be transferred to the Network Controller, the number of times the Network Controller had to repoll the LDFC for the same message, and the number of strokes buffered to be transferred to the Network Controller.

Below the Bisync Status area in FIG. 10, information on the flash records collected by the LDFC are displayed. This information includes the time and time quality when the flash occurred, ASCII indicators showing when a flash was determined to be simulated through software, simulated using the test pulser on the ADF 80-02 unit, or determined to be weak in signal strength by the criteria set in the LDFC's parameter table. Next, the digitized values in the N-S and E-W components are displayed, and what gain mode the ADF 80-02 was in when the first stroke of the flash was detected. This is followed by the digitized reading of the E-held component and the computed magnetic field signal strength and azimuth indication showing the direction of the lightning return stroke occurrence relative to the location of the LDFC. The last column shows the multiplicity of the flash. The multiplicity of the flash indicates the number of lightning return strokes that make up the flash record.

The specific information on each stroke making up a flash record is displayed below the flash display area in FIG. 10. Note that this stroke information is only displayed for the most recent flash (the one at the bottom of the flash display area). The information displayed on each stroke of the flash includes the following: the time offset of each stroke in the flash in 100 microsecond units from the time of the first stroke in the flash record, the N-S & E-W components of the stroke, the gain mode, the digitized E-held component, and the computed magnetic field strength and azimuth.

FIG. 10A shows a LDFC screen when the LDFC is in a Stroke Only display mode. This display is identical to the display shown in FIG. 10, except for the very bottom area. In this area, stroke information is displayed in a scrolling fashion with the most recent stroke being at the very bottom of the screen. The strokes are not displayed in the manner which they are grouped into flash records, and all of the information (including an absolute time) is displayed for each stroke. The multiplicity column is left blank, since multiplicity is associated with flash data records and has no meaning with single stroke records. This display mode is useful when one wants to view all of the stroke information as it occurs and not in the packetized flash record format.

FIG. 10B shows a LDFC screen when the LDFC is in a Flash Lock display mode. This display mode is almost identical to the one shown in FIG. 10, except that in this mode, a flash has been 'locked' onto. As a result of this, the last flash displayed and all of the information on its subsequent stroke data will remain on the display. While information in regard to the first stroke and the multiplicity of subsequent flashes will be displayed in the scrolling display rows above the locked flash. This display mode is provided in order to allow the user to freeze the display on the current flash data record, without freezing all screen I/O.

FIG. 10C shows a LDFC help screen which informs a user of all of the keyboard commands which the LDFC will recognize and process.

FIG. 10D shows another help screen which informs a user of what each of the possible ASCII character codes refer to. These ASCII error codes may appear on FIG. 10, FIG. 10A, FIG. 10B, FIG. 10E, FIG. 10F, and FIG. 10G next to the error count which is displayed in the device status area in the upper portion of the display.

The first 10 lines of the display on FIG. 10E contain information already discussed. The remaining section contains more specific information on each device with respect to the serial communications chip used for passing messages to their respective external devices. The information displayed for each serial communications chip associated with the respective external device includes the following: the type of serial communications chip used, the I/O port address used to access the first control register of the communications chip, the I/O port address used for the transfer of data to and from the communications chip, the count of overrun errors, the number of times which Clear To Send (CTS) has gone high, the number of times which CTS has gone low, the current state of CTS (hi or lo), the number of times which Carrier Detect (CD) has gone high, the number of times which CD has gone low, the current state of CD (hi or lo), the number of times which Sync Detect (SynDet) has gone high, the number of times which SynDet has gone low, and the current state of SynDet, the number of times which the Break interrupt has gone high, the number of times which the Break interrupt has gone low, the current Break interrupt indicator, the number of parity, the number of framing, the number of under run errors, and the number of unknown errors. The bottom two of lines each area are used to display the current contents of the read and write registers associated with each communications chip.

Figure 10F1:
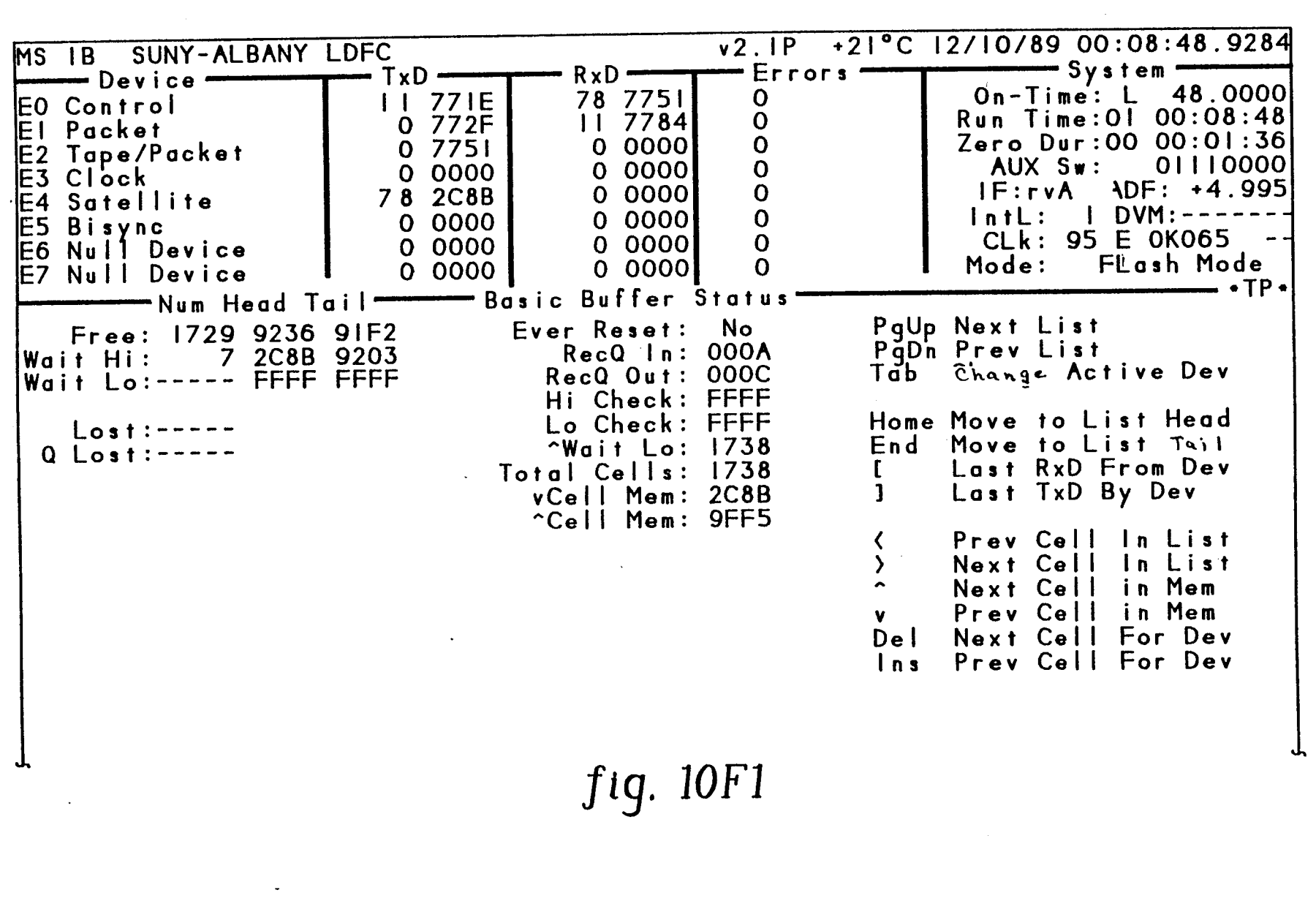
Figure 10F2:
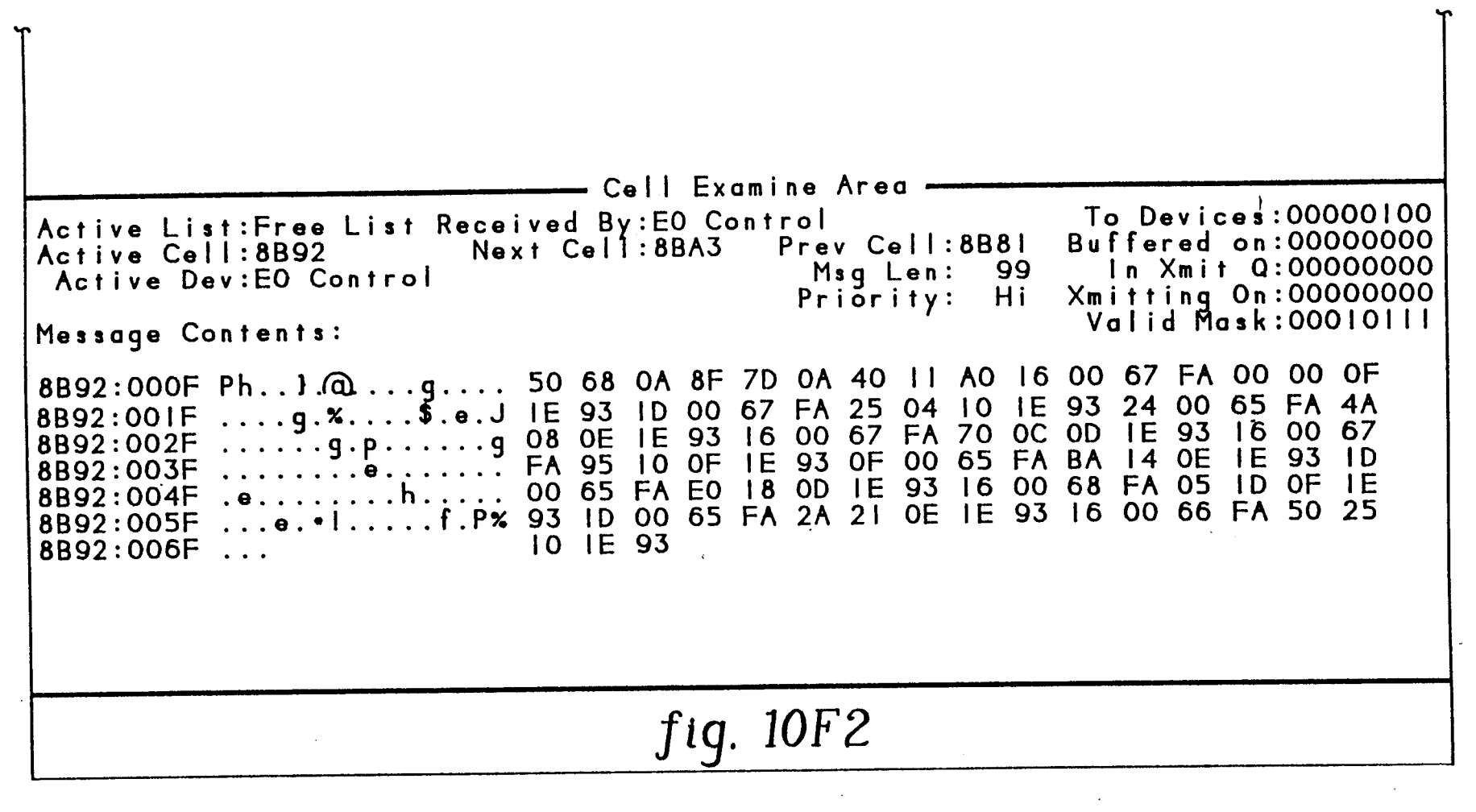
Figure 10G2:
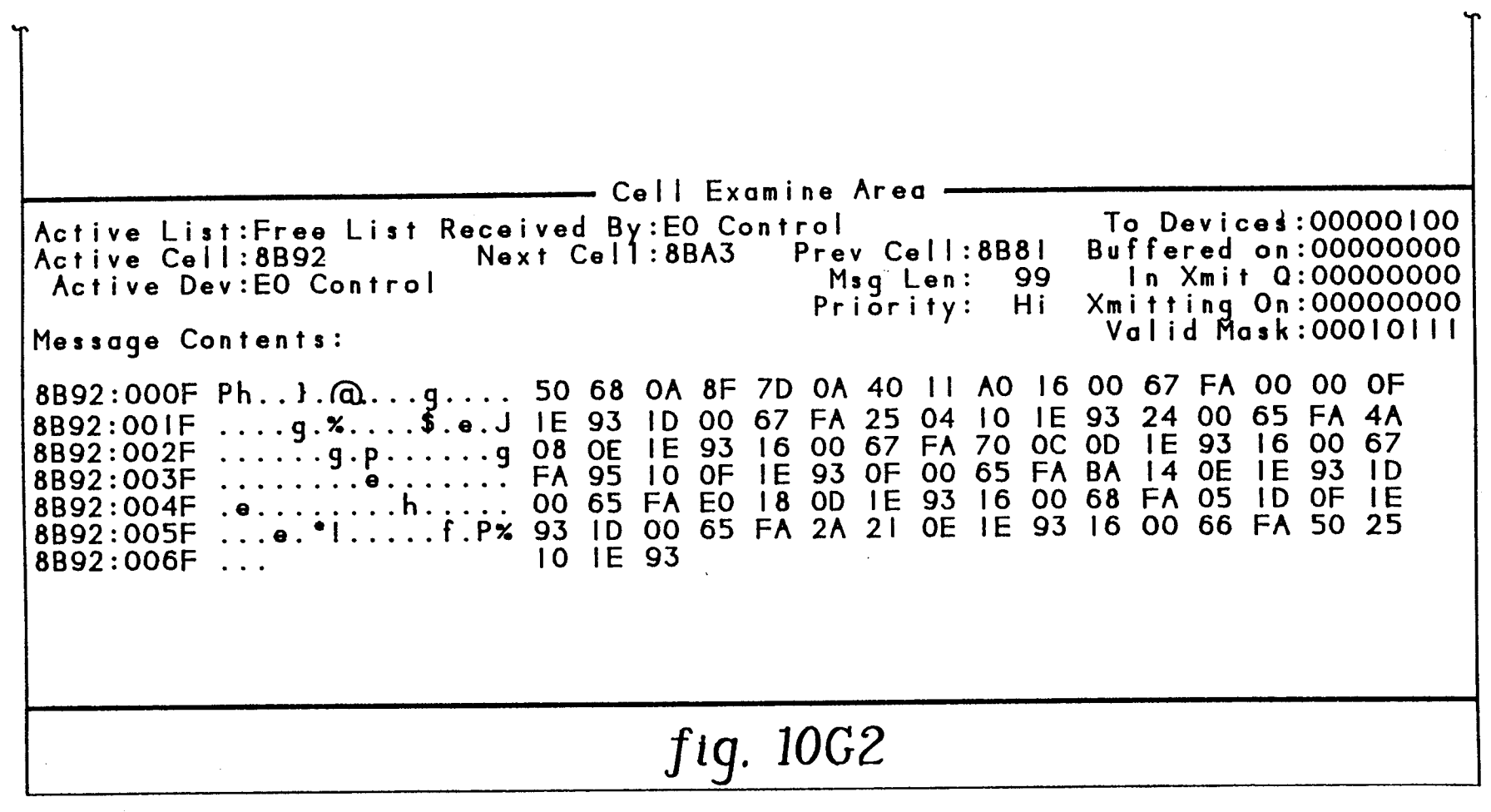

FIG. 10F shows the display used to show information on the internal buffering of messages. The information on the upper 10 lines has been discussed previously. A link list is used to allocate message memory cells for storing individual messages which are received at the LDFC, or are to be transmitted by the LDFC. The free list contains all of the memory cells available for the buffering of new messages. The number of available memory cells, the segment memory pointer to the head of the link list, and the segment memory pointer to the tail of the link list are all displayed. Information on the link lists used to hold the messages buffered with high and low priority is also displayed in a similar fashion. A count of the total number of messages lost to buffer overflow and messages lost from the receive queue overflow are displayed below the link list information. An indicator with regards to whether the buffers have ever been reset is displayed. The current value of the In and Out pointers into the receive queue are displayed. The current point in the high and low priority buffer list which is being checked to see if it is possible to process the buffered message is also displayed. The maximum number of message cells which have ever been buffered at any point and the total number of message cells available are displayed below this. Following this, the segment memory address of the start and end of the memory which was allocated for the link list message cell buffers are displayed. The far right column displays help information with regard to the use of keyboard commands to examine the message buffer memory used for storing messages.

The Cell Examine Area in FIG. 10F and FIG. 10G is used for diagnostic purposes when examining individual messages which have either been processed by the LDFC or are buffered to be processed by the LDFC. Information on which cell is currently displayed are shown. The information about each message cell includes the following: the device which the message was received from, a pointer to the message cell which follows the current one in the link list, a pointer to the message cell which is previous to the current one, the length in bytes of the message, whether the message cell was buffered in the lo or hi priority list is also displayed, the devices which the message was to be buffered to, which devices the message is still buffered for, which devices the message is buffered for transmission, which devices are currently transmitting the message, and the current bit mask of all valid devices. Finally, both the ASCII and hexadecimal representation of the contents of the message are displayed.

The Device Status Area of FIG. 10G displays information not present in the device status area in the upper portion of the screen. The specific information which is displayed with respect to the transmit and receive buffers of the device include the following: the message pointer which points at the current message to be processed for the device, a count of the messages buffered is displayed, the count of the number of bytes buffered in the device's receive and transmit queue, the number of messages and bytes which have been lost with regard to receive or transmit buffer overflows, the current state as well as the initial state addresses, and whether the device is actively transmitting or receiving a message currently. A second column displays the type of serial communications chip used by the device, and the base port address of the data and control port for the communications chip are also displayed.

Time Correction Method

A LDFC that is in very close time synchronization with NIST time is a necessary condition in order for its lightning return stroke data to be used by a lightning location processor device 108 either for a real-time or archival purpose. Knowledge of the synchronization state of an LDFC is indicated by an appropriate time quality marker as described before under the section 'LDFC Clock Software Interface'. A problem does occur when the satellite clock loses time synchronization with the GOES satellite timing signal or the satellite clock fails completely. A need exists to synchronize a LDFC that has lost time synchronization with respect to NIST time so that its lightning return stroke data can be utilized. If the satellite clock does fail, an internal 1 MHz TCXO 402 reference frequency keeps the internal 3 channel counter 412 running so that the LDFC's internal time still maintains a resolution of 100 microseconds.

Fortunately, a LDFC that is out of sync can have its internal time adjusted very close to NIST time, by a command sent to the LDFC. The method of external time syncing a LDFC can be achieved by using the time difference between the subsequent strokes and the first stroke (further referred to as the: TDs) detected by the LDFC and the TDs detected by neighboring LDFCs that are in sync with NIST time.

FIG. 11 shows an example of lightning flash records from three different direction finder sites. Two of the LDFCs Sa and Ra, having flash records 1110 and 1120, respectively, are in time synchronization as indicated by the 'blank' (' ') time quality marker, whereas LDFC My, having flash record 1100, has a 'Never Been In Sync' ('@')indicating an out of sync LDFC. Underneath the absolute time of the first return stroke for each flash record 1100, 1110, and 1120 are the TDs in 100 microsecond units. Also shown for each of the flash records are the total stroke count, azimuth from the LDFC to the return stroke, the peak magnetic field, and the peak electric field. If the LDFCs that are in time synchronization detect the same initial return stroke of the flash, then their time stamps of the initial stroke will differ as a function of distance to the flash. Provided that the LDFC's detect the same strokes, the TDs have to be within plus or minus 100 microseconds of each other, regardless of whether the LDFCs are in time synchronization or not. The TDs are used to match the flash data record 1100 of the out of sync LDFC (My) with that of the flash data records (1110 and 1120) of one or more LDFCs that are in sync (Sa and Ra). Once a match has been detected, (LDFC My record 1100 matches with both LDFC Sa and Ra records 1110 and 1120) a time correction can be calculated for the out of sync LDFC (My). A time correction of 0 days 21:39:25.2467 was calculated using LDFC Sa record 1110 in order to bring LDFC My record 1100 close to NIST time. This will then allow the flash data records from LDFC (My) to participate in future flash locations detected by the network.

Refinements to the time adjustment calculation of an out of sync LDFC can be made. Since the peak magnetic field radiation is inversely proportional with respect to the distance from the flash to the direction finder site, a more refined estimate of the internal time adjustment can be made using this information. Another technique employs the use of a computed flash time and location, from the LDFCs which were in sync with NIST time, and then computing the correction factor of the LDFC which was out of sync based on this time and the distance from the flash to the LDFC which was out of sync. Use of these further refinements can allow for correction factors to be computed within a few 100 microsecond units.

From the foregoing detailed description, it will be apparent that a sophisticated LDFC has been developed which significantly enhances and extends the capabilities of lightning detection networks. The LDFC provides absolute time tagging of lightning return strokes to the nearest $10^{-4}$ second of NIST time, thereby facilitating communication of lightning data by satellite or other media having unknown path delays. It supports local diagnostic devices, data storage devices and physical or virtual display/keyboard capabilities. It incorporates a watchdog timer designed to reset the LDFC if an abnormal operating condition exists or if data communications to the LDFC have ceased for a determined time period. The LDFC also supports a communications network allowing for remote diagnostics, message passing and file transfers throughout the lightning detection network. Downloaded parameters allow for customizing and adjusting the operating environment of each LDFC. The LDFC directly interfaces to the existing ADF 80-02 analog direction finder, and with modest modification to the ADF 80-02, provides more information about lightning return strokes and exhibits enhanced status and diagnostic capabilities. The LDFC of the present invention clearly represents a significant advance in this art.

Although specific embodiments have been described and depicted herein, those skilled in the relevant art will recognize that various modifications, additions, substitutions and the like can be made without departing from the spirit of the invention, the scope of which is defined by the claims appended hereto.

Appendix A

```
;----------------------------------------------------:
;----------------------------------------------------:
;                                                    :
; PATPF9G.ASM       Code which implements the        :
;                   Reroute/Header Messages as an    :
;                   added extension to the normal    :
;                   message processing of a LDFC.    :
;                                                    :
; 12/18/89 16:40:14 Compile on a COMPAQ Portable     :
;                   III using Borland's Turbo        :
;                   Assembler version 1.0            :
;                                                    :
;----------------------------------------------------:
;----------------------------------------------------:
       ;---------------------------------------------:
       ; Include files                               :
       ;---------------------------------------------:
```

9000       INCLUDE utility.mac

```
       ;---------------------------------------------:
       ; Message Cell Segment                        :
       ;---------------------------------------------:
```

9002 MsgCell SEGMENT AT 0          ; Allocated at run-time

9004     Receivers    DW    ?      ; Bit mask of what
                                   ; devices are to receive
                                   ; the message contents.
                                   ; For example, a
                                   ; Receivers value of:
                                   ;   0000000000001010
                                   ; Specifies that devices
                                   ; E1 and E3 will receive
                                   ; the message contents 9006     MsgLength    DW    ?      ; Length of message
                                   ; contents 9008     ReceivedFrom DB    ?    - ; The ID of the device
                                   ; the original message
                                   ; was received from (or
                                   ; created by).

9010     Contents  DB 256 DUP (?)  ; The actual message
                                   ; contents up to 256
                                   ; bytes in this case 9012 MsgCell ENDS

```
       ;---------------------------------------------:
       ; Code Segment                                :
       ;---------------------------------------------:
```

9014 CODE    SEGMENT PUBLIC
9016         ASSUME CS:CODE

```
        ;----------------------------------------;
        ; External Variables/Routines            ;
        ;----------------------------------------;

9018    EXTRN   AsciiTime:WORD      ; 8-character represen-
                                    ; tation of the ASCII
                                    ; time 9020    EXTRN   BeginMsg:NEAR       ; Routine to start a
                                    ; response message 9022    EXTRN   CancelMsg:NEAR      ; Routine to cancel a
                                    ; message 9024    EXTRN   EndMsg:NEAR         ; Routine to End a
                                    ; message, and send the
                                    ; message contents to
                                    ; the specified
                                    ; receivers of the
                                    ; message 9026    EXTRN   ReleaseMsg:NEAR     ; Routine to release
                                    ; memory used for a
                                    ; message once it has
                                    ; been successfully
                                    ; processed ;----------------------------------------;
        ; BIOS Reset vector for reboot message   ;
        ;----------------------------------------;

9028    BiosInitVector DW  0FFF0h,0F000h ; Reset vector for
                                         ; the 80x86 CPU's ;----------------------------------------;
        ; Jump table for ProcessMessage.         ;
        ;    First word:  Address of Routine to jump to
        ;----------------------------------------;

9030    MsgJumpTable LABEL   WORD
9032         DW       Reboot          ; 00 - Reset the machine
9034         DW       GetAsciiTime    ; 01 - Request for ASCII
                                      ; time
9036         DW       Available       ; 02 - Available for
                                      ; future
9038         DW       Available       ; 03 - Available for
                                      ; future
9040         DW       Available       ; 04 - Available for
                                      ; future
9042         DW       Available       ; 05 - Available for
                                      ; future
9044         DW       Available       ; 06 - Available for
                                      ; future
9046         DW       Available       ; 07 - Available for
                                      ; future
9048         DW       Available       ; 08 - Available for
                                      ; future
```

```
9050    DW        Available       ; 09 - Available for
                                  ; future
9052    DW        Available       ; 0A - Available for
                                  ; future
9054    DW        Available       ; 0B - Available for
                                  ; future
9056    DW        Available       ; 0C - Available for
                                  ; future
9058    DW        Available       ; 0D - Reroute message
                                  ; type
9060    DW        Available       ; 0E - Header message
                                  ; type 9062 NumMsgTypes    EQU    ($ - MsgJumpTable)/2

;----------------------------------------------------
; Code
;----------------------------------------------------
;----------------------------------------------------
;
; ProcessMessage
;                 Routine to process a message, and
;                 generate a response if the message
;                 processed requires one.
;
;       Entry:    DS      - Set to the segment of
;                           the message cell to
;                           process
;
;       Exit:     None    - Message processed,
;                           responses may be
;                           generated if the message
;                           processed so requires
;
;       Uses:     all
;
; 12/18/89 16:48:35 Created
;----------------------------------------------------
9100 Procedure  ProcessMessage,<DS:MsgCell,ES:Nothing>

9102    mov      si,OFFSET Contents  ; set dS:[si] to point
                                     ; at the message
                                     ; contents 9104    lodsb                        ; get the message type
                                     ; verify it is in the
                                     ; valid range of
                                     ; <00>-<0E>

9106    iff   al,ae,NumMsgTypes      ; if invalid message
9108       call ReleaseMsg           ; type release memory
                                     ; used for message
                                     ; pointed at by DS 9110    ret                          ; and exit
9112    ifend
```

| | | | |
|---|---|---|---|
| 9114 | zero | ah | ; Get ptr into the |
| 9116 | mov | bx,ax | ; MsgJumpTable for the: |
| 9118 | shl | bx,1 | ; routine that will |
| | | | ; process this message: |

```
;----------------------------------------------------;
; Go start a response message: Allocate, and set     :
; the Device to receive the response to be the       :
; same as the one that sent the message being        :
; processed.  That is, return the results from       :
; the processing of this message to the device       :
; which sent the message as a default.               :
;----------------------------------------------------;
```

| | | | |
|---|---|---|---|
| 9120 | call | BeginMsg | ; returns a pointer of: ES:[di] for the ; building of a new ; message |
| 9122 | push | DS | ; save ptr to message ; being processed |
| 9124 | call | MsgJumpTable[bx] | ; go process the ; message contents |
| 9126 | ASSUME | DS:Nothing,ES:MsgCell | ; DS may be trashed ; but ES must be ; set to the newly ; allocated msg cell: |
| 9128 | iff | Receivers,e,0 | ; if the receivers for: ; the message have ; been set to 0 (ie: ; (Invalid message) |
| 9130 | | call CancelMsg | ; then cancel the ; message being built |
| 9132 | els | | |
| 9134 | | call EndMsg | ; Otherwise, end the ; response message, ; and send it to the ; receivers specified ; in the message ; structure |
| 9136 | ifend | | |
| 9138 | pop | DS | ; Restore DS to the ; original message |
| 9140 | call | ReleaseMsg | ; and release the ; message cell since ; it is now fully ; processed |
| 9142 | ProcedureEnd | ProcessMessage | |

```
;----------------------------------------------------------------;
;                                                                :
;   Reboot                                                       :
;       <00>            Routine to reboot the device.            :
;                       Jumps to the BIOS initialization         :
;                       vector causing the machine to be         :
;                       reset.                                   :
;                                                                :
;       Entry:          None                                     :
;                                                                :
;       Exit:           None    - System resets                  :
;                                                                :
;       Uses:           All                                      :
;                                                                :
;   12/18/89 16:49:32   Added for Reroute/Header                 :
;                                demonstration                   :
;                                                                :
;----------------------------------------------------------------;
```

9200 Procedure    Reboot,<DS:Nothing,ES:Nothing>

9202        jmp     DWORD PTR BiosInitVector

9204 ProcedureEnd  Reboot

```
;----------------------------------------------------------------;
;                                                                :
;   GetAsciiTime                                                 :
;       <01>            Routine to append the ASCII time         :
;                       onto the end of a message.  The          :
;                       ASCII time is assumed to be              :
;                       maintained internally by other           :
;                       routines in the device in this           :
;                       example.                                 :
;                                                                :
;       Entry:          ES:[di] Pointing at memory               :
;                               location where the ASCII         :
;                               time is to be-added. -           :
;                                                                :
;       Exit:           ES:[di] Pointing 8 characters            :
;                               beyond its starting point        :
;                               where the ASCII time was         :
;                               added                            :
;                                                                :
;       Uses:           DS,si,di,cx                              :
;                                                                :
;   12/18/89 16:50:41   Created for sample of Reroute/           :
;                               Header messages                  :
;                                                                :
;----------------------------------------------------------------;
```

9300 Procedure    GetAsciiTime,<DS:Nothing,ES:Nothing>

9302    push    CS              ; set dS:[si] to point at the:
9304    pop     DS              ; ASCII time
9406    mov     si,OFFSET AsciiTime

| | | | |
|---|---|---|---|
| 9308 | mov | cx,8 | ; set cx to length of time |
| 9310 | rep | movsb | ; and add the time to the end<br>; of the memory location<br>; pointed at by ES:[di] |

9312 ProcedureEnd GetAsciiTime

```
;----------------------------------------------------------
;
;  Available
;     <02>-<0C>      NULL routine to handle all of the
;                    message types which are not
;                    processed by the device by doing
;                    nothing.  (IE: No response
;                    message).
;
;     Entry:         None
;
;     Exit:          None    -Routine just returns
;
;     Uses:          None
;
;  12/18/89  17:17:52   Created
;
;----------------------------------------------------------
```

9400 Procedure Available,<DS:Nothing,ES:MsgCell>

| | | | |
|---|---|---|---|
| 9402 | mov | Receivers,0 | ; Clear the receivers, so<br>; the message will be<br>; treated as invalid, and<br>; cancelled |

9404 ProcedureEnd Available

```
;----------------------------------------------------------
;
;  ProcessReroute
;     <0D>           Routine to reroute the contents of
;                    the message which follow the
;                    receiver list to the devices
;                    specified in the receiver list
;
;     Entry:         ES:[di] - Pointing at where to
;                              store the Response
;                              message
;
;                    DS:[si] - Pointing at <Receiver
;                              List>?b in:
;
;                    <Receiver List>?b <Rest of
;                    Message>?b
;
;     Exit:          ES:[di] - Pointing one character
;                              beyond the following
;                              response message
;
```

```
;                  <Rest of Message>?b
;
;       Uses:      ax,bx,cx,dx,si,di
;
;   12/18/89 16:58:15  Created
;----------------------------------------------------------

9500  Procedure    ProcessReroute,<DS:Nothing,ES:MsgCell>

9502     call   ScanReceiverList     ; convert the receiver
                                     ; list to a receiver
                                     ; mask 9504     mov    Receivers,ax         ; set the receivers
                                     ; for the rerouted
                                     ; message 9506     mov    cx,DS:MsgLength      ; get length of the
                                     ; message
9508     add    cx,OFFSET Contents   ; compute remaining
                                     ; length
9510     sub    cx,si                ; length-Pos+Offset 9512     rep    movsb                ; and transfer the
                                     ; <Rest of Message>?b
                                     ; as the response 9514  ProcedureEnd   ProcessReroute
;----------------------------------------------------------
;
;   ProcessHeader
;          <0E>        Routine to process a header
;                      message, and check to see if the
;                      header message contains a tail.
;                      The response message will be in
;                      the following form:
;                      <Header>?b <Resp to Message
;                      Type>?b <Tail>?b
;
;          Entry:      ES:[di] - Pointing at where to
;                                build the response
;                      DS:[si] - Pointing at the
;                                <Receiver List>?b in the
;                                following:
;
;                      <0E>b <Receiver List>?b <Tail:1
;                      Header Len:7>b <Header>?b <Tail
;                      Len>b <Tail>?b] <Message to
;                      Process>?b
;
;          Exit:       The following response message
;                      will be generated:
;
;                      <Header?b <Response to Message To
;                      Process>?b [<Tail>?b]
;
;          Note:       The [ <Tail Len>b <Tail>?b] are
```

```
;                    only present IF the hi-bit in
;                    <Tail:1 Header Len:7>b is 1, this
;                    indicates that a tail is present,
;                    and that the <Tail>?b section
;                    should be appended to the response
;                    message after the message is
;                    processed.
;
;       Uses:        si,di,ax,bx,cx,dx
;
; 12/18/89 16:58:24  Created
;
;------------------------------------------------------

9600   Procedure    ProcessHeader,<DS:Nothing,ES:MsgCell>

9602       call     ScanReceiverList    ; convert the receiver
                                        ; list to a receiver
                                        ; mask 9604       mov      Receivers,ax        ; set the receivers to
                                        ; return response to 9606       pushm    DS,si               ; save DS:[si] pointer
                                        ; which is currently
                                        ; pointing at:
                                        ; <Tail:1 Header Len:
                                        ; 7>b 9608       lodsb                        ; get length of the
                                        ; header
9610       mov      ah,al               ; save in ah
9612       and      al,07Fh             ; mask out the Tail
                                        ; indicator bit 9614       zero     ch                  ; transfer the header
                                        ; section
9616       iff      or,al,al,nz         ; if non-zero length
                                        ; header
9618         mov    cl,al
9620         rep    movsb
9622       ifend 9624       iff      test,ah,80h,nz      ; if tail present
9626         lodsb                      ; skip over it for now
9628         zero ah
9630         add  si,ax
9632       ifend
;------------------------------------------------------
; Try to process the <Message To Process>?b
;------------------------------------------------------

9634       lodsb                        ; get the message type
                                        ; and verify it is in
                                        ; the valid range of
                                        ; <00>-<0E>
```

```
9636        iff     al,ae,NumMsgTypes   ; if invalid message
9638          mov   Receivers,0         ; type set receivers
9640          ret                       ; to none and exit
9642        ifend 9644        zero    ah                  ; Get ptr into the
9646        mov     bx,ax               ; MsgJumpTable for the
9648        shl     bx,1                ; routine that will
                                        ; process this message 9650        call    MsgJumpTable[bx]    ; go process the
                                        ; message
            ;----------------------------------------------------
            ; Add <Tail>?b portion if necessary
            ;----------------------------------------------------

9652        popm    DS,si               ; restore ptr to:
                                        ; <Tail:1 Header
                                        ; Len:7>b 9654        lodsb                       ; see if tail present
9656        iff     test,al,80h,nz      ; if tail present
9658          and   al,7Fh              ; move ptr to tail
9660          zero  ah
9662          add   si,ax               ; skip header bytes
9664          lodsb                     ; get tail length 9666          mov   cx,ax               ; and add the tail to
9668          rep   movsb               ; the end of the
                                        ; message
9670        ifend 9672 ProcedureEnd    ProcessHeader
```

;----------------------------------------------------------------
;
; ScanReceiverList
;                       Routine to scan an area of
;                       memory, converting Device ID
;                       bytes to positions in a bit
;                       mask for a receiver list.
;                       Each receiver byte may have a
;                       value of 0-15 (00h - 0Fh) for
;                       the device ID in the
;                       lo-nybble. The end of the
;                       receiver list is marked by a
;                       non-zero value in the
;                       hi-nybble.
;
;       Entry:          DS:[si] - Pointing at 1st
;                                 byte in the
;                                 Receiver List.
;
;       Exit:           DS:[si] - Pointing at byte
;                                 following the last
;                                 byte of the
;                                 Receiver List

```
;                       ax      - Bit mask of all
;                                 receivers that were
;                                 in the list. Bit 0
;                                 refers to device
;                                 E0, bit 1 to device
;                                 E1 and so on.
;
;       Uses:           si,ax,bx,cx,dx
;
; 12/18/89 19:09:59     Created
;
;----------------------------------------------------

9700   Procedure    ScanReceiverList,<DS:Nothing,ES:Nothing>

9702       zero     dx                  ; assume no receivers 9704       repeat                       ; load receivers
9706          lodsb                     ; get next receiver ID
9708          mov   cl,al
9710          and   cl,0Fh              ; mask to lower nybble 9712          mov   bx,1                ; set bit for device E0
9714          shl   bx,cl               ; shift to proper device
9716          or    dx,bx               ; ID and add to bit mask 9718       until   test,al,0F0h,nz      ; repeat until non-zero
                                        ; hi-nybble 9720       mov     ax,dx                ; return results in ax 9722   ProcedureEnd    ScanReceiverList

9724   CODE   ENDS
9726          END
```

What is claimed is:

1. A lightning direction finder controller for use at a direction finder site in a multi-site lightning detection network, the controller comprising:

first means for receiving and digitizing inputs from an analog direction finder unit located at said site, said inputs representing readings collected by said unit relating to a lightning return stroke detected and reported by said unit to the controller;

second means for processing the digitized inputs and determining therefrom the direction of the lightning return stroke relative to the direction finder site;

third means for determining and associating an absolute time of occurrence with the return stroke, said third means determining the absolute time associated with the return stroke with an accuracy at least as great as $10^{-3}$ second of an absolute time source, said absolute time source comprising a time code broadcast by a satellite, said third means further comprising means for maintaining internal time in said controller and for receiving a satellite clock time signal from a satellite controlled clock located at said site, the satellite controlled clock receiving and decoding the time code broadcast by the satellite and generating a satellite clock time signal generally in synchronism with the time code and representative of satellite clock time, said third means further comprising means responsive to said satellite clock time signal for synchronizing said internal time with satellite clock time; and fourth means for enabling communication of the direction and the absolute time of occurrence of the lightning return stroke to a remote network controller.

2. The lightning direction finder controller of claim 1, wherein said third means comprises means for determining the absolute time associated with the return stroke with an accuracy to the nearest $10^{-4}$ second of the absolute time source.

3. The lightning direction finder controller of claim 2, wherein said absolute time source comprises a NIST GOES time code broadcast by a Geostationary Operational Environmental Satellite; and further in combination with a satellite controlled clock located at said site which clock receives and decodes said time code and generates a satellite clock time signal generally in synchronism with NIST time and representative of satellite clock time.

4. The lightning direction finder controller of claim 3, wherein said third means comprises:
means for determining how accurately the internal time is synchronized with satellite clock time and how accurately the satellite clock time is synchronized with NIST time, and assigning a time quality rating depending upon the results of said determinations; and
means for associating a current time quality rating with the absolute time of occurrence of the reported return stroke.

5. The lightning direction finder controller of claim 4, wherein said third means further comprises:
means for detecting the occurrence of a failure of communications between the satellite controlled clock and the controller and for resetting said clock upon detection of such occurrence; and
means for requesting current network time from the network controller and for comparing satellite clock time with said current network time and resetting the clock when the comparison indicates that the satellite clock time is not within an acceptable tolerance level of the current network time.

6. The lightning direction finder controller of claim 5, wherein the third means further comprises:
a counter clocked by a reference frequency signal provided by the satellite clock;
means for deriving the absolute time of the return stroke by subtracting the current count of the counter when the stroke occurs, from a base time maintained by the controller; and
means for adjusting said base time to keep the internal time in synchronism with NIST time.

7. The lightning direction finder controller of claim 6, wherein said third means further comprises:
a temperature compensated crystal oscillator for providing a backup reference frequency signal; and
means for automatically switching said backup reference frequency signal to said counter if the satellite clock fails.

8. The lightning direction finder controller of claim 7, in combination with means for externally synchronizing a controller having a failed satellite clock, with NIST time, by determining an adjustment to be made to the base time, from a comparison of the time of occurrence of the first stroke and the time differences between the first stroke and subsequent strokes of a lightning flash detected by said controller, with the initial stroke time and time differences therefrom of subsequent strokes of flashes detected by neighboring controllers that are in sync with NIST time.

9. The lightning direction finder controller of claim 1, wherein said second means comprises means for processing digitized inputs from said analog direction finder unit for multiple return strokes of a lightning flash and for calculating, for each of said return strokes, the peak magnetic field strength, the peak electric field strength, the polarity of the return stroke, and the direction of the return stroke relative to the direction finder site; and wherein the fourth means further comprises means for communicating the calculated peak magnetic field strength, peak electric field strength, polarity and direction of the multiple return strokes of the lightning flash to the network controller.

10. The lightning direction finder controller of claim 1 in combination with means for downloading from the network controller to the direction finder controller parameters which define the operational state of the direction finder controller, whereby the operation of the direction finder controller can be remotely customized and adjusted.

11. A lightning direction finder controller for use at a direction finder site in a multi-site lightning detection network, the controller comprising:
first means for receiving and digitizing inputs from an analog direction finder unit located at said site, said inputs representing readings collected by said unit relating to a lightning return stroke detected and reported by said unit to the controller;
second means for processing the digitized inputs and determining therefrom the direction of the lightning return stroke relative to the direction finder site;
third means for enabling communication of the direction of the lightning return stroke to a remote network controller; and
means for grouping each lightning return stroke within a corresponding flash record, the grouping being based upon (a) a remotely configurable limit upon the direction deviation of subsequent return strokes from the direction of the first return stroke in a flash, and (b) a remotely configurable limit upon the waiting time for additional lightning return strokes from the point in time when the first lightning return stroke of the flash occurred.

12. The lightning direction finder controller of claim 11, further comprising means for identifying flashes processed by the lightning direction finder controller having at least one of the following flash qualities:
maximum number of return strokes, maximum negative electric field strength, maximum positive electric field strength, maximum negative magnetic field strength, and maximum positive magnetic field strength, and for storing data relating to said flashes within said controller.

13. A lightning direction finder controller for use at a direction finder site in a multi-site lightning detection network, the controller comprising:
first means for receiving and digitizing inputs from an analog direction finder unit located at said site, said inputs representing readings collected by said unit relating to a lightning return stroke detected and reported by said unit to the controller;
second means for processing the digitized inputs and determining therefrom the direction of the lightning return stroke relative to the direction finder site;
third means for enabling communication of the direction of the lightning return stroke to a remote network controller; and
means for maintaining at the site statistics on the return stroke data processed at the site, tables of internal parameters and information relating to the status of the direction finder controller which can be accessed for diagnostic purposes, said maintaining means including means for maintaining separate counts of the number of return strokes occurring in different geographic sector surrounding said direction finder site, said counts indicating where lightning return strokes are occurring with respect to the direction finder site so that blind spots in the detection efficiency of the controller can be identified.

14. A lightning direction finder controller for use at a direction finder site in a multi-site lightning detection network, the controller comprising:

first means for receiving and digitizing inputs from an analog direction finder unit located at said site, said inputs representing readings collected by said unit relating to a lightning return stroke detected and reported by said unit to the controller;

second means for processing the digitized inputs and determining therefrom the direction of the lightning return stroke relative to the direction finder site;

third means for enabling communication of the direction of the lightning return stroke to a remote network controller; and means for maintaining at the site statistics on the return stroke data processed at the site, tables of internal parameters and information relating to the status of the direction finder controller which can be accessed for diagnostic purposes, said maintaining means comprising means for maintaining a message scheduling table, said table serving to internally generate messages at specific predetermined time intervals, said messages being of the type normally transmitted by the network controller and received and responded to by the direction finder controller, whereby message traffic from the network controller to the direction finder controller can be reduced.

15. A lightning direction finder controller for use at a direction finder site in a multi-site lightning detection network, the controller comprising:

first means for receiving and digitizing inputs from an analog direction finder unit located at said site, said inputs representing readings collected by said unit relating to a lightning return stroke detected and reported by said unit to the controller;

second means for processing the digitized inputs and determining therefrom the direction of the lightning return stroke relative to the direction finder site;

third means for enabling communication of the direction of the lightning return stroke to a remote network controller wherein said third means comprises an interface facility that allows for simultaneous connection between the lightning direction finder controller and the following:

(a) a satellite earth station controller for satellite communications, (b) a synchronous modem for land-line communications, (c) a satellite controlled clock synchronized with NIST time for accurate time keeping at the direction finder site, (d) a local diagnostic device, and (e) a data storage device for local archiving of lightning return stroke information.

16. The lightning direction finder controller of claim 15, wherein said diagnostic device comprises a personal computer; said data storage device comprises a tape storage device; and wherein said interface facility further comprises: an array of switches for providing a hardware identification and configuration setup to the lightning direction finder controller, and light emitting diodes for providing status information to on-site personnel about the operation of the lightning direction finder controller.

17. The lightning direction finder controller of claim 15, wherein said interface facility further comprises a programmable watchdog timer that is programmed to reset the processing means of the direction finder controller when either of the following conditions occurs:

a. an abnormal operating condition of the direction finder controller, b. termination of communications to the lightning direction finder controller for a predetermined time period.

18. The lightning direction finder controller of claim 17, wherein said abnormal operating condition comprises a halt in the execution of a main routine of the lightning direction finder controller; and wherein said conditions inhibit generation of a watchdog retrigger pulse, and the processing means is reset if a watchdog retrigger pulse is not received during a maximum retrigger duration.

19. The lightning direction finder controller of claim 18, further comprising means for overriding the normal operation of the watchdog timer and thus preventing reset of the processing means of the lightning direction finder controller, for predetermined time periods, during planned communications down time and during initialization of the lightning direction finder controller.

20. The lightning direction finder controller of claim 19, wherein said controller comprises three printed circuit boards, namely a CPU board containing said second processing means, a multifunction analog and digital input-output board containing said first means, and an interface facility board containing said third and fourth means.

21. The lightning direction finder controller of claim 20, wherein said second board further comprises means for interfacing with a temperature probe in order to constantly monitor the temperature inside a shelter housing the controller.

22. A lightning direction finder controller for use at a direction finder site in a multi-site lightning detection network, the controller comprising:

first means for receiving and digitizing inputs from an analog direction finder unit located at said site, said inputs representing readings collected by said unit relating to a lightning return stroke detected and reported by said unit to the controller;

second means for processing the digitized inputs and determining therefrom the direction of the lightning return stroke relative to the direction finder site;

third means for enabling communication of the direction of the lightning return stroke to a remote network controller; and means for simulating a lightning return stroke and for tagging simulated lightning stroke data prior to communication of said data from the direction finder controller to the network controller in order to differentiate said data from communicated actual lightning stroke data.

23. A lightning direction finder controller for use at a direction finder site in a multi-site lightning detection network, the controller comprising:

first means for receiving and digitizing inputs from an analog direction finder unit located at said site, said inputs representing readings collected by said unit relating to a lightning return stroke detected and reported by said unit to the controller;

second means for processing the digitized inputs and determining therefrom the direction of the lightning return stroke relative to the direction finder site;

third means for enabling communication of the direction of the lightning return stroke to a remote network controller; and means for supporting remote screen and keyboard access and control of the lightning direction finder controller; and means for supporting a virtual screen and a virtual keyboard to allow screen output and input of virtual keyboard type commands to the direction finder controller when no physical display hardware or keyboard is connected to the direction finder controller at the direction finder site.

24. A lightning direction finder controller for use at a direction finder site in a multi-site lightning detection network, the controller comprising:

first means for receiving and digitizing inputs from an analog direction finder unit located at said site, said inputs representing readings collected by said unit relating to a lightning return stroke detected and reported by said unit to the controller;

second means for processing the digitized inputs and determining therefrom the direction of the lightning return stroke relative to the direction finder site;

third means for enabling communication of the direction of the lightning return stroke to a remote network controller; and means for automatically generating audible signals and playing recognizable tunes to provide a diagnostic indication of current operational state of the direction finder controller.

25. A lightning direction finder controller for use at a direction finder site in a multi-site lightning detection network, the controller comprising:

first means for receiving and digitizing inputs from an analog direction finder unit located at said site, said inputs representing readings collected by said unit relating to a lightning return stroke detected and reported by said unit to the controller;

second means for processing the digitized inputs and determining therefrom the direction of the lightning return stroke relative to the direction finder site;

third means for enabling communication of the direction of the lightning return stroke to a remote network controller; and means for supporting a data communication overlay which allows commands to be transferred from each direction finder controller to an other direction finder controller within the lightning detection network and the results of processing said commands to be automatically transferred anywhere within the network, said supporting means comprising means for processing reroute and header messages without interfering with the processing of lightning return strokes.

26. The lightning direction finder controller of claim 25, wherein said means for processing reroute messages comprises means for transmitting a portion of a received message to a destination in the network specified by the contents of the message, and the means for processing header messages comprises means for transmitting the results of a processed message to any destination in the network specified within the message.

* * * * *